(12) United States Patent
Soundararajan et al.

(10) Patent No.: US 11,250,466 B2
(45) Date of Patent: Feb. 15, 2022

(54) SYSTEMS AND METHODS FOR USING SECURED REPRESENTATIONS OF USER, ASSET, AND LOCATION DISTRIBUTED LEDGER ADDRESSES TO PROVE USER CUSTODY OF ASSETS AT A LOCATION AND TIME

(71) Applicant: Hewlett Packard Enterprise Development LP, Houston, TX (US)

(72) Inventors: Abilash Soundararajan, Bangalore (IN); Michael Reid Tennefoss, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 579 days.

(21) Appl. No.: 16/048,801

(22) Filed: Jul. 30, 2018

(65) Prior Publication Data

US 2020/0034876 A1    Jan. 30, 2020

(51) Int. Cl.
G06Q 30/02     (2012.01)
H04L 9/06      (2006.01)

(52) U.S. Cl.
CPC ..... G06Q 30/0248 (2013.01); G06Q 30/0261 (2013.01); H04L 9/0637 (2013.01)

(58) Field of Classification Search
CPC . G06Q 30/02; G06Q 30/0248; G06Q 30/0261
See application file for complete search history.

(56) References Cited

U.S. PATENT DOCUMENTS

| | | | |
|---|---|---|---|
| 6,101,604 | A | 8/2000 | Barton |
| 6,963,363 | B1 | 11/2005 | Ohmura |
| 7,518,502 | B2 | 4/2009 | Austin et al. |
| 7,777,629 | B2 | 8/2010 | Lee et al. |
| 8,149,090 | B2 | 4/2012 | Hall et al. |

(Continued)

FOREIGN PATENT DOCUMENTS

| | | |
|---|---|---|
| CN | 106059747 A | 10/2016 |
| CN | 107154852 A | 9/2017 |

(Continued)

OTHER PUBLICATIONS

Zhang et al., "Town Crier: An Authenticated Data Feed for Smart Contracts," ACM16, Oct. 2016, 20 pages.

(Continued)

*Primary Examiner* — Thuy N Nguyen
(74) *Attorney, Agent, or Firm* — Sheppard Mullin Richter & Hampton LLP

(57) ABSTRACT

Systems and methods described herein are directed to using a distributed ledger network and devices that transmit secured representations of distributed ledger addresses to prove the custody of an asset by a user at a particular location and time. In some implementations, a method includes: transmitting to a server system operating as a node on a distributed ledger network: a first secured representation of a distributed ledger address associated with a first location; a second secured representation of a distributed ledger address associated with an asset; and a third secured representation of a distributed ledger address associated with a user; and receiving a confirmation message from the server system.

20 Claims, 31 Drawing Sheets

(56) References Cited

U.S. PATENT DOCUMENTS

| | | | |
|---|---|---|---|
| 8,258,926 B2 | 9/2012 | Bayer et al. | |
| 9,253,433 B2 | 2/2016 | Boss et al. | |
| 9,324,091 B2 | 4/2016 | Randell et al. | |
| 9,375,628 B2 | 6/2016 | DeAngelis et al. | |
| 9,406,010 B2 | 8/2016 | Rujan et al. | |
| 9,635,000 B1 | 4/2017 | Muftic | |
| 9,672,710 B2 | 6/2017 | Nassar et al. | |
| 9,714,099 B2 | 7/2017 | Dinkelmann et al. | |
| 9,817,113 B2 | 11/2017 | Loftis et al. | |
| 9,818,141 B2 | 11/2017 | Abuelsaad et al. | |
| 9,881,216 B2 | 1/2018 | Buehler et al. | |
| 9,898,782 B1 * | 2/2018 | Winklevoss | G06Q 40/04 |
| 9,980,137 B2 * | 5/2018 | South | H04W 4/029 |
| 10,305,833 B1 | 5/2019 | Dennis | |
| 10,339,523 B2 | 7/2019 | McDonough et al. | |
| 10,361,866 B1 | 7/2019 | Mcgregor et al. | |
| 10,375,050 B2 | 8/2019 | Lyons et al. | |
| 10,424,189 B2 | 9/2019 | Daoura et al. | |
| 10,580,281 B2 | 3/2020 | Daoura et al. | |
| 10,581,847 B1 | 3/2020 | Sun et al. | |
| 10,594,689 B1 | 3/2020 | Weaver et al. | |
| 10,614,646 B1 | 4/2020 | Douglass et al. | |
| 10,652,018 B2 | 5/2020 | Smith et al. | |
| 10,660,059 B1 | 5/2020 | Knas et al. | |
| 10,755,226 B1 | 8/2020 | Robyak et al. | |
| 10,757,672 B1 | 8/2020 | Knas et al. | |
| 10,762,311 B2 | 9/2020 | Lemsitzer et al. | |
| 10,778,438 B2 | 9/2020 | Shi et al. | |
| 10,788,229 B2 | 9/2020 | Sinha et al. | |
| 10,819,504 B2 | 10/2020 | Shi et al. | |
| 10,825,324 B2 | 11/2020 | Haviv et al. | |
| 10,826,684 B1 | 11/2020 | Winter et al. | |
| 10,826,703 B1 | 11/2020 | Shipley | |
| 10,833,843 B1 | 11/2020 | Vijayvergia et al. | |
| 10,872,215 B2 | 12/2020 | Vancorenland et al. | |
| 10,878,522 B2 | 12/2020 | Blackman et al. | |
| 10,885,336 B1 | 1/2021 | Davis et al. | |
| 10,917,744 B2 | 2/2021 | Brice et al. | |
| 10,979,862 B2 | 4/2021 | Daoura et al. | |
| 11,115,782 B2 | 9/2021 | Geiger et al. | |
| 2005/0134459 A1 | 6/2005 | Glick et al. | |
| 2006/0250231 A1 | 11/2006 | Wang et al. | |
| 2008/0030345 A1 | 2/2008 | Austin et al. | |
| 2008/0141027 A1 | 6/2008 | Kim et al. | |
| 2010/0039284 A1 | 2/2010 | Hall et al. | |
| 2013/0166455 A1 | 6/2013 | Douglas | |
| 2014/0040135 A1 | 2/2014 | Ovick et al. | |
| 2014/0337232 A1 | 11/2014 | Glasgo | |
| 2015/0269384 A1 | 9/2015 | Holman et al. | |
| 2015/0269624 A1 | 9/2015 | Cheng et al. | |
| 2015/0302409 A1 | 10/2015 | Malek et al. | |
| 2016/0012465 A1 | 1/2016 | Sharp | |
| 2016/0098723 A1 | 4/2016 | Joseph | |
| 2016/0203522 A1 | 7/2016 | Shiffert et al. | |
| 2016/0275461 A1 | 9/2016 | Sprague et al. | |
| 2016/0292672 A1 | 10/2016 | Fay et al. | |
| 2016/0321435 A1 | 11/2016 | Mccoy et al. | |
| 2016/0321675 A1 | 11/2016 | Mccoy et al. | |
| 2016/0328713 A1 | 11/2016 | Ebrahimi | |
| 2016/0330034 A1 | 11/2016 | Back et al. | |
| 2016/0379213 A1 | 12/2016 | Isaacson et al. | |
| 2017/0017955 A1 | 1/2017 | Stern et al. | |
| 2017/0041328 A1 | 2/2017 | Stack et al. | |
| 2017/0046526 A1 | 2/2017 | Chan et al. | |
| 2017/0046689 A1 * | 2/2017 | Lohe | G06Q 20/40 |
| 2017/0046694 A1 | 2/2017 | Chow et al. | |
| 2017/0046709 A1 * | 2/2017 | Lee | G06F 21/645 |
| 2017/0048216 A1 | 2/2017 | Chow et al. | |
| 2017/0069153 A1 | 3/2017 | Teicher | |
| 2017/0083907 A1 * | 3/2017 | McDonough | G06Q 20/3829 |
| 2017/0214522 A1 | 7/2017 | Code et al. | |
| 2017/0215038 A1 | 7/2017 | Primm et al. | |
| 2017/0230791 A1 | 8/2017 | Jones | |
| 2017/0232300 A1 | 8/2017 | Tran et al. | |
| 2017/0236350 A1 | 8/2017 | Yu-Shun | |
| 2017/0242935 A1 | 8/2017 | Wragg et al. | |
| 2017/0243193 A1 | 8/2017 | Manian et al. | |
| 2017/0243208 A1 | 8/2017 | Kurian et al. | |
| 2017/0262862 A1 | 9/2017 | Aljawhari | |
| 2017/0316390 A1 | 11/2017 | Smith et al. | |
| 2017/0317997 A1 | 11/2017 | Smith et al. | |
| 2017/0330174 A1 | 11/2017 | Demarinis et al. | |
| 2017/0344988 A1 | 11/2017 | Cusden et al. | |
| 2017/0364900 A1 | 12/2017 | Hudson et al. | |
| 2018/0025166 A1 | 1/2018 | Daniel et al. | |
| 2018/0048474 A1 | 2/2018 | Landrock et al. | |
| 2018/0078843 A1 | 3/2018 | Tran et al. | |
| 2018/0082294 A1 | 3/2018 | Davis et al. | |
| 2018/0107914 A1 | 4/2018 | Ziola | |
| 2018/0117446 A1 * | 5/2018 | Tran | A42B 3/0433 |
| 2018/0137512 A1 | 5/2018 | Georgiadis et al. | |
| 2018/0144292 A1 | 5/2018 | Mattingly et al. | |
| 2018/0144634 A1 | 5/2018 | Kim et al. | |
| 2018/0145836 A1 | 5/2018 | Saur et al. | |
| 2018/0167198 A1 * | 6/2018 | Muller | G06F 21/44 |
| 2018/0176228 A1 | 6/2018 | He et al. | |
| 2018/0189528 A1 | 7/2018 | Hanis et al. | |
| 2018/0191503 A1 | 7/2018 | Alwar et al. | |
| 2018/0197159 A1 | 7/2018 | Sheerin | |
| 2018/0197173 A1 | 7/2018 | Durvasula et al. | |
| 2018/0197186 A1 | 7/2018 | Sheerin | |
| 2018/0205546 A1 | 7/2018 | Haque et al. | |
| 2018/0240086 A1 | 8/2018 | Petr | |
| 2018/0270065 A1 | 9/2018 | Brown et al. | |
| 2018/0284093 A1 | 10/2018 | Brown et al. | |
| 2018/0316502 A1 * | 11/2018 | Nadeau | H04L 9/0637 |
| 2018/0341945 A1 | 11/2018 | Welborn et al. | |
| 2018/0343238 A1 | 11/2018 | Tola | |
| 2018/0343307 A1 | 11/2018 | Lotter et al. | |
| 2018/0351949 A1 | 12/2018 | Scott et al. | |
| 2018/0365633 A1 * | 12/2018 | Hanis | G06F 16/955 |
| 2019/0012637 A1 * | 1/2019 | Gillen | H04L 9/0637 |
| 2019/0019144 A1 * | 1/2019 | Gillen | H04L 9/3242 |
| 2019/0034917 A1 | 1/2019 | Nolan et al. | |
| 2019/0034923 A1 * | 1/2019 | Greco | G06Q 20/383 |
| 2019/0036887 A1 * | 1/2019 | Miller | G06Q 20/02 |
| 2019/0036906 A1 | 1/2019 | Biyani et al. | |
| 2019/0068615 A1 | 2/2019 | Pack et al. | |
| 2019/0080284 A1 | 3/2019 | Kim et al. | |
| 2019/0080300 A1 | 3/2019 | Jordan | |
| 2019/0087792 A1 | 3/2019 | Chow et al. | |
| 2019/0102850 A1 | 4/2019 | Wheeler et al. | |
| 2019/0108362 A1 | 4/2019 | Miller | |
| 2019/0122258 A1 | 4/2019 | Bramberger et al. | |
| 2019/0172026 A1 | 6/2019 | Vessenes et al. | |
| 2019/0180291 A1 * | 6/2019 | Schmeling | G16H 20/10 |
| 2019/0188708 A1 | 6/2019 | Shah | |
| 2019/0213462 A1 | 7/2019 | Mcdonald et al. | |
| 2019/0215162 A1 * | 7/2019 | Dickenson | H04L 9/3226 |
| 2019/0236214 A1 | 8/2019 | Stephen | |
| 2019/0253434 A1 | 8/2019 | Biyani et al. | |
| 2019/0280875 A1 * | 9/2019 | Ragnoni | H04L 63/12 |
| 2019/0289019 A1 * | 9/2019 | Ekadath | H04L 9/3239 |
| 2019/0294136 A1 | 9/2019 | Iacobone et al. | |
| 2019/0295162 A1 | 9/2019 | Wang et al. | |
| 2019/0302249 A1 | 10/2019 | High et al. | |
| 2019/0303463 A1 | 10/2019 | Catalano et al. | |
| 2019/0303951 A1 * | 10/2019 | Bakalis | H04L 9/0861 |
| 2019/0305967 A1 | 10/2019 | Hamel et al. | |
| 2019/0332838 A1 | 10/2019 | Vancorenland et al. | |
| 2019/0333057 A1 | 10/2019 | Jeremie | |
| 2019/0334698 A1 | 10/2019 | Baljit | |
| 2019/0340269 A1 | 11/2019 | Biernat et al. | |
| 2019/0340584 A1 | 11/2019 | Arora et al. | |
| 2019/0349190 A1 | 11/2019 | Smith et al. | |
| 2019/0349426 A1 | 11/2019 | Smith et al. | |
| 2019/0354943 A1 | 11/2019 | Mulye et al. | |
| 2019/0361917 A1 | 11/2019 | Tran et al. | |
| 2019/0366475 A1 | 12/2019 | Scarselli et al. | |
| 2019/0370286 A1 | 12/2019 | Bertsch et al. | |
| 2019/0372769 A1 | 12/2019 | Fisher et al. | |
| 2019/0372773 A1 | 12/2019 | Bertsch et al. | |
| 2019/0386822 A1 | 12/2019 | Ben-Simon et al. | |
| 2019/0391972 A1 | 12/2019 | Bates et al. | |

(56) References Cited

U.S. PATENT DOCUMENTS

| | | |
|---|---|---|
| 2020/0005398 A1 | 1/2020 | Castinado et al. |
| 2020/0012806 A1 | 1/2020 | Bates et al. |
| 2020/0034836 A1 | 1/2020 | Shah |
| 2020/0034839 A1 | 1/2020 | Soundararajan et al. |
| 2020/0034888 A1 | 1/2020 | Soundararajan et al. |
| 2020/0034945 A1 | 1/2020 | Soundararajan et al. |
| 2020/0036533 A1 | 1/2020 | Soundararajan et al. |
| 2020/0036712 A1 | 1/2020 | Soundararajan et al. |
| 2020/0037158 A1 | 1/2020 | Soundararajan et al. |
| 2020/0045020 A1 | 2/2020 | Soundararajan et al. |
| 2020/0050494 A1 | 2/2020 | Bartfai-Walcott et al. |
| 2020/0051232 A1 | 2/2020 | Mcgregor et al. |
| 2020/0076610 A1 | 3/2020 | Quan |
| 2020/0092102 A1 | 3/2020 | Quan |
| 2020/0101367 A1 | 4/2020 | Tran et al. |
| 2020/0118094 A1* | 4/2020 | Haldenby .......... G06Q 30/0214 |
| 2020/0119925 A1 | 4/2020 | Quan |
| 2020/0134861 A1 | 4/2020 | Zucker et al. |
| 2020/0143405 A1 | 5/2020 | Tucker |
| 2020/0151401 A1 | 5/2020 | Dyche et al. |
| 2020/0155944 A1 | 5/2020 | Witchey et al. |
| 2020/0177377 A1 | 6/2020 | Smith et al. |
| 2020/0184291 A1 | 6/2020 | Tisdel |
| 2020/0192885 A1 | 6/2020 | Grandau |
| 2020/0234386 A1 | 7/2020 | Blackman et al. |
| 2020/0265124 A1 | 8/2020 | Zhiguo |
| 2020/0265356 A1 | 8/2020 | Lee et al. |
| 2020/0265446 A1 | 8/2020 | Vargas |
| 2020/0280454 A1 | 9/2020 | Finlow-Bates |
| 2020/0294128 A1 | 9/2020 | Cella |
| 2020/0311646 A1 | 10/2020 | Koenig et al. |
| 2020/0311718 A1 | 10/2020 | Verdian et al. |
| 2021/0089514 A1 | 3/2021 | Werner et al. |
| 2021/0091960 A1 | 3/2021 | Werner et al. |
| 2021/0092613 A1 | 3/2021 | Palyutina et al. |
| 2021/0097893 A1 | 4/2021 | Klappert et al. |
| 2021/0117970 A1 | 4/2021 | Hugh et al. |
| 2021/0192441 A1 | 6/2021 | Zhang |
| 2021/0224727 A1 | 7/2021 | Rakhunde et al. |
| 2021/0248338 A1 | 8/2021 | Spivack et al. |

FOREIGN PATENT DOCUMENTS

| | | |
|---|---|---|
| CN | 107392770 A | 11/2017 |
| CN | 107730188 A | 2/2018 |
| CN | 111213139 A | 5/2020 |
| EP | 3249599 | 11/2017 |
| JP | 2018-173692 A | 11/2018 |
| KR | 20180030971 A | 3/2018 |
| WO | WO2016189488 A2 | 12/2016 |
| WO | WO-2017027648 | 2/2017 |
| WO | WO2017165909 A1 | 10/2017 |
| WO | 2019/108168 A1 | 6/2019 |
| WO | 2019/199288 A1 | 10/2019 |
| WO | 2019/217531 A1 | 11/2019 |

OTHER PUBLICATIONS

Dobre et al., "Authentication of JPEG Images on the Blockchain", International Conference on Control, Artificial Intelligence, Robotics and Optimization—ICCAIRO, Research Gate, May 19-21, 2018, 12 pages.

Poudel et al., "Photograph Ownership and Authorization using Blockchain", 2019 Artificial Intelligence for Transforming Business and Society (AITB), 2019.

Victoria L. Lemieux, "Blockchain and Distributed Ledgers as Trusted Record keeping Systems: An Archival Theoretic Evaluation Framework", Future Technologies Conference (FTC) 2017, pp. 1-15.

Heijden, R.W.V.D. et al., Blackchain: Scalability for Resource-constrained Accountable Vehicle-to-x Communication, (Research Paper), Dec. 11-15, 2017, 5 Pgs.

Laneaxis ICO (axis Token): Blockchain Trucking & Freight Shipping Coin?, Retrieved Jun. 15, 2018, 3 Pgs.

Liu, W. et al., "Advanced Block-chain Architecture for E-health Systems," Oct. 12-15, 2017, https://ieeexplore.ieee.org/document/8210847/.

Mathies, D., How a Blockchain-based Digital Photo Notary is Fighting Fraud and Fake News, Digital Trends, Jan. 25, 2018, 11 Pgs.

Matthews, Alice, RFID inventory provides real time monitoring for retailers, Dec. 1, 2017, 4 Pgs.

Modum Ensuring Compliance & Improving Efficiency in the Pharma Supply Chain, Modum.io AG, Aug. 8, 2017, 9 Pgs.

On Zero-knowledge Proofs in Blockchains, (Web Page), Retrieved Jun. 26, 2018, 7 Pgs., https://medium.com/@argongroup/on-zero-knowledge-proofs-in-blockchains-14c48cfd1dd1.

Orenge, A., "Blockchain-based Provenance Solution for Handcrafted Jewellery," 2018, 72 pages, https://comserv.cs.ut.ee/home/files/THESIS_+Blockchain-based+Provenance+Solution+for+Hand crafted+Jewellery+-+Antony-Orenge.pdf?study=ATILoputoo &reference=FF850BE046C89CBDC66A2F372421A77120C7D340.

Park et al., Blockchain Security in Cloud Computing: Use Cases, Challenges, and Solutions, Symmetry 2017, 13 Pgs. http://www.mdpi.eom/2073-8994/9/8/164/pdf.

Ramachandran et al., Using Blockchain and Smart Contracts for Secure Data Provenance Management, ArXiV Org, Sep. 28, 2017, 11 Pgs. https://arxiv.org/pdf/1709.10000.pdf.

Shyft: Whitepaper, (Research Paper), 2018, 25 Pgs.

Sovrin Foundation, Sovrin™: A Protocol and Token for SelfSovereign Identity and Decentralized Trust, Jan. 2018, 42 pages, https://sovrin.org/wp-content/uploads/Sovrin-Protocol-and-Token-White-Paper.pdf.

A Technical Overview of the XYO Network, Blockchain's Crymtographic Location Oracle Network, Retrieved on Jun. 7, 2018, 27 Pgs. https://medium.com/xyonetwork/whitepaper-b4793efe7609.

Axon, L. et al., "PB-PKI: a Privacy-Aware Blockchain-Based PKI," 2016, 8 pages, https://ora.ox.ac.uk/objects/uuid:8bd33c4f-5614-400e-b958-48e53fe_1_b342/download_file?file_format=application/pdf &safe_filename=SECRYPT_2017.pdf&type_of_work=Conference%20item.

Blockchain Meets Database: Replace or Combine?, (Research Paper), Aug. 29, 2017, 5 Pgs.

Blockchain will work in trucking—but only if these three things happen, Mar. 3, 2018, 9 Pgs. https://techcrunch.com/2018/03/02/blockchain-will-work-in-trucking-but-only-if-these-three-things-happen/.

Bocek et al., Blockchains Everywhere—a Use-case of Blockchains in the Pharma Supply-chain, IFIP, May 8-12, 2017, 6 Pgs.

Bojja, S. et al., "Dandelion: Redesigning the Bitcoin Network for Anonymity," Jun. 2017, 34 pages, https://dl.acm.org/citation.cfm?id=3084459.

Expert Market US, "What is a Point of Sale System?" retrieved online Jun. 19, 2018, 8 pages, https://www.expertmarket.com/pos/what-is-a-point-of-sale-system.

Github, "Blockchain Based Anonymous Distributed ID System," retrieved online Jun. 19, 2018, 13 pages, https://github.com/arnaucode/darkID-prototype.

Gray, M., Enterprise Smart Contracts, (Research Paper), Retrieved Jun. 25, 2018, 21 Pgs.

Hardjono, T. et al., "Anonymous Identities for Permissioned Blockchains," Jan. 20, 2016, 20 pages, http://connection.mit.edu/wp-content/uploads/sites/29/2014/12/Anonymous-Identities-for-Permissioned-Blockchains2.pdf.

\* cited by examiner

| TIME | Captured Data |
|---|---|
| T1 | TOTA-A1(B1, T1), TOTA-L1(B2, T1), TOTA-P1(B3, T1), S1(T1) |
| T2 | TOTA-A1(B1, T2), TOTA-L2(B4, T2), TOTA-P1(B3, T2), S1(T2) |
| ... | |
| TN | TOTA-A1(B1, TN), TOTA-LN(B5, TN), TOTA-P1(B3,TN), S1(TN) |
| TIME | Captured Data |
|---|---|
| T1 | TOTA-A1(B1, T1), TOTA-L1(B2, T1), TOTA-P1(B3, T1), S1(T1) |
| T2 | TOTA-A1(B1, T2), TOTA-L1(B2, T2), TOTA-P1(B3, T2), S1(T2) |
| ... | |
| TN | TOTA-A1(B1, TN), TOTA-L1(B2, TN), TOTA-P1(B3,TN), S1(TN) |
| TIME | Captured Data |
|---|---|
| T1 | TOTA-A1(B1, T1), TOTA-P1(B3, T1), S1(T1) |
| T2 | TOTA-A1(B1, T2), TOTA-P1(B3, T2), S1(T2) |
| ... | |
| TN | TOTA-A1(B1, TN), TOTA-P1(B3,TN), S1(TN) |
FIG. 24

SYSTEMS AND METHODS FOR USING SECURED REPRESENTATIONS OF USER, ASSET, AND LOCATION DISTRIBUTED LEDGER ADDRESSES TO PROVE USER CUSTODY OF ASSETS AT A LOCATION AND TIME

DESCRIPTION OF THE RELATED ART

The digital world relies heavily on the use of identity for transactions, access to records, and verification of claims. Besides personal names, identity is typically assigned, generated, granted, and/or controlled by a central authority—i.e., a corporation or government. Entrusting identity to a central authority may be acceptable when all actors behave ethically, but there may be no assurance that a user's identity, or the data associated with it, will be used only for the purposes for which permission was granted.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments.

FIG. 24 illustrates three different examples of time series that may be captured by a client device, in accordance with implementations of the disclosure.

Figure 1:
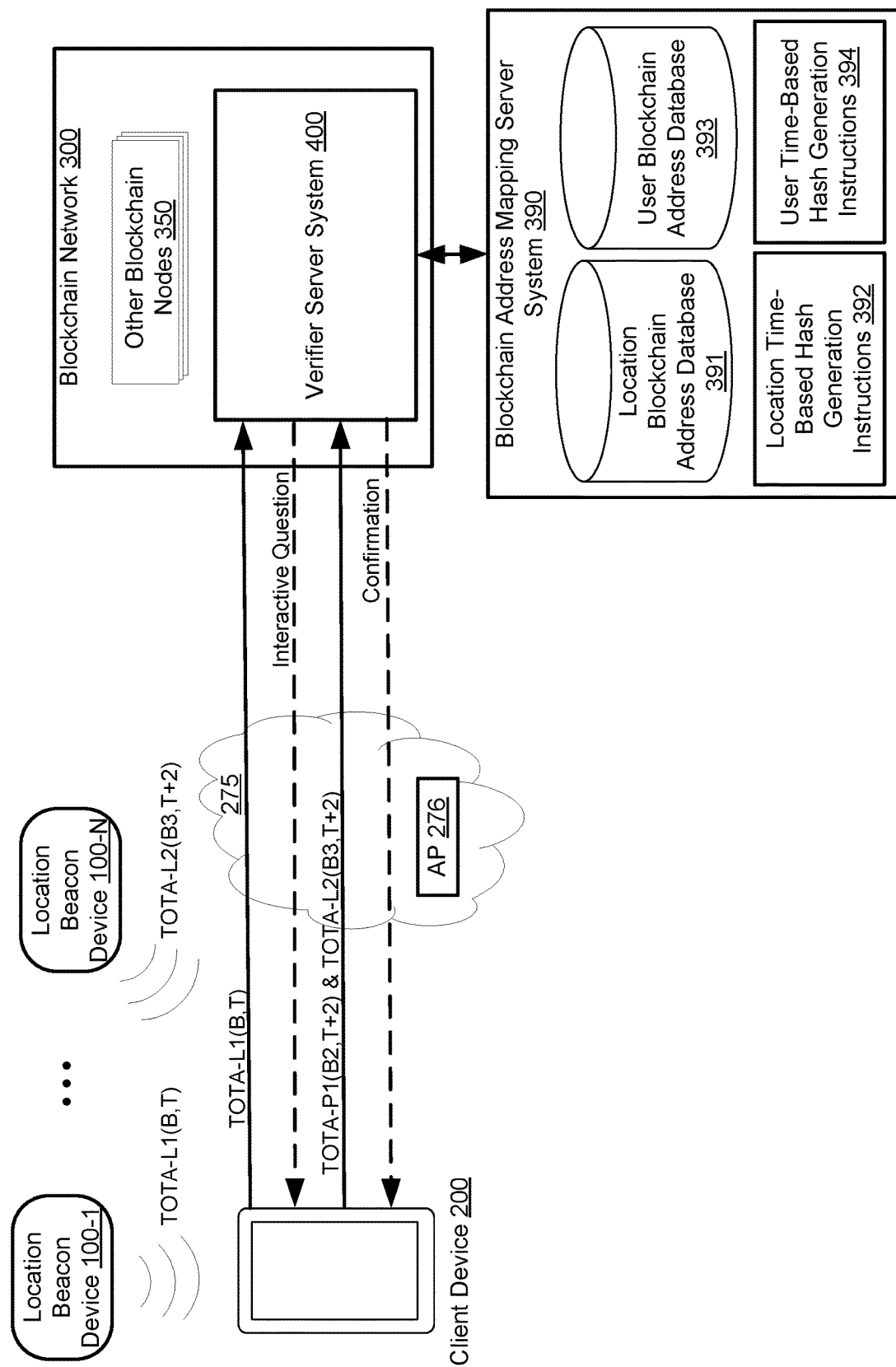
FIG. 1 is a diagram illustrating an example environment that uses location beacon devices and a blockchain network including a verifier server system ("verifier") to prove the presence of a user of client device at a particular location and time, in accordance with implementations of the disclosure.

The figures are not exhaustive and do not limit the present disclosure to the precise form disclosed.

DETAILED DESCRIPTION

As used herein, the term "distributed ledger" generally refers to a shared digital ledger that is decentralized and shared between nodes distributed across a network. After a transaction that is approved to be written to the ledger is consented by at least the majority of the nodes, the contents of the ledger are synchronized across all the nodes. Different types of consensus mechanisms that bring in varying levels of processing requirements to agree on a transaction amongst distributed nodes may be utilized in a distributed ledger network. Examples of common consensus mechanisms include proof of work, proof of stake, proof of elapsed time, Kafka, etc. Various platforms have adopted different consensus mechanisms.

Distributed ledger technology (DLT) describes the superset of the different variations of this technology. One presently popular type of DLT is blockchain technology. While in a distributed ledger a transaction is written to the ledger after consensus, the requirement is more specific in a blockchain: transactions are aggregated in to a block and the block is appended to the last block of an existing linear chain of blocks. As such, all blockchains are a form of a distributed ledger, but all distributed ledgers are not necessarily a blockchain. BITCOIN and ETHEREUM are examples of blockchain-based platforms. Directed acyclic graphs (DAG) are another example of a common form of DLT. IOTA is an example of a DAG-based platform. HYPERLEDGER is an example of a DLT-based platform. Unless explicitly stated otherwise, implementations of the disclosure may apply to any variant of DLT, including blockchains, DAGs, etc.

Although embodiments of the disclosure will be primarily described in the context of blockchains, it should be appreciated that all embodiments, unless expressly stated otherwise, may be applied to other variants of distributed ledger technology. For example, to the extent an embodiment is described in the context of a blockchain network sharing a blockchain, it should be appreciated that the embodiment may more generally be applied in a distributed ledger network sharing a distributed ledger. Similarly, to the extent that an embodiment recites a "blockchain address," a "secured representation of a blockchain address," "a blockchain application," or "a blockchain transaction," it should be appreciated that the embodiment may more generally be applied using a "distributed ledger address," "a secured representation of a distributed ledger address," "a distributed ledger application," and/or "a distributed ledger transaction."

As used herein, the term "public blockchain" generally refers to a blockchain that is accessible to any entity and whereby any entity may participate in the consensus process. A public blockchain may be referred to as a "fully decentralized" blockchain.

As used herein, the term "private blockchain" generally refers to a blockchain where a limited set of trusted entities participate in a blockchain network. A permissioned set of trusted nodes may participate in the consensus process. For example, a consortium of multiple financial institutions may form a private blockchain network. The right to read a private blockchain may be public or restricted to trusted nodes. A private blockchain may be referred to as a permissioned blockchain. Although implementations of the disclosure will primarily be described in the context of private blockchains that are implemented by consortiums, it should be appreciated that the technology disclosed herein may be adapted for use in anything from public to private blockchains.

As used herein, the term "blockchain address" refers to an identifier for a receiver or a sender in a blockchain transaction. A unique blockchain address may be associated with a person, an animal, a corporation, a location, an asset, or some other thing.

As used herein, the terms "off-chain" and "off-chain transaction" refer to transactions that do not occur within a blockchain.

As used herein, the term "smart contract" refers to self-executing code residing on a blockchain network, which automates execution of contracts between trusted parties based on events on a blockchain or distributed ledger.

As used herein, the term "blockchain wallet" refers to a digital wallet that helps manage a user's blockchain account(s), including private and public keys associated with the identity owning the wallet. For example, in particular implementations, a blockchain wallet may be to manage cryptocurrency accounts.

As used herein, the term "secured representation of a blockchain address" generally refers to a value (e.g., a number in decimal format, hexadecimal format, etc.) that is generated by applying a time-based cryptographic hashing algorithm to a blockchain address.

As used herein, the terms "time-based one-time advertisement" and "TOTA" generally refer to a message including a one-time value generated by applying a cryptographic hash function using a blockchain address and a current timestamp. The generated one-time value may be referred to as an example of a "secured representation of a blockchain address." The TOTA may only be valid for a short period of time and only for one time usage. This short duration may be configured by a network administrator based on business requirement(s). The reason for limited usage of the advertisement may be to ensure that repeated usage of the advertisement is not nefariously done by people who have moved away from the location but want to use the same advertisement as their proof of being there.

As used herein, the term "fixed advertisement" generally refers to a printout or other display of a secured representation of a blockchain address that does not change over time. For example, a fixed advertisement may comprise a printed or electronic code such as a QR or passive RFID code that embeds a secured representation of a blockchain address that does not change over time. As fixed advertisements do not change over time, a fixed relationship between the secured representations of the blockchain addresses of the fixed advertisement and their respective clear versions may be maintained in a database table or other suitable data structure. The data structure may be referred to during verification to determine a clear version of a blockchain address corresponding to a fixed advertisement.

As used herein, the terms "interactive proving mechanism" and "interactive proving protocol" refer to a process whereby a verifier (e.g., a server system operating on a blockchain network) asks a prover (e.g., a client device) to answer one or more questions that require the prover to capture one or more secured representations of blockchain addresses. For example, an interactive proving mechanism may be performed to prove that an individual (e.g., an individual carrying a client device) is at a particular location at a particular time. As another example, an interactive proving mechanism may be performed to prove that an individual (e.g., an individual carrying a client device) has custody of an asset at a particular location and time. Every iteration of questioning after a first round of receiving data from the prover may prove the validity of a claim with higher confidence. In some cases, just the first round of questioning may be needed. The number of iterations and types of questions that are asked may vary depending upon the business application.

As used herein, the term "distributed attestation" generally refers to a verifiable claim that is written to a blockchain. For example, a distributed attestation may be a verifiable claim that attests to the presence of an entity at a particular location and time, a verifiable claim that attests to the custody of an asset by a user at a particular location and time, or some other verifiable claim. A distributed attestation may be reusable to verify a claim to various entities. A distributed attestation may include a secured representation of a blockchain address of an entity associated with a claim and/or a secured representation of a blockchain address of a location associated with a claim. A permissioned entity may be configured to verify the claim by determining clear versions of the secured representations of the blockchain addresses.

As used herein, the term "centralized identity" generally refers to an identity of an entity that is created off-chain and maintained by a centralized entity. For example, a centralized identity may refer to a username maintained on an active directory service, an email address associated with a domain, etc.

The ability of present day systems to prove identify of location, identity of transacting parties, and/or identity of assets for various business purposes in a distributed way and also for complying with privacy requirements (e.g., supply chain management, transaction provenance, generating verifiable claims, etc.) is limited. To this end, implementations of the disclosure are directed to systems and methods for addressing these problems. Particularly, the disclosure describes systems and methods that leverage distributed ledger technology and secured representations of blockchain addresses to address these problems.

Method and system for proof of presence of an entity through advertisement at a location and time that are based on Blockchain and other Distributed Ledger Technologies.

First, when it comes to an entity (e.g., user of a mobile device) proving its presence at a particular location at a particular point in time, some existing authentication systems may only be able to prove identity. While location-based tracking mechanisms such as a global positioning system (GPS) exist, such mechanisms may not have inbuilt security mechanisms that are connected to the identity of the entity. Location-based tracking systems such as GPS may also not be foolproof to tampering or usable in all locations, i.e., indoors. Additionally, even if location and identity data could be captured in a trusted way, some present day systems may not able to store and share this data in a secure way across multiple entities. Further, because trustable and sharable digital attestations (e.g., digital certificates) that attest to an entity's presence at a particular location at a particular time may not be possible with some present day systems, attestations may need to be created each time a process is performed, which may introduce process inefficiencies. and distribution of attestation and decentralized ownership of information may be impossible in at least some traditional systems.

Figure 3:
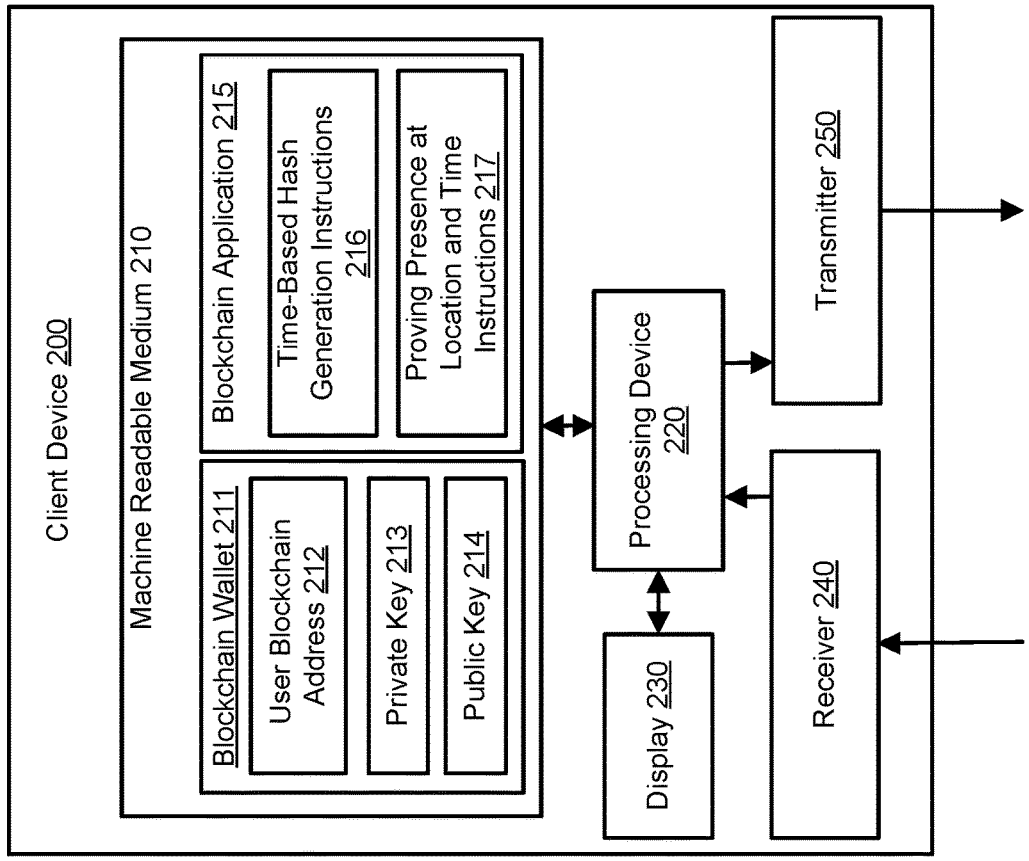
FIG. 3 is a block diagram illustrating an example architecture of components of a client device, in accordance with implementations of the disclosure.
Figure 2:
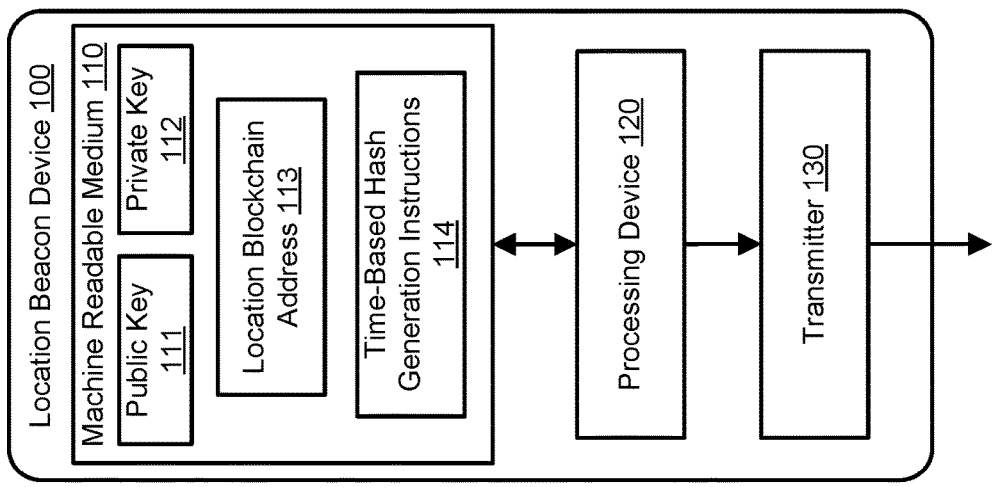
FIG. 2 is a block diagram illustrating an example architecture of components of a location beacon, in accordance with implementations of the disclosure.
Figure 4:
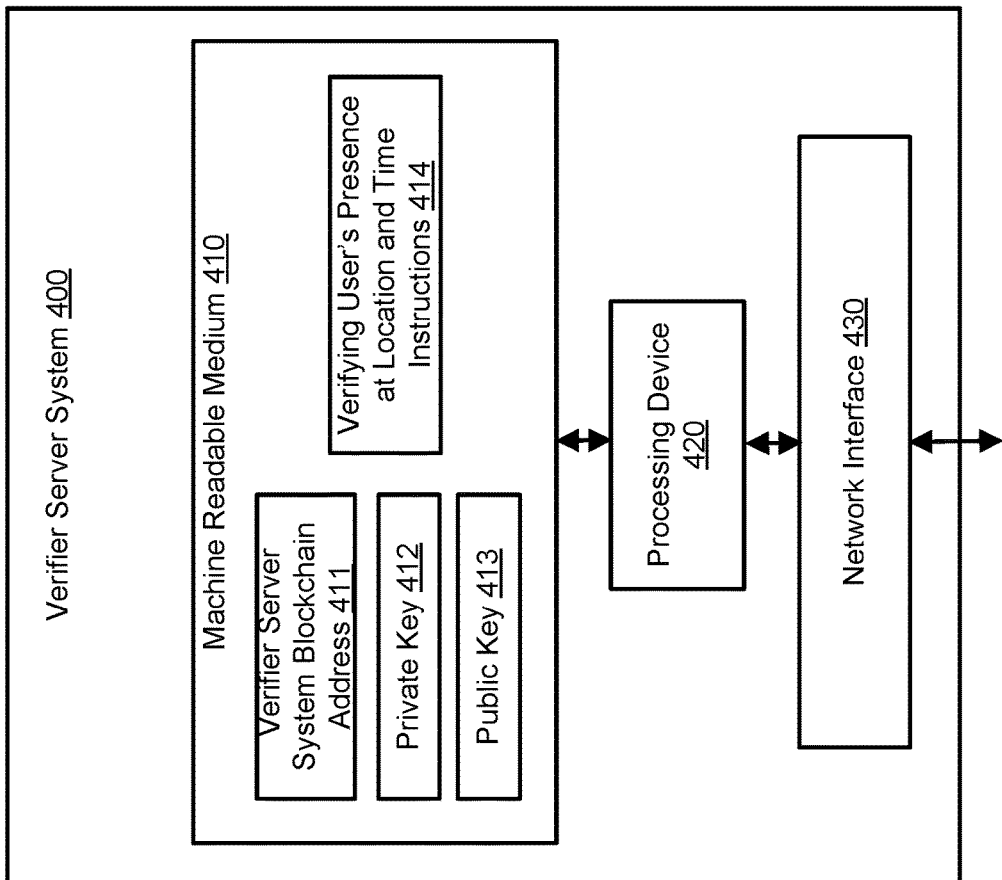
FIG. 4 is a block diagram illustrating an example architecture of components of a verifier, in accordance with implementations of the disclosure.

FIG. 1 is a diagram illustrating an example environment that uses location beacon devices 100-1 to 100-N (individually referred to as a location beacon 100) and a blockchain network 300 including a verifier server system 400 ("verifier 400") to prove the presence of a user of client device 200 at a particular location and time, in accordance with implementations of the disclosure. FIG. 1 will be described in conjunction with FIGS. 2, 3, and 4, which are block diagrams respectively illustrating an example architecture of components of a location beacon 100, client device 200, and verifier 400, in accordance with implementations of the disclosure.

In the example environment of FIG. 1, each location beacon device 100 is configured to transmit (e.g., broadcast) a beacon including a secured representation of a location's blockchain address. In particular, each location beacon device 100 may be provisioned with a blockchain address 113 that is associated with a particular location in the real world (e.g., in environment 50) from which the location beacon device 100 transmits beacons. To this end, each location beacon device 100 may remain fixed to the location corresponding to its provisioned blockchain address 113.

For example, a provisioned blockchain address 113 may be used to identify a pair of longitudinal and latitudinal coordinates, a specific indoor location, a specific outdoor location, an object having a fixed and known location, etc. In some implementations, the location may comprise a geographical area or range from which signals may be received from the location beacon device 100 (e.g., before signal attenuation). A mapping between each provisioned blockchain address 113 and its associated location may be maintained by a central entity such as a node 350 on blockchain network 300 or a device that is off chain. For example, a blockchain address mapping server system 390 may maintain a mapping between a provisioned location blockchain address and an associated location in a location blockchain address database 391. This mapping may be taken care of during the provisioning process. It should be noted that although multiple location beacon devices 100 are illustrated in the example of FIG. 1, in some implementations, the technology disclosed herein may be implemented with a single location beacon device 100.

By virtue of a location beacon 100 transmitting a secured one time advertisement as a representation of a location blockchain address, which is associated with a location, information broadcast by a location beacon 100 may be secured from exposure and tampering from unauthorized entities. The beacons used may prevent tampering, preventing external parties from making any malicious changes in content, location, or operation or copying information from the beacon. For example, when interactions using a blockchain address as an identifier of location occur in the open, passive sniffers or other attacking devices may be able to gather location information belonging to an organization, but the advertisements being one time advertisements are of no use after a particular short time period.

Each location beacon device 100 may include a machine readable medium 110, a processing device 120, and a transmitter 130. The transmitter 130 of location beacon device 100, in some implementations, may utilize a short-range transmission technology such as Bluetooth®, Bluetooth® Low Energy (BLE), radio-frequency identification (RFID), Wi-Fi®, Near-Field Communication (NFC), Zigbee, and the like. In other implementations, the location device 100 may utilize other transmission technologies such as cellular transmission, satellite transmission, LORA, SIGFOX, etc.

The machine readable medium 110 may store the location beacon device's blockchain address 113, and a public key 111 and private key 112 corresponding to the location blockchain address 113. For example, a cryptographic algorithm such as ECDSA may be used to derive a private key 112, a public key 111 may be derived from the private key, and a blockchain address 113 may be derived from the public key 111 by applying additional cryptographic algorithm(s). In some implementations, public key 111 and location blockchain address 113 are the same, in which case machine readable medium 110 may store private key 112 and blockchain address 113. Location beacon device 100 may be provisioned with public key 111 (if different from blockchain address 113) and private key 112 during configuration of location beacon device 100. Some deployments may not require the private key to be provisioned to the beacon and may just have the public key, the blockchain address, and/or an ID as a reference to the blockchain address.

Each location beacon device 100 may include time-based hash generation instructions 114 that, when executed by processing device 120, apply a time-based cryptographic hashing algorithm to location blockchain address 113 to generate a secured representation of the location blockchain address. The secured representation of the location blockchain address may be generated by applying a one-time cryptographic hashing algorithm using a current timestamp and the location blockchain address. The current timestamp may be obtained from processing device 120 (e.g., from a clock of the processing device). A suitable time-based, hash-based message authentication code (HMAC) algorithm may be utilized to generate the secured representation of the blockchain address. As illustrated in the example of FIG. 1, application of one-time cryptographic hashing algorithm generates a beacon including a time-based one time advertisement (TOTA) including the secured representation of the location blockchain address provisioned in beacon device 100 (illustrated in FIG. 1 as TOTA-L1(B, T) for beacon device 100-1 at time T and TOTA-L2(B3, T+2) at time T+2 for beacon device 100-N).

In some implementations, for added security, an encrypted location blockchain address 113 is stored in machine readable medium 110 of the constrained device 102. In such implementations, the encrypted location blockchain address 113 is decrypted prior to applying the time-based cryptographic hashing function to produce the secure representation of the blockchain address.

In some implementations, a location beacon device 100 may be implemented as a one-way transmitter to a receiving device within range (e.g., client device 200) that broadcasts a TOTA. For example, a location beacon device 100 may be implemented as a one-way Bluetooth® beacon device.

Although each location beacon device 100 is illustrated in FIG. 1 as transmitting beacons using radio frequency (RF) waves, it should be appreciated that, in some implementations, a location beacon device 100 may transmit a beacon using some other communication method such as a wired communication method (e.g., over coaxial and/or optical cables), a free space optical communication method (e.g., infrared, visible laser, etc.), or in a modulated soundwave (e.g., audible, subsonic, ultrasonic, etc.).

In an alternative implementation, each location beacon device 100 may instead be implemented as a device that displays data that is scanned to obtain a secured of its provisioned location blockchain address. For example, a location beacon device 100 may display a QR code or other barcode including an embedded secured representation of the location blockchain address, and a client device 200, may scan the QR code (e.g., using a camera) to receive the secured representation of the location blockchain address. In such implementations, the secured representation of the location blockchain address embedded in the QR code may periodically change (e.g., depending on a configured time of the time-based hashing algorithm).

In another implementation, rather than having a location beacon device 100 that broadcasts a secured representation of a blockchain address or displays a secured representation of a blockchain address, a fixed advertisement having a secured representation of a location blockchain address may be scanned by client device 200 to obtain a secured representation of a location blockchain addresses. As used throughout the disclosure, the term "scanning" may generally refer to using any suitable scanning technique to read a value, including video or image capture, infrared light capture, laser capture, manual data entry of a value, ultrasonic or subsonic scanning techniques, manual data entry, RFID-based scanning, scanning a 2D/3D barcode, using a wired technology to scan, etc.

Referring now to client device 200, a user of client device 200 within range (e.g., wireless transmission range) of a location beacon device 100 is configured to prove their presence in the location of a beacon device 100 at a particular time. As further described below, a client device 200 may interact with a verifier 400 in an interactive proving protocol that uses location level advertisements (e.g., secured representation of location blockchain address) and a personalized random string (e.g., secured representation of user's blockchain address) to prove the presence of the user of the client device a particular location at a particular time. As a result of the interactive proving protocol, a distributed attestation may be created on a blockchain that attests to the presence of the user of client device 200 at a given location and time. Alternatively, a verifiable claim may be created off of the blockchain, or a reference to a verifiable claim may be created on the blockchain.

As illustrated in FIG. 1, client device 200 may be a mobile device such as a smartphone, tablet, or notebook computer. In some implementations, client device may be implemented as a wearable device (e.g., smartwatch or head mounted display (HMD) device). In further implementations, client device may be implemented as a vehicle, a gaming device, a desktop computer, or any other type of device that may be configured to prove its presence at a particular location at a particular time, in accordance with implementations of the disclosure.

A client device 200 may include a machine readable medium 210, a processing device 220, a display 230, a receiver 240, and transmitter 250.

Receiver 240 may be to receive beacons broadcast by location beacon devices 100 and communications (e.g., interactive question for proving presence, verification that user's presence has been proven) from verifier 400 during a process for proving the presence of a user of client device 200 at a particular location and time (further discussed below). In implementations, receiver 240 may comprise multiple receivers (e.g., a receiver to receive beacons and a receiver to receive communications from a verifier 400). For example, receiver 240 may comprise a Bluetooth® receiver for receiving Bluetooth® beacons from a location beacon device 100, and a cellular or Wi-Fi® receiver for receiving communications from a verifier 400.

Transmitter 250 may be to transmit communications to verifier 400 (e.g., responses to interactive questions for proving presence, verification that user's presence has been proven) during a process for proving the presence of the user of client device 200 at a particular location and time (further discussed below). For example, transmitter 250 may be implemented as a cellular transmitter, a Wi-Fi® transmitter, a satellite communications transmitter, or some combination thereof. It should be appreciated that although receiver 240 and transmitter 250 are illustrated as being separate devices, in some implementations they may be implemented as a transceiver.

Communications between client device 200 and verifier 400 may be occur over a communication network 275. Communication network 275 may comprise any communications network suitable for exchanging communications between a client device 200 and verifier 400. Some non-limiting examples of communication mediums over which client device 200 and verifier server 400 may connect to a communication network 275 include: wired communications mediums, such as cable, fiber-optic, or DSL; or wireless communications mediums, such as Wi-Fi®, cellular communications, or satellite communications. In some instances, a plurality of these communication mediums may be utilized. In some implementations, communication network 275 may be implemented as an intranet network (e.g., enterprise, campus, or personal intranet).

Communication network 275 may include one or more access points (APs) 276. An AP can refer to an access network node that can be used by an electronic device to gain access to a network. An AP 276 may be part of a wireless network (e.g., a Wi-Fi® network). An AP 276 may refer to a Wide Area Network) WAN or Low Power Wide Area Network (LPWAN) base station or transmission system base station, another low power long range access network (e.g., LORA and SIGFOX) node, or an access node of a cellular network. Where communication network 275 includes a wired portion, an AP 276 may include a bridge, switch or router (or multiple switches/routers) to allow for communication of data with other nodes.

Machine readable medium 210 of client device 200 may include a blockchain wallet 211 and blockchain application 212. The blockchain wallet 211 may store the user's blockchain address 212, a public key 214 and private key 213 corresponding to the user's blockchain address 212. For example, a public key 214 may be derived from the private key 213, and the user's blockchain address 212 may be derived from the public key 214 by applying additional cryptographic algorithm(s). In some implementations, public key 214 and blockchain address 212 are the same, in which case machine readable medium 210 may store private key 213 and blockchain address 212. In some implementations, blockchain wallet 211 may be a subcomponent of blockchain application 215.

Client device 200 may utilize blockchain application 215 to interact with verifier 400 on blockchain network 300 as part of the process of proving the presence of the user of client device 200 at a particular location at a particular time. To this end, blockchain application 215 may include time-based hash generation instructions 216 and proving presence at location and time instructions 217 that may be executed by a processing device 200 to prove the presence of the user of client device 200 at a particular location at a particular time.

Time-based hash generation instructions 216, when executed by processing device 220, apply a time-based cryptographic hashing algorithm to user blockchain address 212 to generate a secured representation of the user blockchain address. The secured representation of the user's blockchain address may be generated in substantially the same manner as described above with reference to location beacon device 100. For example, the secured representation of the user's blockchain address may be generated by applying a one-time cryptographic hashing algorithm using a current timestamp and the user's blockchain address. The current timestamp may be obtained from processing device 220 (e.g., from a clock of the processing device). In some implementations, the client device 200 may use the same time-based cryptographic hashing algorithm as a beacon device 100. In other implementations, a different time-based cryptographic hashing algorithm may be used.

As illustrated in the example of FIG. 1, application of one-time cryptographic hashing algorithm generates a TOTA including a secured representation of the user's blockchain address 212 (illustrated in FIG. 1 as TOTA-P1 (B2, T+2). In some implementations, time-based hash generation instructions 216 may iterate to generate secured representations of the blockchain address of user of client device 200, independent of whether a process is initiated to prove the presence of the user of client device (e.g., by executing proving presence at location and time instructions 217).

By virtue of client device 200 transmitting a secured representation of the user's blockchain address, which may be associated with an individual representing an enterprise or an individual acting on their own, personal information and/or enterprise sensitive information may be secured from exposure and tampering from unauthorized entities.

In some implementations, for added security, an encrypted user blockchain address 212 is stored in machine readable medium 210 of the client device 200. In such implementations, the encrypted user blockchain address 212 is decrypted prior to applying the time-based cryptographic hashing function to produce the secured representation of the blockchain address.

It should be noted that although client device 200 is illustrated as communicating on-chain with verifier 400 in the example environment 50, in other implementations, communications between client device 200 and verifier 400 may occur off-chain. Moreover, although client device 200 is illustrated as being outside of blockchain network 300, it should be appreciated that client device 200 may function as a node on blockchain network 300. For example, client device 200 may function as a limited access node that may write or view transactions on blockchain network 300, but may not validate transactions on blockchain network 300.

Referring now to blockchain network 300, blockchain network 300 may be implemented as a consortium blockchain network. For example, blockchain network 300 may be implemented by an enterprise consortium of companies that operate the blockchain for specific applications, including the verification of an individual's identity at a particular location and time. Blockchain network 300 may include a plurality of nodes (e.g., verifier 400 and consortium participant blockchain nodes 350 and other components as needed depending on the type of blockchain implementation) that may validate transactions such as distributed attestation transactions that create an immutable record on a blockchain that may be used to prove an individual's presence at a particular location and time. Some or all blockchain nodes may store a respective copy of a blockchain that contains a chronologically ordered, back-linked list of blocks, including attestation transactions made between client devices 200 and verifiers 400 in the blockchain network 100. In some implementations, nodes on blockchain network 300 (e.g. client device 200) may be able to write transactions, but not verify transactions. It should be appreciated that although a single verifier 400 is illustrated in the example of FIG. 1, other blockchain nodes 350 may also operate as a verifier to prove other claims made by other client devices.

A verifier 400 within blockchain network 100 may be configured to engage in an interactive proving protocol with a client device 200 to verify that the user of client device 200 is present at a particular location at a particular time. Following verification, verifier 400 may create a distributed attestation on the blockchain that attests to the presence of the user of client device 200 at a given location and time.

As further described below, a client device 200 may interact with a verifier 400 in an interactive proving protocol that uses location level advertisements (e.g., location beacon secured representation of blockchain address) and a personalized random string (e.g., secured representation of blockchain address corresponding to the user of client device) to prove the user's presence at a particular location at a particular time. As a result of the interactive proving protocol, a distributed attestation may be created on a blockchain that attests to the presence of a user of client device 200 at a given location and time.

As shown, a verifier 400 may include a machine readable medium 410, processing device 420, and network interface 430. Machine readable medium 310 may store a blockchain address 411 corresponding to the verifier server system, and a private key 412 and public key 413 corresponding to the blockchain address 411. Machine readable medium 410 may also store instructions 414, that when executed by a processing device 420, verify the presence of a user of the client device at a particular location at a particular time.

Network interface 430 may be to communicate with client device 200 (e.g., over communication network 275). Network interface 430 may also be to communicate with a blockchain address mapping server system 390, which as further described below, is configured to maintain a mapping between clear and secured representations of blockchain address provisioned at location beacons 100 and client devices 200. Although blockchain address mapping server system 390 is illustrated in the example of FIG. 1 as being separate from verifier 400, in some implementations blockchain address mapping server system 390 may be integrated into verifier 400. Moreover, although blockchain address mapping server system 390 is illustrated as operating outside the blockchain network 300, in some implementations it may operate on the blockchain network 300.

Figure 5:
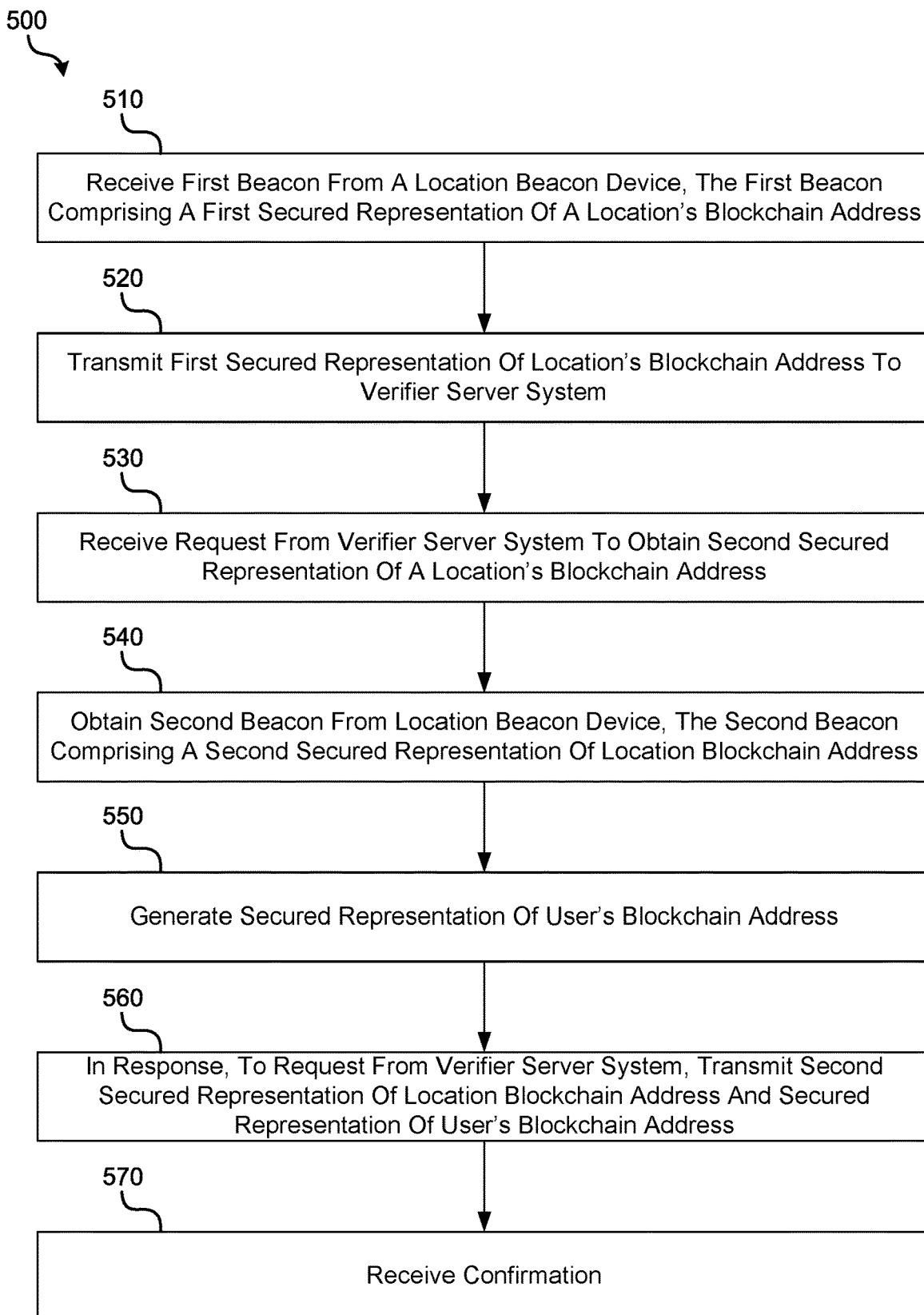
FIG. 5 is an operational flow diagram illustrating an example method that may be implemented by a user of client device to prove that the user is present at a particular location at a particular time, in accordance with implementations of the disclosure.

FIG. 5 is an operational flow diagram illustrating an example method 500 that may be implemented by a user of client device 200 to prove that the user is present at a particular location at a particular time, in accordance with implementations of the disclosure. Method 500 may be implemented by a processing device 220 executing time-based hash generation instructions 216 and proving presence at location and time instructions 217.

At operation 510, the client device 200 receives a first beacon from a first location beacon device 100, the first beacon comprising a first secured representation of a location blockchain address. For example, as illustrated in the example of FIG. 1, client device 200 may receive the one time advertisement TOTA-L1 from location beacon device 100-1. In implementations, client device 200 may be configured to automatically receive beacons transmitted by location beacon devices 100 once it is within reception range. Such functionality may enabled by running a blockchain application 215 as a background task on the client device 200. In some implementations, a user of client device 200 may be presented with a query (e.g., via display 230) asking if the user wishes to initiate a process for verifying presence at a particular location and time.

At operation 520, the client device 200 transmits the first secured representation of the location beacon device's provisioned location blockchain address to a verifier 400. At operation 530, the client device 200 receives a request from the verifier to obtain a second secured representation of a location blockchain address that is provided by a location beacon device that is in substantially the same (or the same) location as the first location beacon device. The response message received from verifier 400 may be in accordance with an interactive proving protocol by which a verifier server system asks a client device one or more questions to generate data that proves the user's presence at a particular location at a particular time. The interactive proving protocol may be initialized by the client device 200 transmitting the first secured representation of the location blockchain address to verifier 400, before that period, or by the verifier 400 in response to receiving the first secured representation of the location blockchain address. For example, in some implementations the verifier 400 may ask the client device to capture a beacon at a later time (e.g., within 2 minutes, 5 minutes, etc.) from a second location beacon device in the vicinity of the first location beacon device. As another example, the verifier 400 may ask the client to capture a second beacon from the first location beacon device at a later time (e.g., 1 minute, 3 minutes, 5 minutes, etc.) In some implementations, the request may also include a request for the client device to provide a secured representation of the user's blockchain address. It should be appreciated that the questions asked by the prover during an interactive proving protocol may vary depending on the implementation, and that the interactive request made by the verifier (e.g., questions asked) may be different for different provers (e.g. different users of different client devices) at different times. The client device may only be able to answer the questions of the interactive proving protocol (e.g., obtaining different secured representations of location blockchain addresses) if a user of the client device is physically present in the location of the first location beacon device.

By virtue of client device 200 capturing a second secured representation of a location beacon device's blockchain address at a later time and in the same general location (or the same location) as the first secured representation of a location beacon device's blockchain address, an additional layer of security may be introduced into system 50. For example, even in situations where a malicious party cracks the time-based hashing algorithm for one beacon at a particular time, the system may be safeguarded if the party is unable to crack the time-based hashing algorithm at a later time (either for the same location beacon device or for a different location beacon device).

At operation 540, the client device 200 obtains a second beacon from a location beacon device 100, the second beacon comprising a second secured representation of a location's blockchain address. The second secured representation of the location's blockchain address may be generated by the same location beacon device or a second location beacon device in the same or substantially the same location as the first location beacon device.

At operation 550, the client device 200 generates a secured representation of the user's blockchain address. For example, a processing device 220 may execute time-based hash generation instructions 216 to generate the secured representation of the user's blockchain address.

At operation 560, the client device 200 transmits, to verifier 400, the second secured representation of a location blockchain address and the secured representation of the user's blockchain address. For instance, as illustrated in the example of FIG. 1, client device 200 transmits TOTA-P1 and TOTA-L2 captured at time T+2.

In alternative implementations, the client device 200 may generate the secured representation of the user's blockchain address and then transmit it to the verifier with the first secured representation of the location blockchain address (e.g., during operation 520).

In alternative implementations, the client device 200 may receive, in a single beacon, a first secured representation of the location's blockchain address generated at a first time, and a second secured representation of the location's blockchain address generated at a second time after the first time. In such instances, the beacon device may broadcast two different secured representations of blockchain addresses at a time to obviate the need for more than one round of questioning (e.g., skip operations 530-540) between the client device and verifier.

At operation 570, client device 200 receives a confirmation message from verifier 400 that the user's presence has been verified at a particular location at a particular time. In implementations, the confirmation message may identify a blockchain transaction identifier (ID) of a distributed attestation transaction stored on the blockchain of blockchain network 300. The distributed attestation transaction stored on the blockchain may be digitally signed by verifier 400 and digitally attest to the user's presence at a particular location at a particular time. The distributed attestation transaction may be reusable to by a user of client device 200 to prove, to various entities (e.g., various members of the blockchain consortium) that it was present at the particular location at the particular time.

For example, upon successful verification, without revealing the identity of the client device or the location, verifier 400 may sign a transaction submitted by the client device containing the TOTA of location and TOTA of the user and publish it in to the blockchain and send the ID of this transaction to the client device. The client device may then lookup, on the blockchain, the transaction associated with the ID. This may be referred to as an example of a distributed attestation. In implementations where the proof is only location TOTA based verifications without the user TOTA, the verifier may sign the transaction with its private key and send it to the client or in a private channel to a group of preapproved trusted parties. In the future, the user may use this signed attestation as a proof that it was at a location and validated by the verifier.

It should be noted that, in some implementations, each of the messages transmitted from client device 200 to verifier 400 (e.g., at operations 520 and 560) may be digitally signed by client device 200 using a stored private key 213. Such a mechanism may add an additional layer of security as the digital signatures may be used to ensure that the message originated from the user of client device 200.

In alternative implementations of method 500, rather than receiving beacons containing secured representations of location blockchain addresses, client device 200 may scan fixed advertisements containing secured representations of location blockchain addresses.

Figure 6:
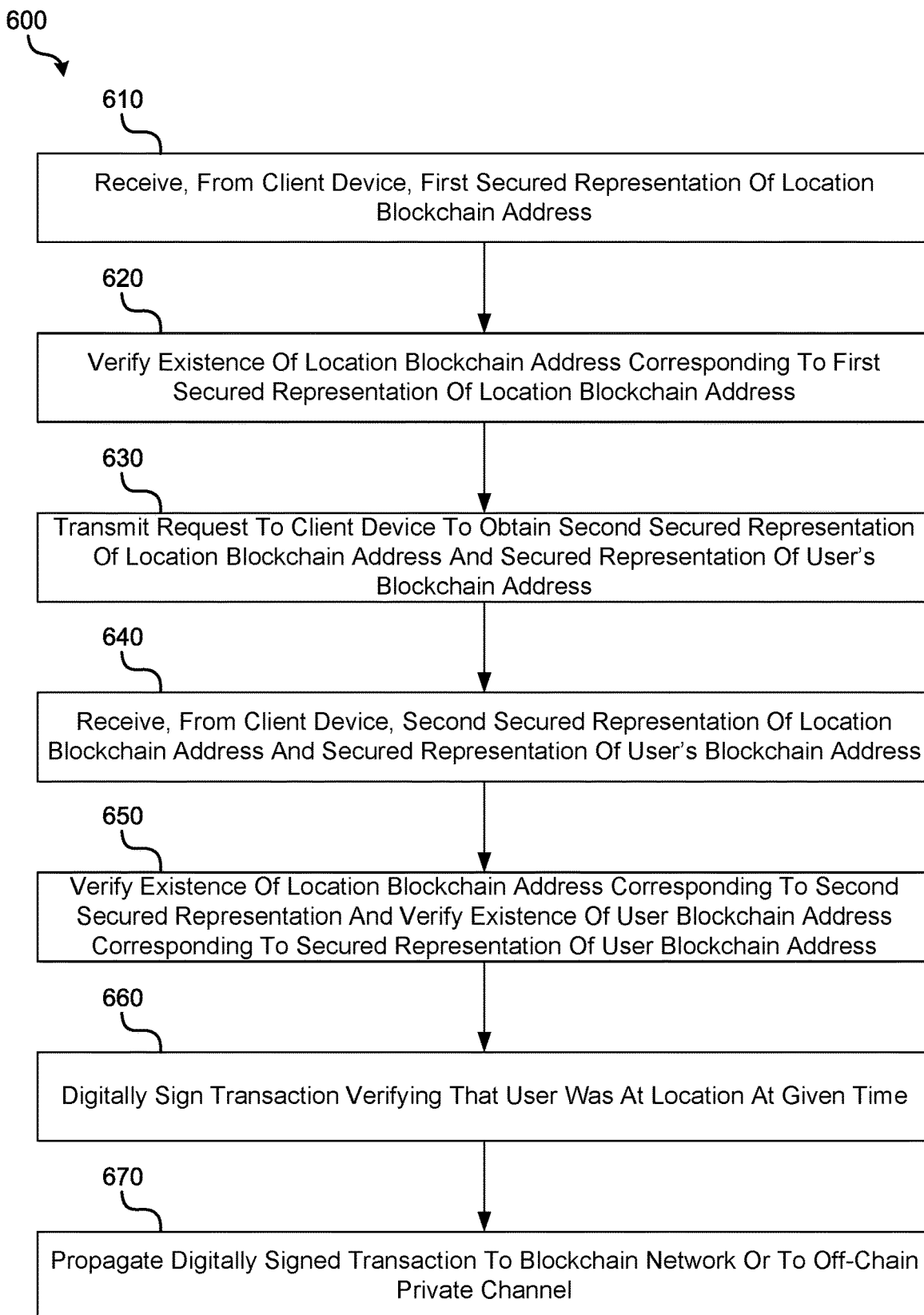
FIG. 6 is an operational flow diagram illustrating an example method that may be implemented by a verifier to verify that a user of client device is at a particular location at a particular time, and to create a distributed attestation on a blockchain that attests to the presence of the user of client device at the location and time, in accordance with implementations of the disclosure.

FIG. 6 is an operational flow diagram illustrating an example method 600 that may be implemented by a verifier 400 to verify that a user of client device 200 is at a particular location at a particular time, and to create a distributed attestation on a blockchain that attests to the presence of the user of client device 200 at the location and time, in accordance with implementations of the disclosure. Method 600 may be implemented by a processing device 420 executing instructions 414 for verifying user presence at location and time.

At operation 610, verifier 400 receives from client device 200 a message including a first secured representation of a location's blockchain address (e.g., TOTA-L1). At operation 620, verifier 400 verifies the validity of the received first secured representation of the location blockchain address. In particular, verifier 400 may query blockchain address mapping server system 390 to perform this verification. As illustrated, blockchain address mapping server system 390 may include a location blockchain address database 391 of location blockchain addresses (e.g., location blockchain addresses that were registered to location beacon devices 100 during provisioning), and time-based hash generation instructions 392 that may generate a secured representation of the location blockchain addresses. In particular, location time-based hash generation instructions 392 may apply the same time-based hashing algorithm to a blockchain address as time-based hash generation instructions 114 generate the same secured representation of the location blockchain addresses.

The secured representations of location blockchain addresses generated using location time-based hash generation instructions 392 may be stored in location blockchain address database 391 to maintain a mapping between clear versions of location blockchain addresses and secured versions of location blockchain addresses. In implementations, the mapping between secured representations of location blockchain addresses and clear versions of location blockchain addresses may be maintained in a table or other data structure of database 391. As such, in response to a query received from verifier 400 to verify the validity of a secured representation of a location blockchain address, blockchain address mapping server system 390 may perform a lookup function in database 391 to take the secure representation of the location blockchain address received in a query from verifier 400, and retrieve a corresponding clear version of the location blockchain address that is returned to verifier 400. By virtue of verifier 400 communicating with the blockchain address mapping system 390, verifier 400 may determine the identity (in the form of a clear version of the blockchain address) of the location from which client device 200 received a one-time advertisement.

In some implementations, to account for a lack of time synchronization between a location beacon device 100 and the blockchain address mapping system 390, the blockchain address mapping server system 390 may configure a time offset period that represents the difference in time synchronization between a location beacon device 100 and the blockchain address mapping system 390.

Referring again to FIG. 6, at operation 630, verifier 400 transmits a request to client device 200 to obtain a second secured representation of a location blockchain address and secured representation of the user's blockchain address. The request may be transmitted in accordance with an interactive proving protocol whereby verifier 400 asks client device 200 one or more questions to prove the presence of the user of client device 200 at a particular location. For example, the request may ask that the client device 200 retrieve, at a particular time, a second secure representation of a location blockchain address and a secured representation of the user's blockchain address. To prevent tampering, the later time may be sufficient for the time-based hash generation instructions of each of the location beacon and client device to generate a new value. In implementations, verifier 400 is configured to accept only one usage of a TOTA. In such implementations, a second time usage of the same TOTA for verification may be considered a failed attempt by the verifier.

At operation 640, in response to the request, verifier 400 receives from client 200 a message including a second secured representation of a location blockchain address (e.g., TOTA-L2) and a secured representation of the user's blockchain address (e.g., TOTA-P1). At operation 650, verifier 400 verifies the validity of the received second secured representation of a location blockchain address and the secured representation of the client's blockchain address. In particular, verifier 400 may query blockchain address mapping server system 390 to perform this verification.

Blockchain address mapping server system 390 may verify the validity of the received second secured representation of a location blockchain address in substantially the same manner it verifies the validity of the received first secured representation of a location blockchain address. Additionally, as illustrated in the example of FIG. 1, blockchain address mapping server system 390 may also include a user blockchain address database 393 of blockchain addresses associated with users of client devices 200. In some implementations, database 393 and database 391 may implemented as a single database. Blockchain address mapping server system 390 may also include user time-based hash generation instructions 394 to generate a secured representation of user blockchain addresses. In particular, user time-based hash generation instructions 394 may apply the same time-based hashing algorithm to a user blockchain address as time-based hash generation instructions 216 to generate the same secured representation of user blockchain addresses. In some implementations, instructions 394 may apply the same hashing algorithm as instructions 392.

The secured representations of user blockchain addresses generated using time-based hash generation instructions 394 stored in blockchain address mapping server system 390 may be stored in user blockchain address database 393 to maintain a mapping between clear versions of user blockchain addresses and secured versions of user blockchain addresses. The mapping may be maintained in a table or other data structure of database 393. As such, in response to a query received from verifier 400 to verify the validity of a secured representation of a user blockchain address, blockchain address mapping server system 390 may perform a lookup function in database 393 to take the secure representation of the user blockchain address received in a query from verifier 400, and retrieve a corresponding clear version of the user blockchain address that is returned to verifier 400.

By virtue of verifier 400 communicating with the blockchain address mapping system 390 during operation 650, verifier 400 may determine the identity (in the form of a clear version of a user blockchain address) of the user 200 and the identity of a location associated with the second secured representation of a location blockchain address (in the form of a clear version of a location beacon blockchain address) to confirm that the user is present at the location.

At operation 660, verifier 400 may digitally sign an attestation transaction verifying that the user of client device 200 was at a particular location at a particular time. The timestamp of the transaction may be that of the time when a TOTA of the location beacon is valid as checked by the verifier. Verifier 400 may sign the transaction using a private key 412 associated with its blockchain address. At operation 670, verifier 400 may propagate the digitally signed attestation transaction to blockchain network 300 (e.g., to create a distributed attestation transaction on the blockchain), off-chain, or to a private channel that comprises communicating to a subset of participants of the blockchain network in a secured manner. The private channel may be approved for future use by the client to prove its presence at a location at a particular time in the past.

In implementations, the attestation transaction may be broadcast by verifier 400 to all or a subset of nodes 350 on blockchain network 300. In implementations where the digital attestation transaction is broadcast to a subset of nodes 350, the digital attestation transaction may be propagated by receiving nodes 350 to other nodes 350 on the blockchain network 300 that did not receive the broadcast.

Thereafter, the nodes of blockchain network 300 may come to a consensus that validates the attestation transaction and updates the blockchain with a block or a distributed ledger entry including the validated transaction.

After a consensus has been reached by the blockchain network 300, the verifier and other blockchain nodes 350 may receive a new block containing the validated transaction and update their respective copy of the blockchain. After validation, verifier 400 may transmit a confirmation message to client device 200 that its presence at a particular location at a particular time has been verified. The confirmation message may include a reference to the attestation transaction ID of the attestation transaction stored on the blockchain network 350.

As alluded to above, in alternative implementations, to obviate the need for more than one round of questioning, the verifier 400 may receive from the client device 200 first and second secured representations of a location's blockchain address captured at first and second times, where the first and second secured representations of blockchain addresses were received by the client device in the same beacon.

Figure 7:
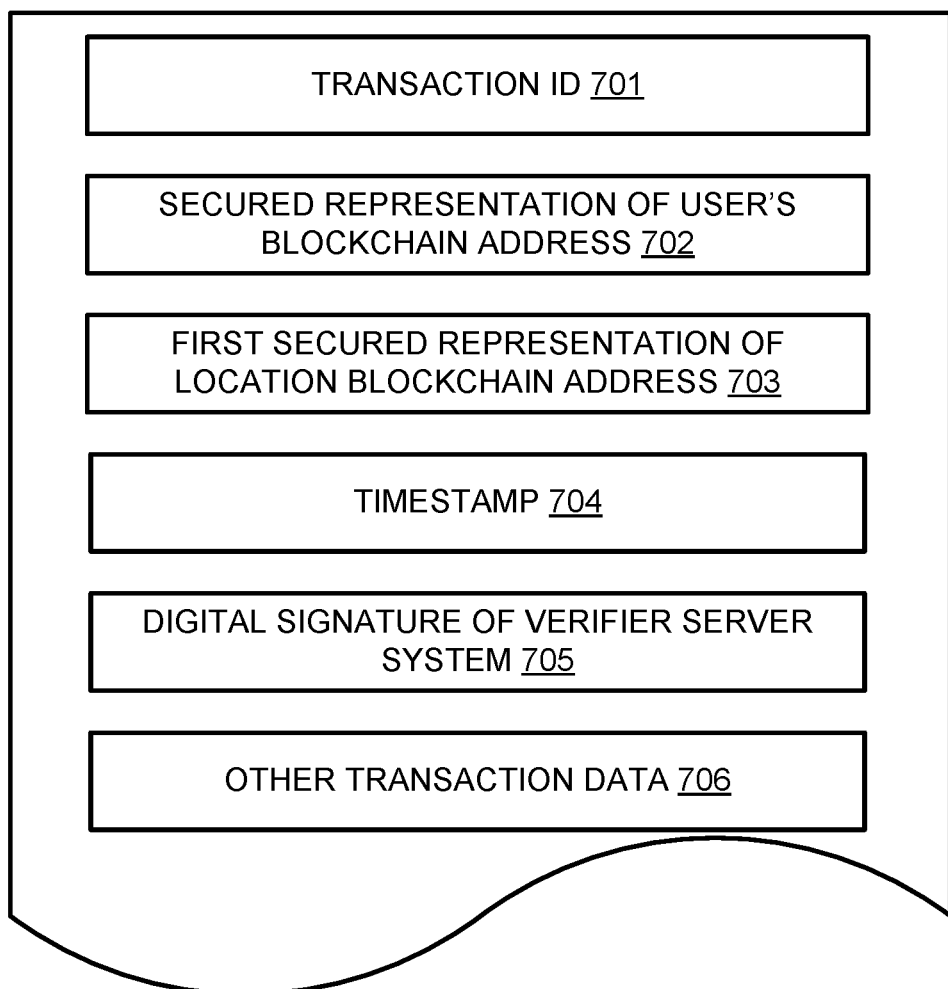
FIG. 7 illustrates an example data structure of a digitally signed attestation transaction verifying that a client device was at a location at a given time, that may be recorded on a blockchain in accordance with implementations of the disclosure.

FIG. 7 illustrates an example data structure of a digitally signed attestation transaction 700 verifying that a client device was at a location at a given time, that may be recorded on a blockchain in accordance with implementations of the disclosure. For example, attestation transaction 700 may be recorded on a blockchain of blockchain network 300. Attestation transaction 700 may include a blockchain transaction ID 701, a secured representation of the user's blockchain address 702, a first secured representation of a location blockchain address 703, a timestamp 704 identifying when the attested event occurred (e.g., when user was at the location), a digital signature 705 of a verifier, and other transaction data 706 (e.g., public keys associated with location, user, and verifier, and a transactional timestamp showing when the attestation was actually granted by the verifier).

Example attestation transaction 700, although available for viewing by other nodes 350 on blockchain network 300, discloses a limited amount of information. In particular, it includes secured representations of blockchain addresses corresponding to a user (e.g., carrier of client device) and location (e.g., location beacon device). By virtue of disclosing a limited amount of information, the location and user associated with transaction 700 may be masked from other nodes 350 that do not need to know this information. For example, only a user associated with the secured representation of the user blockchain address (e.g., a user of client device 200) may provide this information as a verifiable claim to another verifier (e.g., another blockchain node 350) on a need to know basis.

For example, the client device owning the attestation may present it to another verifier that has access to verify the attestation using a blockchain address mapping server system 360. The verifier may also check with the backend database (e.g., blockchain address mapping server system 360) if it is signed by the owner for verification by this verifier. The response from the backend database may just be a 'true' or 'false' response when attestations are submitted for verification. This may prevent any leak of information about individuals and locations despite this being written in to a blockchain. This may provide privacy and security.

In some implementations, rather than storing attestation transaction 700 on the blockchain network, an off-chain reference to a digital attestation may instead be recorded on the blockchain.

Method and system for proving custody with mobile engagement and generate reusable attestation based on Blockchain and other Distributed Ledger Technologies.

Second, when it comes to an entity (e.g., a user of a mobile device) proving its custody of an asset at a particular location at particular time, some authentication systems may not be able to support proof of custody of assets. While photographs and/or videos of the entity and assets may be captured, photographs and videos may be spoofed and difficult to validate. Additionally, as previously mentioned, some present day location-based tracking mechanisms may not be tamper proof, and even if they were, they may not able to store and share location and identity data in a secure way across multiple entities. Further, because trustable and sharable digital attestations that attest to an entity's custody of a particular asset at a particular location at a particular time may not be possible with some present day systems, attestations may need to be created each time a process is performed, which may introduce process inefficiencies.

Figure 8:
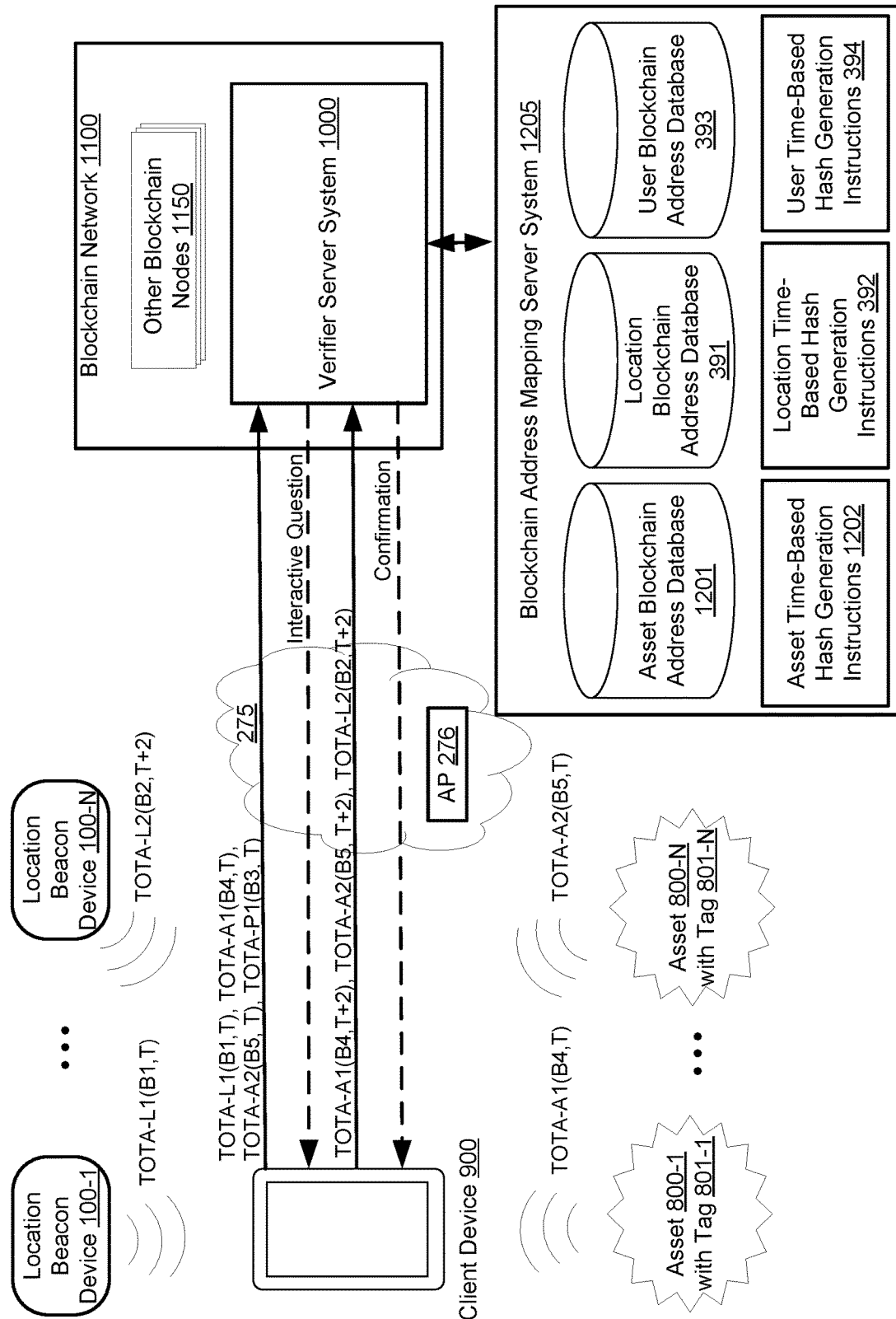
FIG. 8 is a diagram illustrating an example environment that uses location beacon devices, assets with respective tags, and a blockchain network including a verifier to prove the custody of an asset by a user of the client device at a particular location and time, in accordance with implementations of the disclosure.
Figure 10:
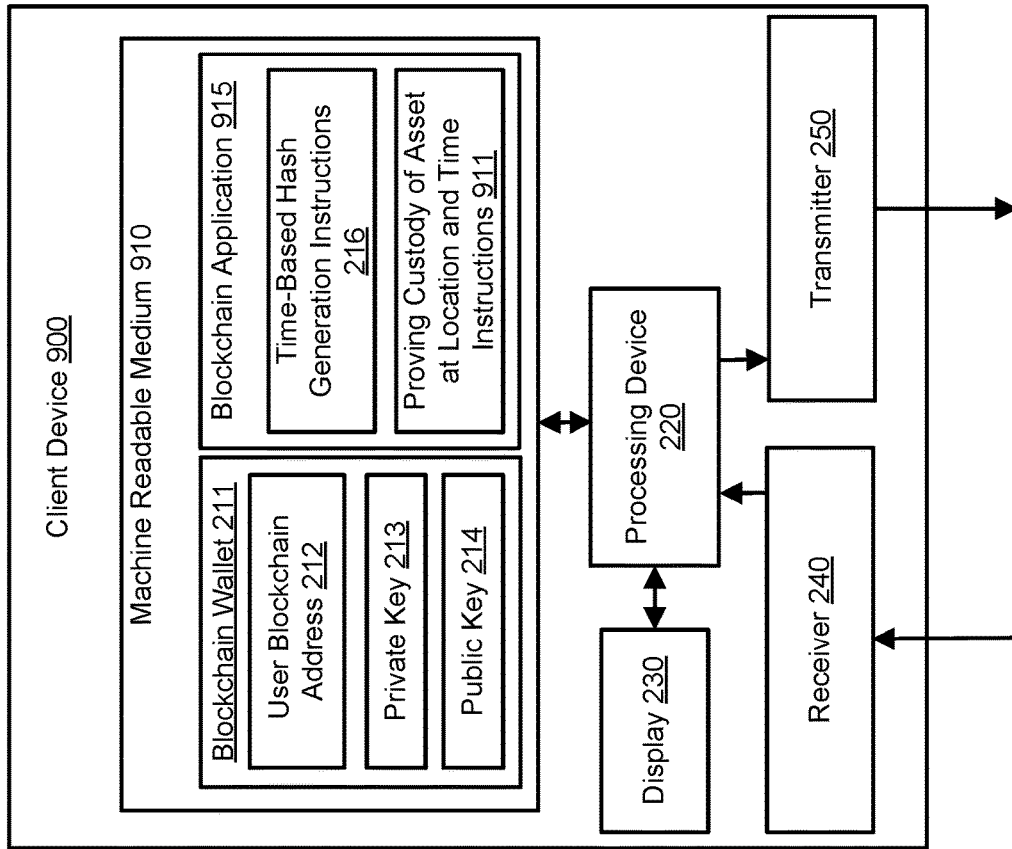
FIG. 10 is a block diagram illustrating an example architecture of components of a client device, in accordance with implementations of the disclosure.
Figure 9:
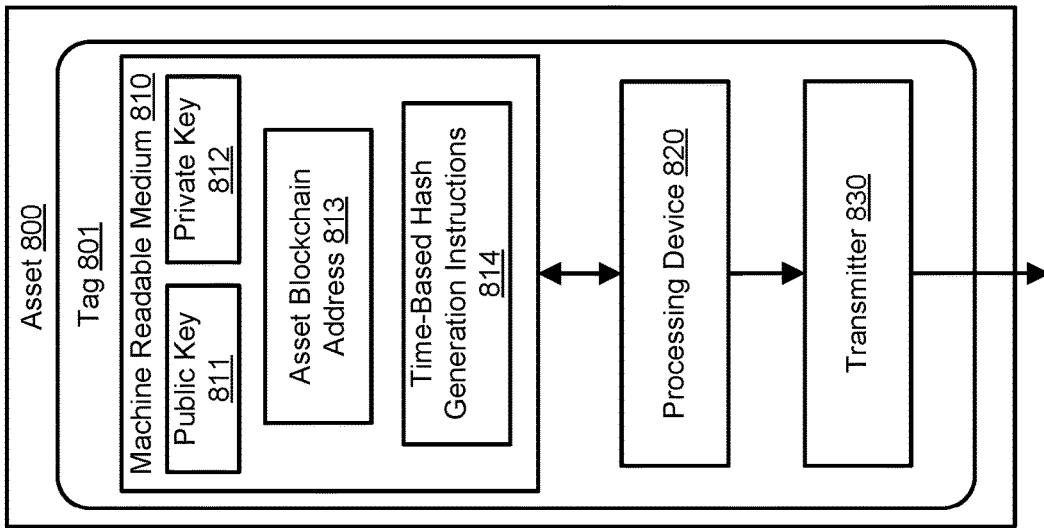
FIG. 9 is a block diagram illustrating an example architecture of components of an asset tag, in accordance with implementations of the disclosure.
Figure 11:
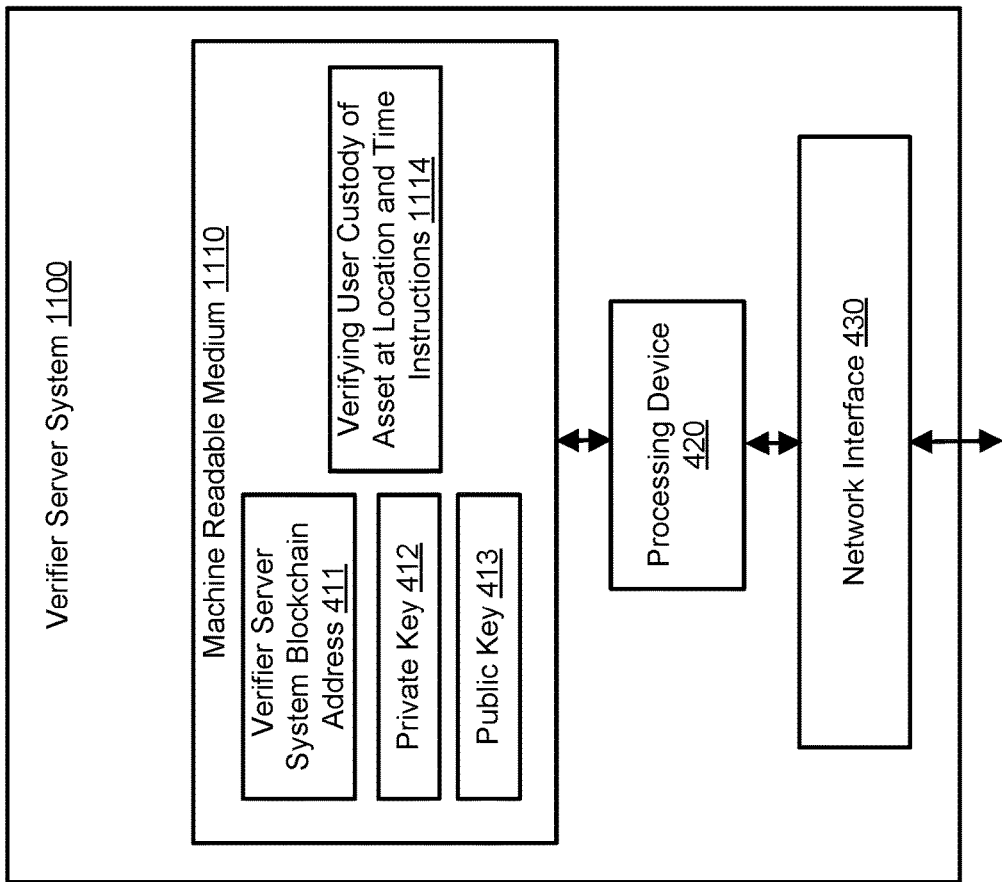
FIG. 11 is a block diagram illustrating an example architecture of components of a verifier, in accordance with implementations of the disclosure.

FIG. 8 is a diagram illustrating an example environment that uses location beacon devices 100-1 to 100-N (individually referred to as a location beacon 100), assets 800-1 to 800-N (individually referred to as an asset 800) with respective tags 801-1 to 801-N (individually referred to as tags 801), and a blockchain network 1100 including a verifier server system 1000 ("verifier 1000") to prove the custody of an asset 800 by a user of client device 900 at a particular location and time, in accordance with implementations of the disclosure. FIG. 8 will be described in conjunction with FIGS. 9, 10, 11, which are block diagrams respectively illustrating an example architecture of components of an asset tag 801 of an asset 800, client device 900, and verifier system 1000, in accordance with implementations of the disclosure.

In the example environment of FIG. 8, each asset 800 may be a bag (e.g., baggage at airport), a package being delivered, jewelry, or any other asset for which it would be beneficial to identify the custodian and location of the asset at a given time. An asset 800 includes an asset tag 801 that is configured to transmit (e.g., broadcast) a beacon including a secured representation of an asset's blockchain address 813 (i.e., a blockchain address associated with asset 800). To this end, an asset tag 801 may be physically coupled to the asset corresponding to the provisioned blockchain address 813. It should be appreciated that although tracking of multiple assets 800 at once is illustrated in the example of FIG. 8, a single asset 800 may be tracked in this environment.

Asset tag 801 may be provisioned with an asset blockchain address 813 when it is coupled to asset 800. Asset tag 801 may be coupled to asset 800 in any suitable manner. For example, asset tag 801 may be removably coupled to a bag or package as an RFID tag or BLE tag. In some implementations, for added security, the coupling between asset tag 801 and asset 800 may be secured (e.g., using a lock) to prevent tampering.

Asset tag 801 may include a machine readable medium 810, a processing device 820, and a transmitter 830. The transmitter 830 of asset tag 801 may utilize a short-range transmission technology such as Bluetooth®, BLE, RFID, Wi-Fi®, Near-Field Communication (NFC), Zigbee, and the like. In other implementations, the asset tag 801 may utilize other transmission technologies such as cellular transmission, satellite transmission, LORA, SIGFOX, etc.

The machine readable medium 810 may store the asset's blockchain address 813, and a public key 811 and private key 812 corresponding to the asset's blockchain address 813. For example, a private key 812, a public key 811 may be derived from the private key, and a blockchain address 813 may be derived from the public key 811 by applying additional cryptographic algorithm(s). In some implementations, public key 811 and asset blockchain address 813 are the same, in which case machine readable medium 810 may store private key 812 and blockchain address 813. Some deployments may not require the private key to be provisioned to the asset tag and may just have the public key, the blockchain address, and/or an ID as a reference to the blockchain address.

Asset tag 801 may include time-based hash generation instructions 814 that, when executed by processing device 820, apply a time-based cryptographic hashing algorithm to asset blockchain address 813 to generate a secured representation of the asset blockchain address. The secured representation of the asset blockchain address may be generated by applying a one-time cryptographic hashing algorithm using a current timestamp and the asset blockchain address. The current timestamp may be obtained from processing device 820 (e.g., from a clock of the processing device). As illustrated in the example of FIG. 8, application of one-time cryptographic hashing algorithm generates a beacon including a TOTA including the secured representation of the asset blockchain address provisioned in asset tag 801 (illustrated in FIG. 8 as TOTA-A1(B4, T) for asset 800).

In some implementations, an asset tag 801 may be implemented as a one-way transmitter that broadcasts a TOTA to a receiving device within range (e.g., client device 900). For example, asset tag 801 may be implemented as a one-way Bluetooth® beacon device.

Although asset tag 801 is illustrated in FIG. 8 as transmitting beacons using radio frequency (RF) waves, it should be appreciated that, in some implementations, it may transmit a beacon using some other communication method such as a wired communication method (e.g., over coaxial and/or optical cables), a free space optical communication method (e.g., infrared, visible laser, etc.), or in a modulated soundwave (e.g., audible, subsonic, ultrasonic, etc.). Moreover, in an alternative implementation, each asset tag 801 may instead be implemented as a device that displays data that is scanned to obtain a secured representation of its provisioned asset blockchain address 813. Further, in another alternative implementation, a fixed advertisement containing a secured representation of an asset blockchain address may be used in place of an asset tag 801. In such implementations, a client device 900 may scan the fixed advertisement to obtain the secured representation of the asset blockchain address.

Referring now to client device 900, a user of client device 900 within range (e.g., wireless transmission range) of a location beacon device 100 and asset tag(s) 801 of asset(s) 800 is configured to prove custody of asset 800 in the location of beacon device 100 at a particular time. As further described below, client device 900 may interact with a verifier 1000 in an interactive proving protocol that uses location level advertisements (e.g., secured representation of location blockchain address), asset level advertisements (e.g., secured representation of asset blockchain address), and a personalized random string (e.g., secured representation of user's blockchain address) to prove the user's custody of the asset(s) at a particular location and time. As a result of the interactive proving protocol, a distributed attestation may be created on a blockchain that attests to the user's custody of the asset(s) at a given location and time.

As illustrated in FIG. 8, client device 900 may be a mobile device such as a smartphone, tablet, or notebook computer. In some implementations, client device may be implemented as a wearable device (e.g., smartwatch or HMD device). In further implementations, client device may be implemented as a vehicle, a gaming device, a desktop computer, or any other type of device that may be configured to prove a user's custody of an asset at a particular location at a particular time, in accordance with implementations of the disclosure.

A client device 900 may include a machine readable medium 910, a processing device 220, a display 230, a receiver 240, and transmitter 250.

In the environment of FIG. 8, receiver 240 may be to receive beacons broadcast by location beacon devices 100, beacons broadcast by an asset's asset tag 801, and communications (e.g., interactive question for proving custody, verification that user's custody has been proven) from verifier 1000 during a process for proving the custody of asset 800 by a user of client device 900 at a particular location and time. In implementations, receiver 240 may comprise multiple receivers (e.g., a receiver to receive beacons and a receiver to receive communications from a verifier 1000). Transmitter 250 may be to transmit communications to verifier 1000 (e.g., responses to interactive questions for proving custody) during a process for proving the custody of the user of client device 900 at a particular location and time. Communications between client device 900 and verifier 1000 may be occur over a communication network 275, which may be any communications network suitable for exchanging communications between a client device 900 and verifier 1000.

Machine readable medium 910 of client device 900 may include a blockchain wallet 211 and blockchain application 915. The blockchain wallet 211 may store the user's blockchain address 212, and a public key 214 and private key 213 corresponding to the user's blockchain address 212. In some implementations, blockchain wallet 211 may be a subcomponent of blockchain application 915.

Client device 900 may utilize blockchain application 915 to interact with verifier 1100 on blockchain network 300 as part of the process of proving a user's custody of asset 800 at a location and time. To this end, blockchain application 915 may include time-based hash generation instructions 216 and proving custody of asset at location and time instructions 911 that may be executed by a processing device 220 to prove a user's custody of asset 800 at a location and time.

As illustrated in the example of FIG. 8, application of one-time cryptographic hashing algorithm generates a TOTA including a secured representation of the user's blockchain address 212 (illustrated in FIG. 1 as TOTA-P1 (B3, T). In some implementations, time-based hash generation instructions 216 may iterate to generate secured representations of the blockchain address of user of client device 900, independent of whether a process is initiated to prove the user's custody of asset(s) 800 at a location and time (e.g., by executing proving presence at location and time instructions 911).

t should be noted that although client device 900 is illustrated as communicating on-chain with verifier 1000 in example environment of FIG. 8, in other implementations, communications between client device 900 and verifier 1000 may occur off-chain. Moreover, although client device 900 is illustrated as being outside of blockchain network 1100, it should be appreciated that client device 900 may function as a node on blockchain network 1100. For example, client device 900 may function as a limited access node that may write or view transactions on blockchain network 1100, but may not validate transactions on blockchain network 1100.

Referring now to blockchain network 1100, blockchain network 1100 may be implemented as a consortium blockchain network. For example, blockchain network 1100 may be implemented by an enterprise consortium of companies that operate the blockchain for specific applications, including the verification of an entity's custody of an asset or assets at a location and time. Blockchain network 1100 may include a plurality of nodes (e.g., verifier 1000 and other blockchain nodes 1150) that may validate transactions such as digital attestation transactions that create an immutable record that may be used to prove custody of an asset of an entity at a location and time. Some or all blockchain nodes may store a respective copy of a blockchain that contains a chronologically ordered, back-linked list of blocks, including digital attestation transactions made between client devices 900 and verifier server systems 1000 in the blockchain network 1100. In some implementations, nodes on blockchain network 1100 may be able to write transactions, but not verify proof of presence application transactions, which require different capabilities with an entity called verifier. It should be appreciated that although a single verifier 1000 is illustrated in the example of FIG. 8, other blockchain nodes 1150 may also operate as a verifier server system to prove other claims made by other client devices.

A verifier 1000 within blockchain network 1100 is configured to engage in an interactive proving protocol with a client device 900 to verify that the user of client device 900 has custody of asset(s) 800 at a particular location at a particular time. Following verification, verifier 1000 may create a distributed attestation on the blockchain that attests to the user's custody of the asset(s) at a particular location and time.

As shown, a verifier 1000 may include a machine readable medium 1110, processing device 420, and network interface 430. Machine readable medium 1110 may store a blockchain address 411 corresponding to the verifier server system, and a private key 412 and public key 413 corresponding to the blockchain address 411. Machine readable medium 410 may also store instructions 1114, that when executed by a processing device 420, verify a user's custody of an asset at a particular location at a particular time.

Network interface 430 may be to communicate with client device 900 (e.g., over communication network 275). Network interface 430 may also be to communicate with a blockchain address mapping server system 1205, which as further described below, is configured to maintain a mapping between clear and secured representations of blockchain address provisioned at location beacons 100, tags 801 of assets 800, and client devices 900. Although blockchain address mapping server system 1205 is illustrated in the example of FIG. 8 as being separate from verifier 1100, in some implementations blockchain address mapping server system 1205 may be a component of verifier 1000. Moreover, although blockchain address mapping server system 1205 is illustrated as operating outside the blockchain network 1100, in some implementations it may operate on the blockchain network 1100.

Figure 12:
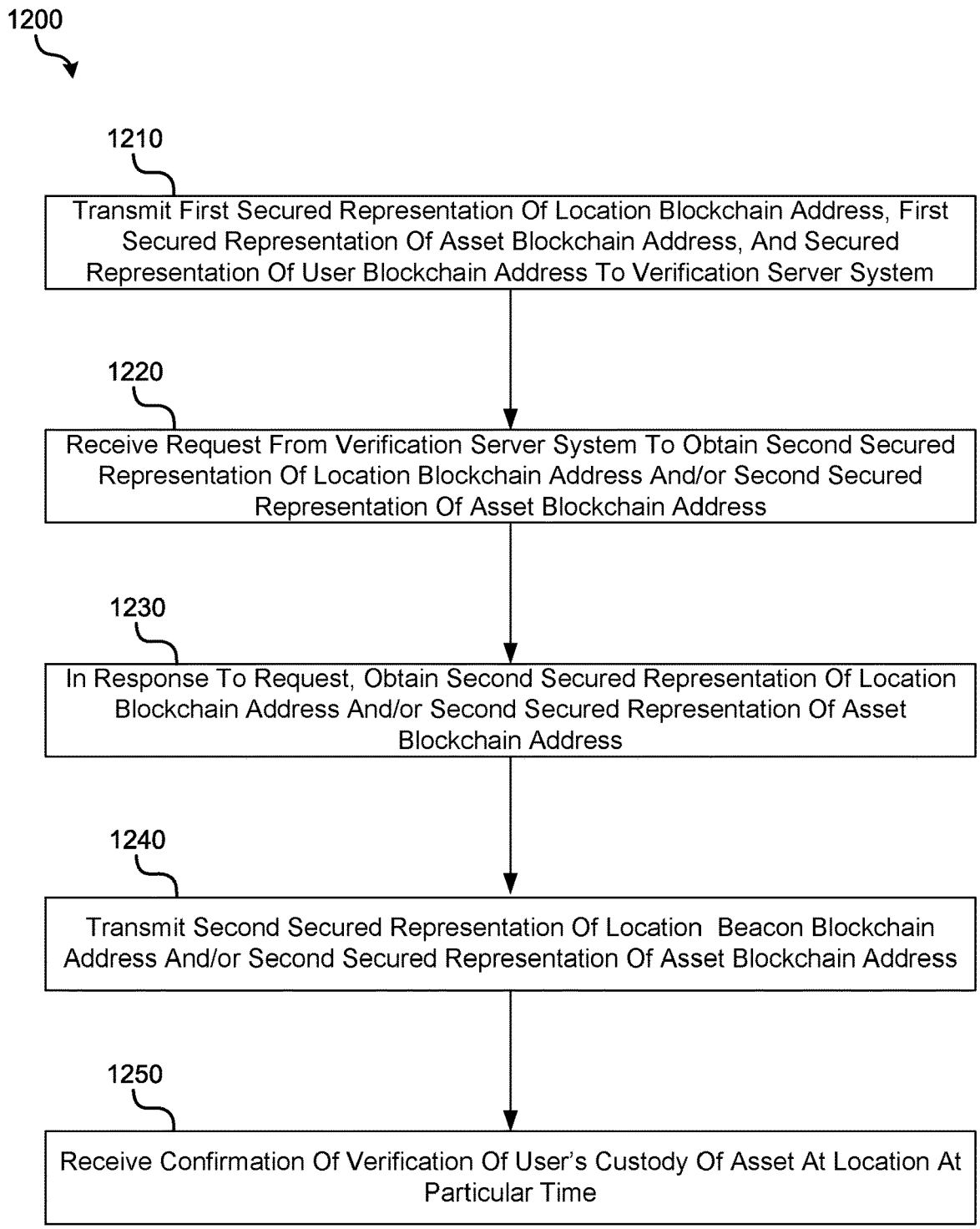
FIG. 12 is an operational flow diagram illustrating an example method that may be implemented by a user of client device to prove that the user has custody of one or more assets at a particular location at a particular time, in accordance with implementations of the disclosure

FIG. 12 is an operational flow diagram illustrating an example method 1200 that may be implemented by a user of client device 900 to prove that the user has custody of one or more assets 800 at a particular location at a particular time, in accordance with implementations of the disclosure. Method 1200 may be implemented by a processing device 220 executing time-based hash generation instructions 216 and proving custody of asset at location and time instructions 911.

At operation 1210, the client device 900 transmits, to verifier 1000, one or more secured representations of location blockchain addresses (e.g., TOTA-L1(B1, T)), one or more secured representations of assets' blockchain addresses (e.g., TOTA-A1(B4, T), TOTA-A2(B5, T), and a secured representation of the user's blockchain address (e.g., TOTA-P1(B3, T)). The first secured representation of the location blockchain address and the secured representation of the user's blockchain address may be obtained in substantially the same manner as discussed above with reference to FIGS. 1-7. The one or more secured representation of the assets' blockchain addresses may be obtained by receiving a beacon from each asset tag 801 that includes a first secured representation of a respective asset blockchain address. For example, as illustrated in the example of FIG. 8, client device 900 may receive the one time advertisement TOTA-A1 from asset tag 801-1 of asset 800 and the one time advertisement TOTA-A2 from asset tag 801-N. In implementations, client device 900 may be configured to automatically receive beacons transmitted by asset tags 801. Such functionality may be enabled by running a blockchain application 915 as a background task on the client device 900. In some implementations, a user of client device 900 may be presented with a query (e.g., via display 230) asking if the user wishes to initiate a process for verifying custody of one or more assets at a particular location and time.

At operation 1220, the client device 900 receives a request from the verifier 1000 to prove knowledge of a second secured representation of a location blockchain address (e.g., from the same beacon at a later time, or a different beacon in the same location) and/or to prove knowledge of a second secured representation of the asset blockchain address(es) (e.g., from the same asset at a later time, or a different asset). The request message received from verifier 1000 may be in accordance with an interactive proving protocol by which a verifier server system asks a client device one or more questions to generate data that proves the user's custody of one or more assets at a particular location at a particular time. The interactive proving protocol may be initialized by the client device 900 or by the verifier 1000. For example, in some implementations the verifier 1000 may ask the client device to capture a TOTA from the same or different location beacon and a TOTA from the same or different asset tag at a later time (e.g., within 2 minutes, 5 minutes, etc.). As another example, the verifier 1000 may request that the client device capture a TOTA for all asset tags at the same or different times in the future.

At operation 1230, in response to the request, the client device 900 obtains the second secured representation of the location blockchain address and/or the second secured representation of (each of) the asset blockchain address(es). At operation 1240, the client device 900 transmits the second secured representation of the location blockchain address and/or the second secured representation(s) of the asset blockchain address(es) to the verifier 1000. For instance, as illustrated in the example of FIG. 8, client device 900 transmits TOTA-A1 (captured from the same asset), TOTA-A2 (captured from the same asset) and TOTA-L2 (captured from a second location beacon) at a later time T+2.

At operation 1250, the client device 900 receives a confirmation message from verifier 1000 that the user's custody of one or more assets has been verified at a particular location at a particular time. In implementations, the confirmation message may identify a digital attestation transaction identifier (ID) of a digital attestation transaction stored on the blockchain of blockchain network 1100. The digital attestation transaction stored on the blockchain may be digitally signed by verifier 1000 (e.g., using private key 412) and digitally attest to the user's custody of the asset(s) at a particular location at a particular time.

It should be noted that, in some implementations (e.g., where all messages are transmitted on a blockchain network), each of the messages transmitted from client device 900 to verifier 1000 (e.g., at operations 1210 and 1240) may be digitally signed by client device 900 using a stored private key 213. Such a mechanism may add an additional layer of security as the digital signatures may be used to ensure that the message originated from the user of client device 900.

In alternative implementations of method 1200, rather than receiving beacons containing secured representations of location blockchain addresses and/or receiving beacons containing secured representations of asset blockchain addresses, client device 900 may scan fixed advertisements that contain secured representations of location blockchain addresses and/or scan fixed advertisements that contain secured representations of asset blockchain addresses.

Figure 13:
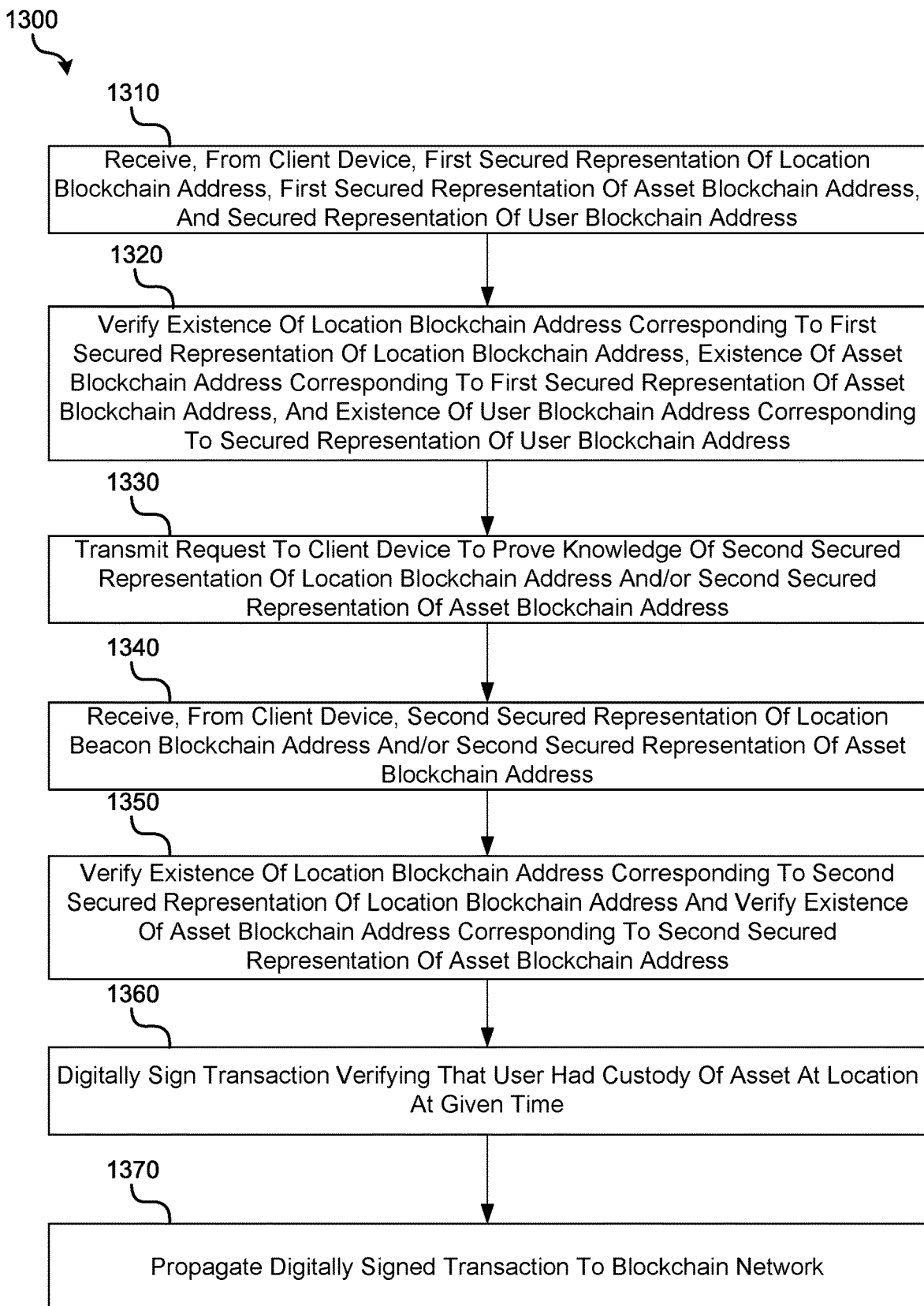
FIG. 13 is an operational flow diagram illustrating an example method that may be implemented by a verifier to verify that a user of client device has custody of one or more assets at a particular location at a particular time, and to create a distributed attestation on a blockchain that attests to the user's custody of the asset(s) at the location and time, in accordance with implementations of the disclosure.

FIG. 13 is an operational flow diagram illustrating an example method 1300 that may be implemented by a verifier 1000 to verify that a user of client device 900 has custody of one or more assets 800 at a particular location at a particular time, and to create a distributed attestation on a blockchain that attests to the user's custody of the asset(s) at the location and time, in accordance with implementations of the disclosure. Method 1300 may be implemented by a processing device 420 executing instructions 1114 for verifying user custody of asset at location and time. At operation 1310, verifier 1000 receives from client device 900 a message including a first secured representation of a location's blockchain address (e.g., TOTA-L1), a secured representation of the user's blockchain address (e.g., TOTA-P1) and one or more first secured representations of asset blockchain addresses (e.g., TOTA-A1, TOTA-A2). At operation 620, verifier 1000 verifies the validity of the received first secured representation of the location blockchain address, user blockchain address, and asset blockchain address(es). In particular, verifier 1000 may query blockchain address mapping server system 1205 to perform this verification. As illustrated, blockchain address mapping server system 1205 may include a location blockchain address database 391 of location blockchain addresses, time-based hash generation instructions 392 that may generate a secured representation of the location blockchain addresses, user blockchain address database 393, and user time-based hash generation instructions 394 that may generate a secured representation of user blockchain addresses.

Blockchain address mapping server system 1205 may further include an asset blockchain address database 1201 of blockchain addresses associated with assets. In some implementations, databases 1201, 391, and 393 may implemented as a single database. Blockchain address mapping server system 1205 may also include user time-based hash generation instructions 1202 to generate a secured representation of asset blockchain addresses. In particular, asset time-based hash generation instructions 1202 may apply the same time-based hashing algorithm to an asset blockchain address as time-based hash generation instructions 814 to generate the same secured representation of asset blockchain addresses. In some implementations, instructions 1202 may apply the same hashing algorithm as instructions 392 and/or instructions 394.

The secured representations of asset blockchain addresses generated using time-based hash generation instructions 1202 stored in blockchain address mapping server system 1205 may be stored in asset blockchain address database 1201 to maintain a mapping between clear versions of asset blockchain addresses and secured versions of asset blockchain addresses. The mapping may be maintained in a table or other data structure of database 1201. As such, in response to a query received from verifier 1000 to verify the validity of a secured representation of an asset blockchain address, blockchain address mapping server system 1205 may perform a lookup function in database 1201 to take the secure representation of the asset blockchain address received in a query from verifier 1000, and retrieve a corresponding clear version of the asset blockchain address that is returned to verifier 1000.

By virtue of verifier 1000 communicating with the blockchain address mapping system 1205 during operation 1320 (and subsequent operation 1350), verifier 1000 may determine the identity of a user of client device 900, an identity of one or more assets 800 that the user has custody of, and the identity of a location where the user has custody of the asset.

At operation 1330, verifier 1000 transmits a request to client device 900 to obtain a second secured representation of a location blockchain address, a second secured representation of the user blockchain address, and/or a second secured representation of one or more asset blockchain addresses. The request may be transmitted in accordance with an interactive proving protocol whereby verifier 1000 asks client device 900 one or more questions to prove the user's custody of the one or more assets at a particular location. For example, the request may ask that the client device 900 to retrieve, at a particular time, a second secured representation of a location blockchain address, a second secured representation of the user's blockchain address, and/or a second secured representation of the asset(s) blockchain address(es). To prevent tampering, the later time may be sufficient for the time-based hash generation instructions of the location beacon, asset tag, and/or client device to generate a new value. In implementations, verifier 1000 is configured to accept only one usage of a TOTA. In such implementations, a second time usage of the same TOTA for verification may be considered a failed attempt by the verifier.

At operation 1340, in response to the request, verifier 1000 receives from client device 900 a message including a second secured representation of a location blockchain address (e.g., TOTA-L2), a second secured representation of the user's blockchain address, and/or a second secured representation of the asset(s) blockchain address(es). In the example of FIG. 8, verifier 1000 receives TOTA-L2, TOTA-A1, TOTA-A2.

At operation 1350, verifier 1000 verifies the validity of the received second secured representations of blockchain addresses. In particular, verifier 1000 may query blockchain address mapping server system 1205.

At operation 1360, verifier 1000 may digitally sign an attestation transaction verifying that the user of client device 1000 had custody of one more assets at a particular location and time. Verifier 1000 may sign the transaction using a private key 412 associated with its blockchain address. The signed transaction may include a timestamp that identifies a time when the user had the custody of the asset.

At operation 1370, verifier 1000 may propagate the digitally signed attestation transaction to blockchain network 1100 (e.g., to create a distributed attestation transaction on the blockchain) or to private channels as approved earlier for future usage by the client to prove its custody of one or more assets at a point in space-time in the past. The attestation transaction may be broadcast by verifier 1000 to all or a subset of nodes 1150 on blockchain network 1100. Thereafter, the nodes of blockchain network 1100 may come to a consensus that validates the attestation transaction and updates the blockchain with a block or a distributed ledger entry including the validated transaction.

After a consensus has been reached by the blockchain network 1100, the verifier 1000 and other blockchain nodes 1150 may receive a new block containing the validated transaction and update their respective copy of the blockchain. After validation, verifier 1000 may transmit a confirmation message to client device 900 that its custody of one or more assets at a particular location and time has been verified. The confirmation message may include a reference to the attestation transaction ID of the attestation transaction stored on the blockchain network 1150.

Figure 14:
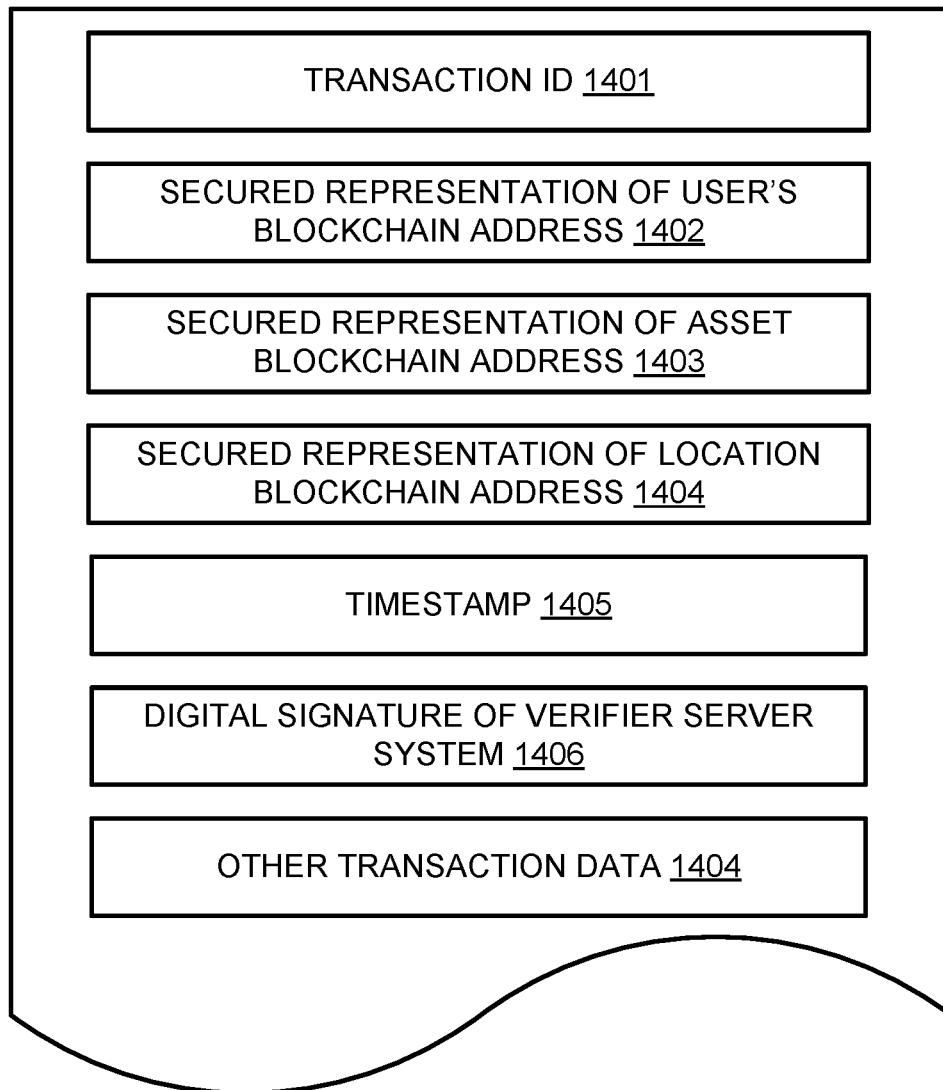
FIG. 14 illustrates an example data structure of a digitally signed attestation transaction verifying that a user had custody of an asset at a location at a given time, that may be recorded on a blockchain, in accordance with implementations of the disclosure.

FIG. 14 illustrates an example data structure of a digitally signed attestation transaction 1400 verifying that a user had custody of an asset at a location at a given time, that may be recorded on a blockchain in accordance with implementations of the disclosure. For example, attestation transaction 1400 may be recorded on a blockchain of blockchain network 1100. Attestation transaction 1400 may include a blockchain transaction ID 1401, a secured representation of the user's blockchain address 1402, a secured representation of the asset blockchain address 1403, a secured representation of the location blockchain address 1404, a timestamp 1405 identifying when the event occurred (e.g., when user had custody of the asset), a digital signature 1406 of verifier 1000, and other transaction data 1407 (e.g., public keys associated with location, asset, user, and verifier, transactional time stamp showing when the attestation was actually granted by the verifier).

In some implementations, rather than storing attestation transaction 1400 on the blockchain network, an off-chain reference to a digital attestation may instead be stored on the blockchain or the attestation can be sent through private channels from the verifier to the user or broadcasted to a group of preapproved users.

In implementations, payment and other services may be built on the top of the attestation for the custodian of the asset(s).

Method and system for integrating verifiable claims with overlay of centralized identity systems enabled by Blockchain and other Distributed Technologies.

Third, while using the blockchain to create verifiable claims may improve efficiency by avoiding a scenario where different organizations have to repeat the process of creating the verifiable claim, the majority of present-day organizations operate in an environment that relies on centralized databases. Generating verifiable claims and attestations on a blockchain may have limited value if there is no way to map these claims and attestations back to centralized identities (e.g., usernames, emails, etc.) maintained by a centralized system such as a corporate active directory of an attestation holder/issuer/verifier. The majority, if not all other services may be currently connected to a centralized system of identity. As such, to continue blockchain adoption, there is a need to connect blockchain identities to centralized identities.

Figure 15:
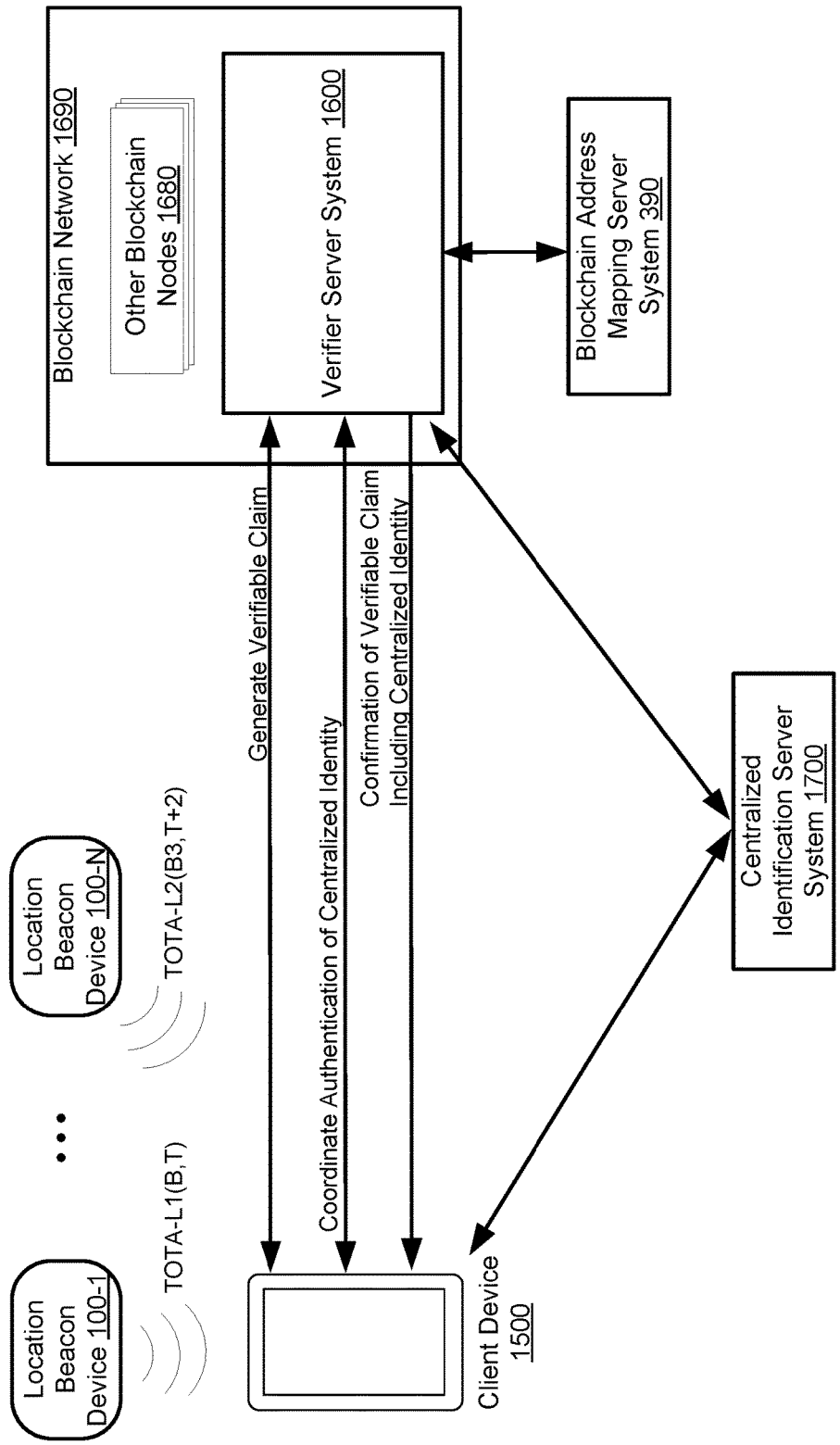
FIG. 15 illustrates an example environment for associating a blockchain identity of a user of client device with a centralized identity of the user, and generating a verifiable claim including a reference to the user's centralized identity, in accordance with implementations of the disclosure.

FIG. 15 illustrates an example environment for associating a blockchain identity of a user of client device 1500 with a centralized identity of the user, and generating a verifiable claim including a reference to the user's centralized identity, in accordance with implementations of the disclosure. In this environment, client device 1500 is configured to communicate with a verifier server system 1600 ("verifier 1600") on blockchain network 1690 to obtain a verifiable claim including a reference to a centralized identity of the user of client device 1500. The verifiable claim may be recorded on a blockchain of blockchain network, or it may be recorded off-chain. For example, client device 1500 may communicate with verifier 1600 to obtain a reusable distributed attestation that attests to the presence of a user of the client device at particular location at a particular time (e.g., as described above with reference to FIGS. 1-7), where the verifiable claim includes a reference to the user's centralized identity. As another example, client device 1500 may communicate with verifier 1600 to generate a verifiable claim attesting to the custody of an asset by the user of the client device at particular location at a particular time (e.g., as described above with reference to FIGS. 8-14), where the verifiable claim includes a reference to the user's centralized identity.

Figure 19:
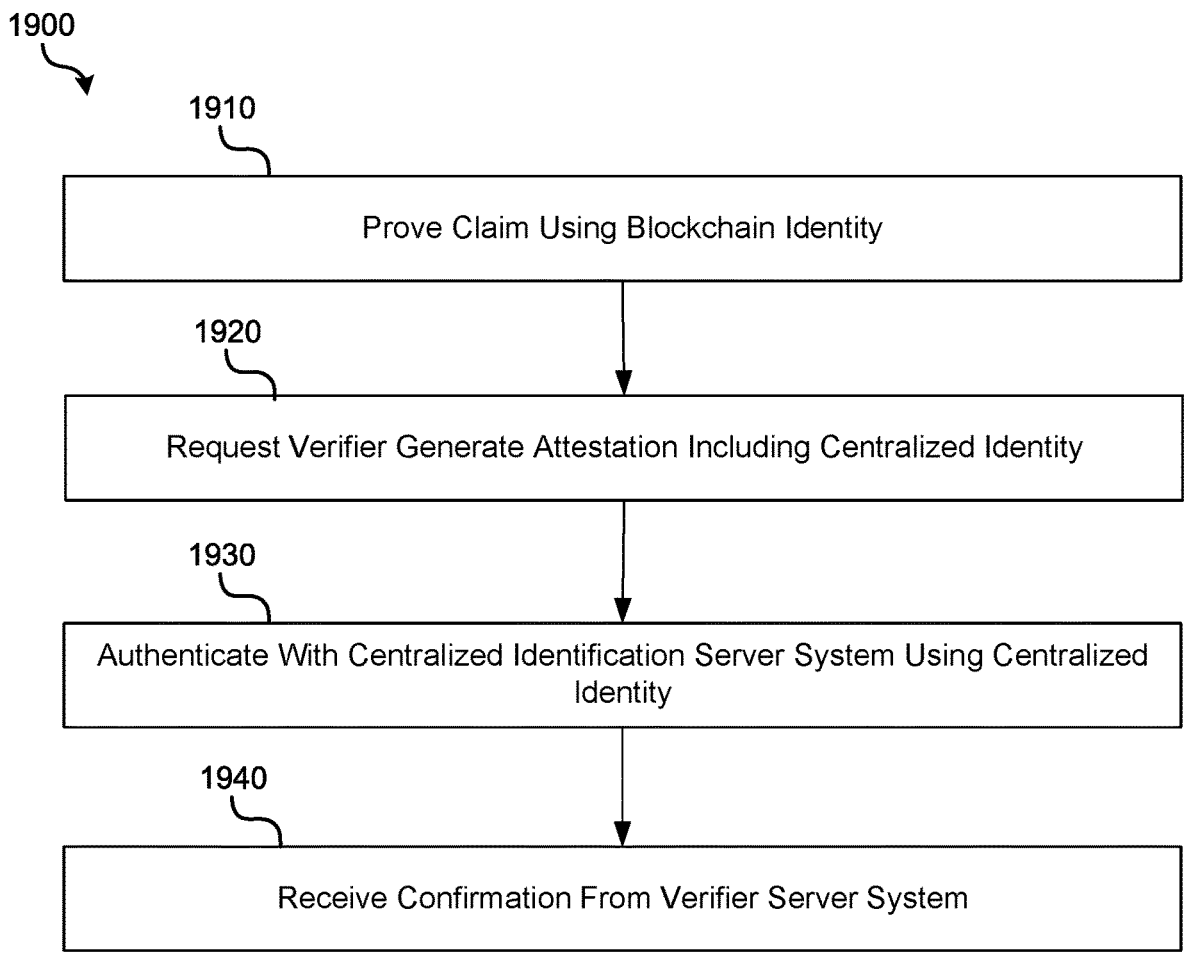
FIG. 19 is an operational flow diagram illustrating an example method that may be implemented by a user of client device to obtain a verifiable claim including a reference to the a centralized identity of the user, in accordance with implementations of the disclosure.

For simplicity of discussion, the example of FIG. 19 illustrates a client device 1500 generating a verifiable claim as to presence at a particular location at a particular time. However, it should be appreciated that other types of verifiable claims may be generated that include a reference to the user's centralized identity.

During verification of a claim made by a user of client device 1500, verifier 1600 may redirect client device 1500 to communicate with centralized identification server system 1700 to authenticate the centralized identity of the user of the client device 1500. Verifier 1600 may also communicate with centralized identification server system 1700 to confirm the authentication. Communications between client device 1500, verifier 1600, and centralized identification server system 1700 may occur over a communication network such as communication network 275 described above.

Figure 16:
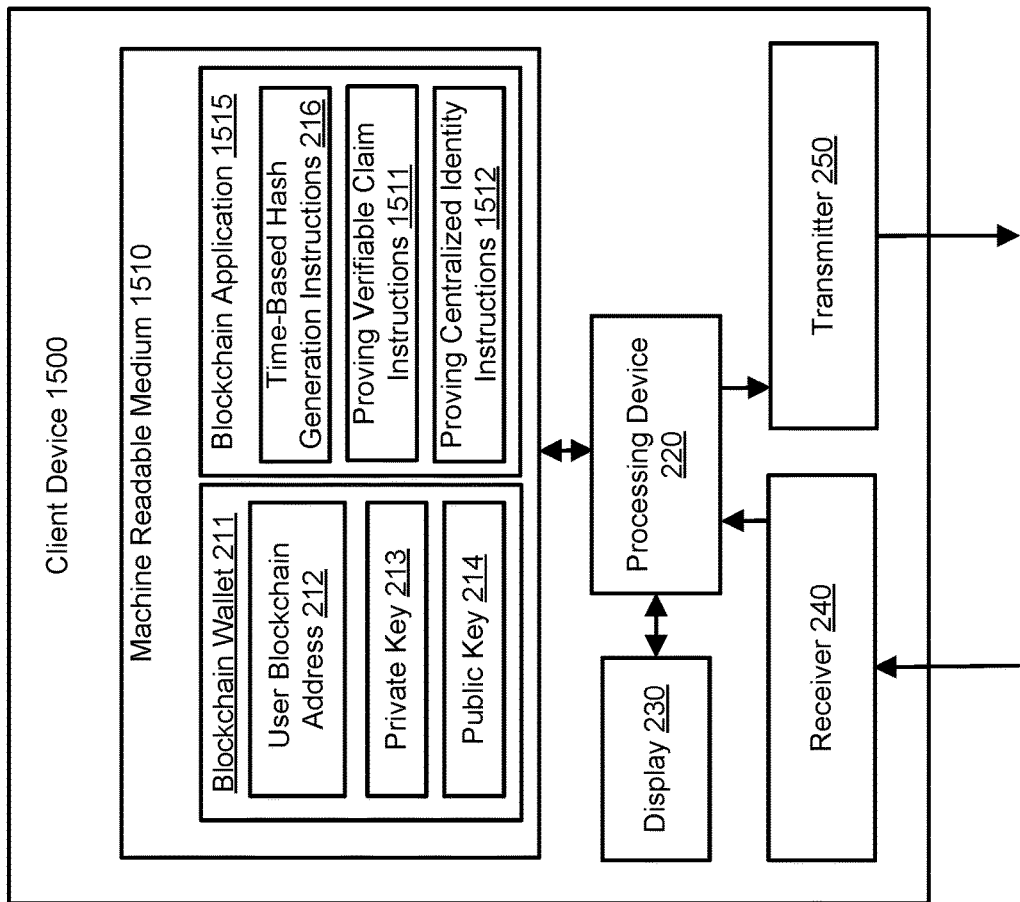
FIG. 16 illustrates an example architecture of components of a client device, in accordance with implementations of the disclosure.

FIG. 16 illustrates an example architecture of components of client device 1500, in accordance with implementations of the disclosure. Client device 1500 may comprise a machine readable medium 1510, processing device 220, display 230, receiver 240 to receive communications from verifier server system 1600 and/or centralized identification server system 1700, and transmitter 250 to transmit communications to verifier server system 1600 and/or centralized identification server system 1700.

The machine readable medium 1510 may comprise blockchain wallet 211 and a blockchain application 1515. Blockchain application 1515 may include time-based hash generation instructions 216 that, when executed by processing device 220, which may be based on a Trusted Execution Environment (TEE), generate a secured representation of the user blockchain address 212.

Blockchain application 1515 may also include proving verifiable claim instructions 1511. Verifiable claim instructions 1511, when executed by a processing device 220, may cause client device 1500 to engage in an interactive proving protocol with verifier 1600 to prove a claim. Examples of interactive proving protocols are further described above with reference to FIGS. 1-14. For example, as illustrated in the environment of FIG. 15, client device 1500 may prove presence at a particular location at a particular time. As part of this interactive proving protocol, the client device may capture TOTAs from location beacons 100 and its own TOTA, and present these TOTA to verifier 1600 that then communicates with blockchain address mapping server system 390 to verify the blockchain identity and location of the user of the client device. Additionally, the executed instructions 1511 may cause the client device 1500 to request to verifier 1600 that a centralized identity of a user of the client device 1500 be associated with a verified claim.

Blockchain application 1515 may further include proving centralized identity instructions 1512. Proving centralized identity instructions 1512, when executed by a processing device 220, may cause client device 1500 to communicate with centralized identification server system 1700 to authenticate a centralized identity associated with the user. In some implementations, the instructions may also cause the client device 1500 to communicate with verifier 1600 after authenticating the centralized identity.

In some implementations, machine readable medium 1510 may also store one or more centralized identities of the user. In such implementations, user credentials associated with a centralized identity may be stored.

Figure 17:
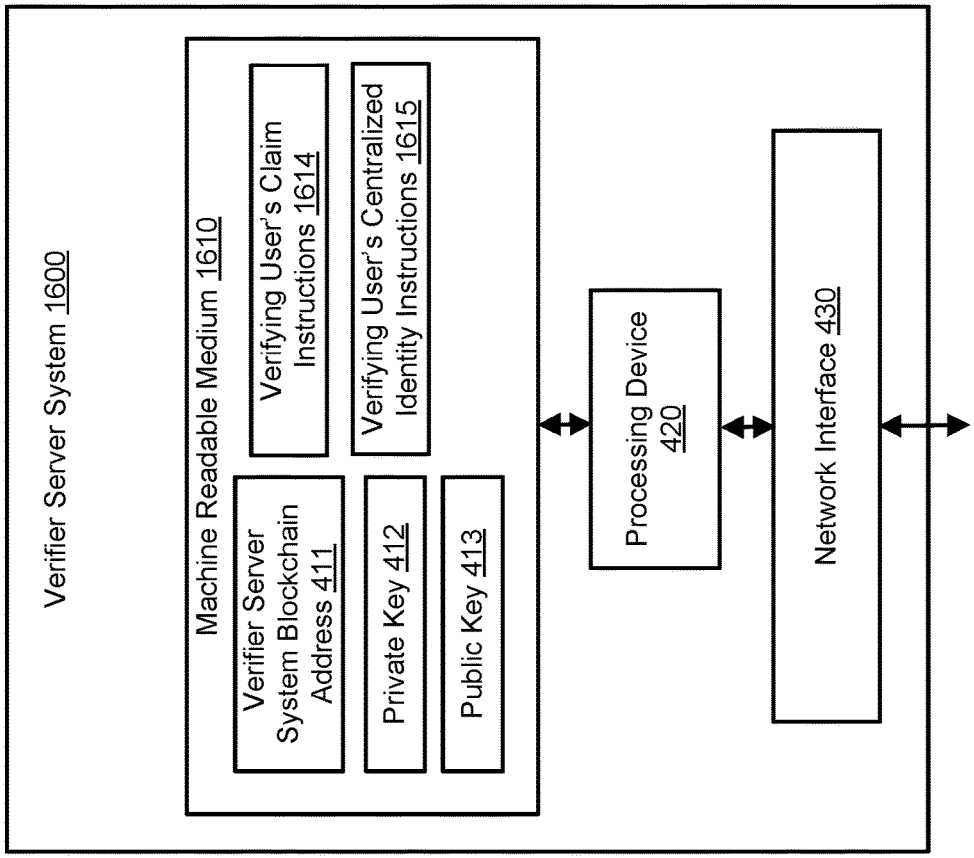
FIG. 17 illustrates an example architecture of components of a verifier, in accordance with implementations of the disclosure.

FIG. 17 illustrates an example architecture of components of verifier 1600, in accordance with implementations of the disclosure. Verifier 1600 may comprise a machine readable medium 1610, a processing device 420, and a network interface 430 to communicate with a client device 1500, blockchain address mapping server system 390, and/or a centralized identification server system 1700. Although blockchain address mapping server system 390 is illustrated in the example of FIG. 15 as being separate from verifier

1600, in some implementations blockchain address mapping server system 390 may be integrated into verifier 400.

Machine readable medium 1610 may store a blockchain address 411 corresponding to the verifier 1600, and a private key 412 and public key 413 corresponding to the blockchain address 411. Machine readable medium 1610 may also store instructions 1614, that when executed by a processing device 420, verify a claim made by a user of the client device. For example, execution of the instructions may verify that the user was present at a particular location at a particular time. Machine readable medium 1610 may further store instructions 1615 that, when executed by a processing 420, verify a centralized identity associated with the user. For example, as further discussed below, execution of instructions 1615 may cause verifier 1600 to redirect client device 1500 to a centralized identification server system 1700 for authentication of the centralized identity.

Figure 18:
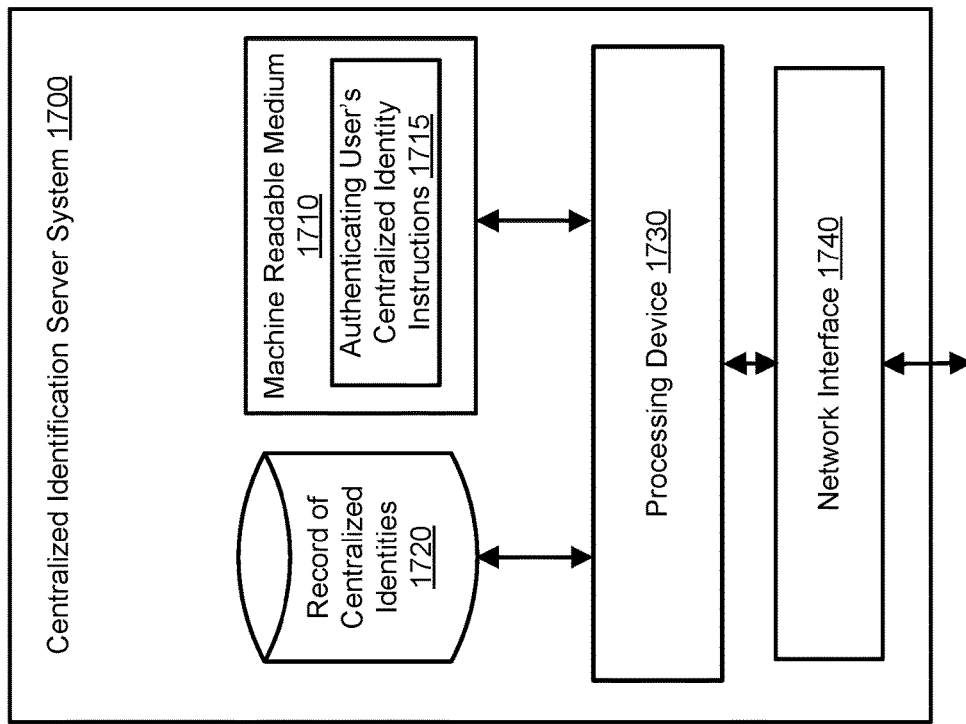
FIG. 18 illustrates an example architecture of components of centralized identification server system, in accordance with implementations of the disclosure.

FIG. 18 illustrates an example architecture of components of centralized identification server system 1700, in accordance with implementations of the disclosure. Centralized identification server system 1700 may comprise a machine readable medium 1710, a record 1720 of centralized identities associated with users, a processing device 1730, and a network interface 1740 to communicate with a client device 1500 and/or verifier 1600. The centralized identity system and Blockchain system can interact over standard based secure protocols or proprietary protocol to communicate with each other.

The record of centralized identities 1720 may comprise a record of centralized identities that may be used to authenticate a user. It may be implemented as a database or some other datastore. For example, the record of centralized identities 1720 may comprise single sign on (SSO) credentials (e.g., user ID and password) associated with different users, an active directory service include credentials for different users, public keys associated with different users, or some other record of centralized identities for authenticating a user. Additionally, it may comprise backend integration with the verifier in the blockchain ecosystem (e.g., using secure tokens or using PKI).

Machine readable medium 1710 may comprise authenticating user's centralized identity instructions 1715 that, when executed by a processing device 1730, causes server system 1700 to authenticate a centralized identity of a user. For example, depending on the implementation, centralized identification server 1700 may be configured to apply single sign on authentication, active directory authentication, certificate-based authentication, or some other type of authentication of a centralized identity of a user. Authentication may be performed in response to receiving centralized identity data (e.g., credentials) from a client device 1500. Execution of the instructions may also cause server system 1700 to communicate with client device 1500 and/or verifier 1600 to perform and/or confirm the authentication.

FIG. 19 is an operational flow diagram illustrating an example method 1900 that may be implemented by a user of client device 1500 to obtain a verifiable claim including a reference to the a centralized identity of the user, in accordance with implementations of the disclosure. Method 1900 may be implemented by a processing device 220 executing time-based hash generation instructions 216, proving verifiable claim instructions 1511, and proving centralized identity instructions 1512.

At operation 1910, the user proves a claim using a blockchain identity. For example, a client device 1500 may prove a claim by capturing one or more of a secured representation of a location blockchain address, a secured representation of an asset blockchain address, and a secured representation of a user's blockchain address at multiple times. In implementations, TOTAs and/or fixed advertisements may be captured. The claim may be that the user was a particular location at a particular time, that the user had custody of a particular asset of an asset at a particular time, that the user had custody of an asset at a particular time and location, or some other claim.

At operation 1920, the client device 1500 requests that the verifier 1600 generate an attestation (e.g., a distributed attestation transaction stored on a blockchain of blockchain network 1690) including a reference to a centralized identity of the user. In some implementations, the client device 1500 may make the request in response to the verifier 1600 querying what centralized identity to associate with a verifiable claim that has been proven. In other implementations, the client device 1500 may initiate the request.

In some implementations, a user of the client device may manually select a centralized identity to be associated with the claim (e.g., by actuating an input device such as a touchscreen of the client device). For example, a user may select an email account, a social media account, or some other type of centralized identity to be associated with the claim. In other implementations, the client device may automatically select a centralized identity that has been previously stored.

At operation 1930, the client device 1500 authenticates with the centralized identification server system 1700 using the centralized identity to prove the user is known by and authenticated by the centralized identity. In implementations, the client device may be redirected to the centralized identification server system (e.g., to a domain of the centralized identification server system) by the verifier in response to the request to generate an attestation including the user's centralized identity. Depending on the type of centralized identity that is to be authenticated, SSO authentication, active-directory authentication, certificate-based authentication, or some other type of centralized authentication may be performed. For example, a user may sign a certificate with a private key, and the centralized identification server system may apply a public key (e.g., a public key stored in a trusted certificate store) to the signed certificate to verify that the user owns the certificate. It should be appreciated that any suitable type of centralized authentication may be performed where there is an established trust and a secure channel between the blockchain ecosystem and the centralized identification server system.

Figure 20:
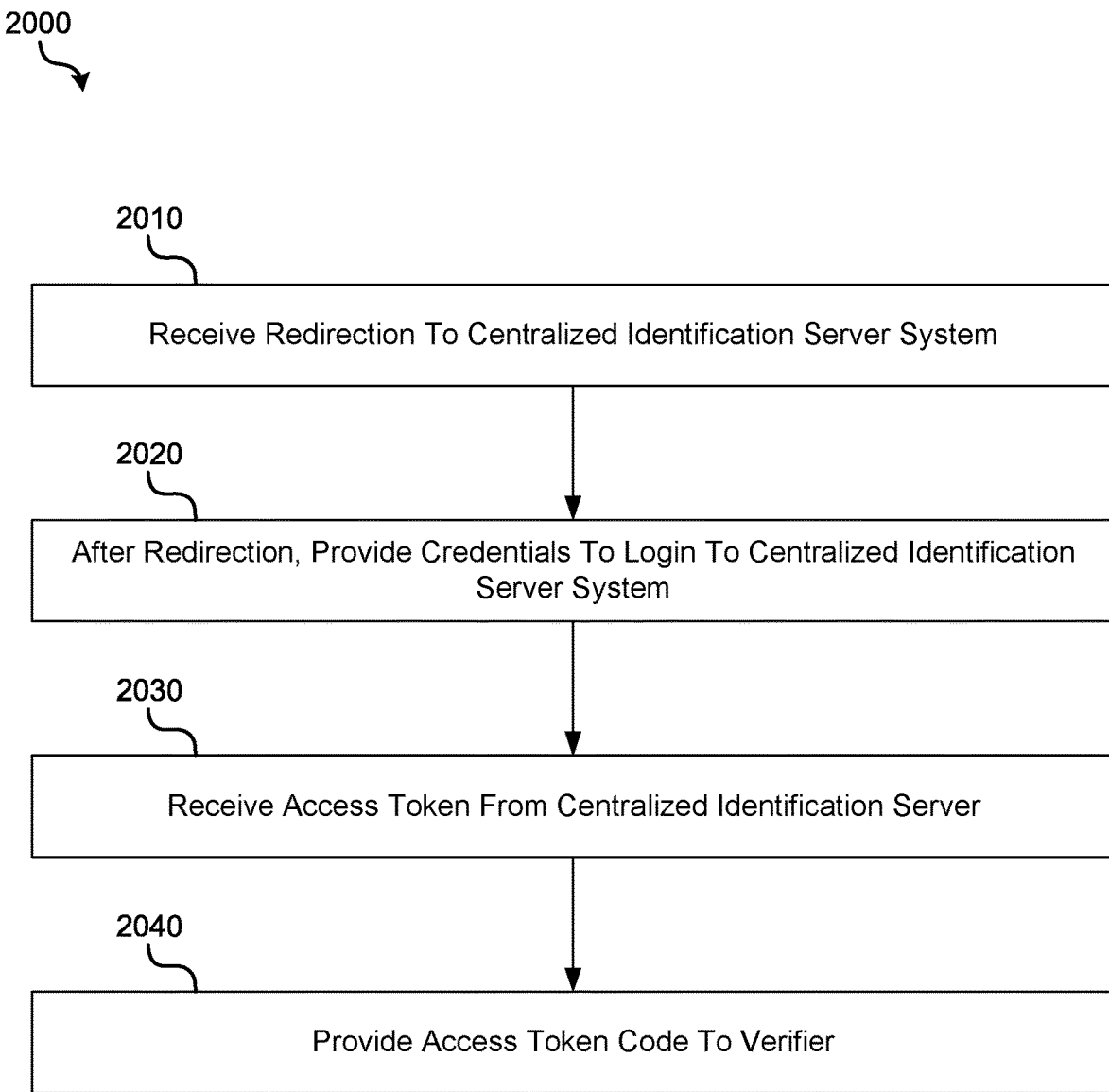
FIG. 20 illustrates a particular example method in which a centralized identity of a user of a client device may be authenticated using SSO authentication.

FIG. 20 illustrates a particular example method 2000 in which a centralized identity of a user of a client device may be authenticated using SSO authentication. At operation 2010, the client device receives a redirection to the centralized identification server system. For example, the client device on making a submission for a verifiable claim to the verifier, may be redirected to a domain (e.g., web address) of a centralized identity provider for proving its centralized identity, as the business case may require centralized identity to be also part of the verifiable claim. At operation 2020, after redirection, the client device may provide credentials (e.g., username and password) to login to the centralized identification server system. In some implementations, the credentials may be manually input by the user of the client device. In other implementations, the credentials may be saved on the client device and automatically entered. Based on successful login, the centralized identity provider may grant an access token to the client. At operation 2030, the client device receives the access token from the centralized identification server. At operation 2040, the client device provides the access token to the verifier. The verifier and the centralized identification server system may have a secure channel through which the verifier validates the access token with the centralized identification server.

Referring again to method 1900, at operation 1940, the client device 1500 receives a confirmation message from verifier 1600 that a verifiable claim including a reference to the user's centralized identity has been generated. For example, after authenticating the user's centralized identity (e.g., upon validating an access token), the verifier may validate the user's centralized identity and issue a verifiable claim to the user with proven information (e.g., location information) and the centralized identity information or a reference to the centralized identity which verifiers can only validate. The client may use the verifiable claim for future verification or sharing.

In implementations, the confirmation message may identify a blockchain transaction ID of a distributed attestation transaction stored on the blockchain of blockchain network 1690. The distributed attestation transaction stored on the blockchain may be digitally signed by verifier 1600 and include a reference to the centralized identity of the user and may not have the actual centralized identity itself. The distributed attestation transaction may be reusable to by a user of client device 1500 to prove a claim to an entity (e.g., centralized, off-chain entity).

Figure 21:
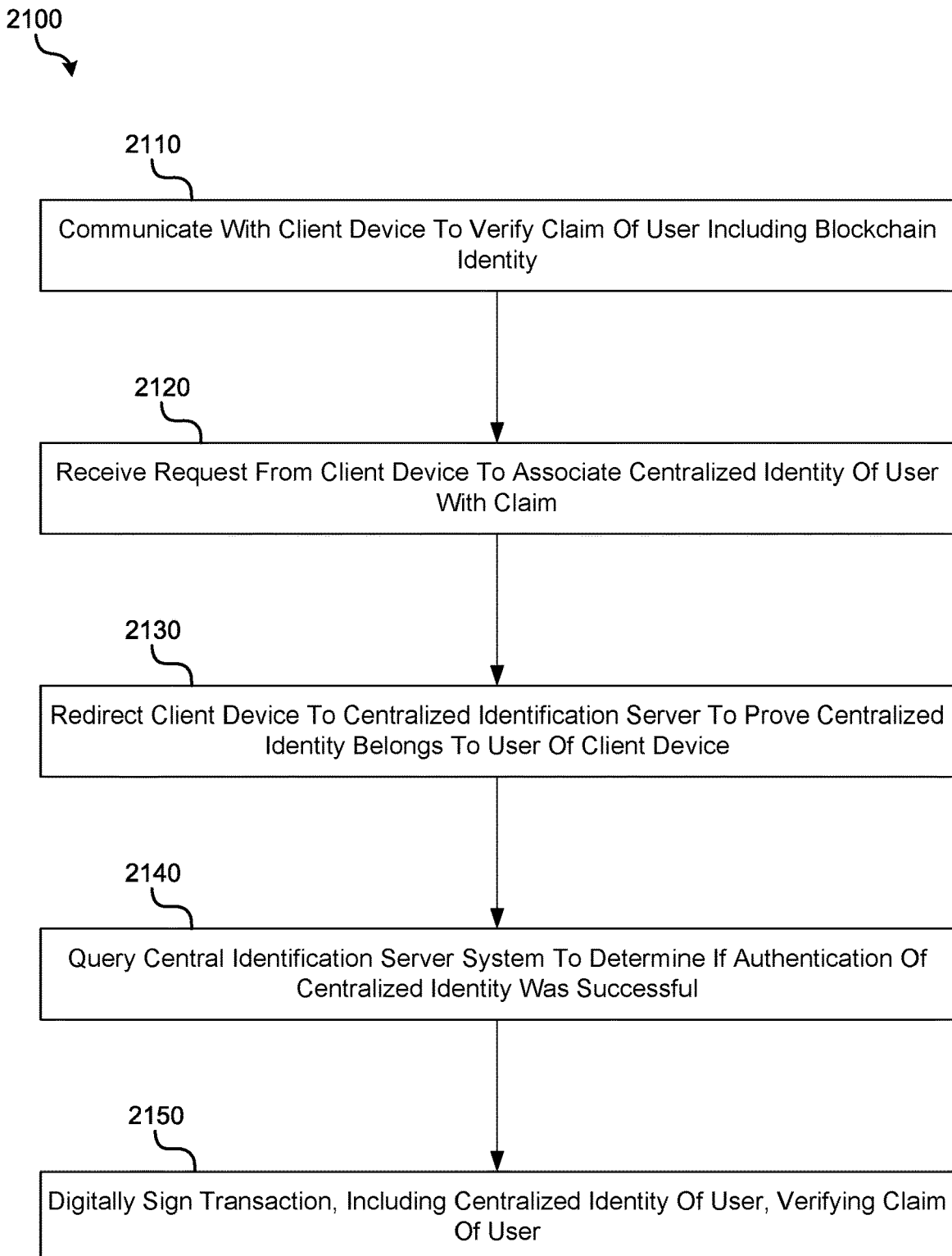
FIG. 21 is an operational flow diagram illustrating an example method that may be implemented by a verifier to create a distributed attestation on a blockchain that includes a reference to a centralized identity of a user, in accordance with implementations of the disclosure.

FIG. 21 is an operational flow diagram illustrating an example method 2100 that may be implemented by a verifier 1700 to create a distributed attestation on a blockchain that includes a reference to a centralized identity of a user, in accordance with implementations of the disclosure. Method 2100 may be implemented by a processing device 420 executing instructions 1614 for verifying user's claim and instructions 1615 for verifying user's centralized identity.

At operation 2110, verifier 1700 communicates with a client device 1500 to verify a claim of the user of the client device that includes a blockchain identity. For example, as discussed above, verifier 1700 may engage in an interactive proving protocol with a client device by which it receives one or more of a secured representation of a location blockchain address, a secured representation of an asset blockchain address, and a secured representation of a user's blockchain address at multiple times. In the example of FIG. 15, verifier 1700 may communicate with mapping server system 390 to verify secured representations of location blockchain address and a user blockchain address that are received.

At operation 2120, verifier 1700 receives a request from a client device to associate a centralized identity of the user with the verified claim. In some implementations, verifier 1700 may query the client device 1500 to determine what centralized identity the user desires to associate with the claim. At operation 2130, verifier 1700 may redirect the client device to a centralized identification server system to prove that the centralized identity belongs to the user of the client device. For example, verifier 1700 may redirect the client device to a domain of the centralized identification server system (e.g., by providing a web address to the client device).

At operation 2140, verifier 1700 queries centralized identification server system 1700 to determine that authentication of the centralized identity was successful. In implementations where SSO authentication is received, verifier 1700 may receive an access token from the client device that was issued by the centralized identification server system, and then query the central identification server system to determine that the received access token is valid, thereby confirming that the centralized identity was authenticated.

At operation 2150, after verifying that the centralized identity has been authenticated, verifier 1700 digitally signs an attestation transaction verifying a claim of the user, and which may include a reference to the centralized identity of the user. The verifiable claim may only be validated in the future by a verifier operating on the blockchain network, thereby securing identity of the client on a blockchain. Thereafter, verifier 1700 may propagate the digitally signed attestation transaction to blockchain network 1690 (e.g., to create a distributed attestation transaction on the blockchain), off-chain, or to a private channel that comprises communicating to a subset of participants of the blockchain network in a secured manner. The private channel may be approved for future use by the client to prove a claim including the centralized identity.

In implementations, the attestation transaction may be broadcast by verifier 1700 to all or a subset of nodes 1680 on blockchain network 1690. In implementations where the digital attestation transaction is broadcast to a subset of nodes 1680, the digital attestation transaction may be propagated by receiving nodes 1680 to other nodes 1680 on the blockchain network 1690 that did not receive the broadcast. Thereafter, the nodes of blockchain network 1690 may come to a consensus that validates the attestation transaction and updates the blockchain with a block or a distributed ledger entry including the validated transaction.

After a consensus has been reached by the blockchain network 1690, the verifier and other blockchain nodes 1680 may receive a new block containing the validated transaction and update their respective copy of the blockchain. After validation, verifier 1700 may transmit a confirmation message to client device 1600 that a claim including the client's centralized identity has been verified. The confirmation message may include a reference to the attestation transaction ID of the attestation transaction stored on the blockchain network 1690.

Figure 22:
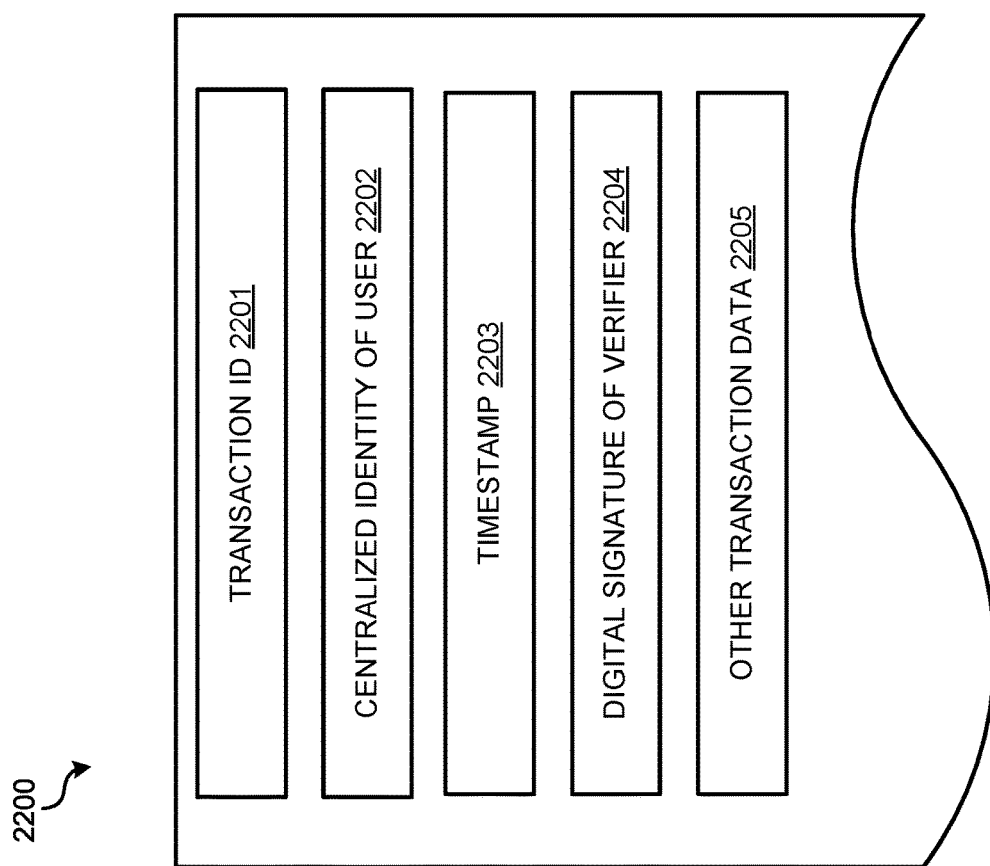
FIG. 22 illustrates an example data structure of a digitally signed attestation transaction verifying a user claim and including a reference to the user's centralized identity, in accordance with implementations of the disclosure.

FIG. 22 illustrates an example data structure of a digitally signed attestation transaction 2200 verifying a user claim and including a reference to the user's centralized identity, in accordance with implementations of the disclosure. For example, attestation transaction 2200 may be recorded on a blockchain of blockchain network 1690. Attestation transaction 2200 may include a blockchain transaction ID 2201, the centralized identity of the user 2202, timestamp 2203, a digital signature 2204 of the verifier, and other transaction data 2205 (e.g., secured representations of blockchain addresses associated with the user, location, and/or asset, public key of user, public key of verifier, etc.) Alternatively, rather than including the centralized identity of the user, attestation transaction 2200 may include a reference to the centralized identity of the user that can only be confirmed with approvals from both user and a verifier. By virtue of this alternative configuration, the original identity of the user may be protected where necessary.

By virtue of mapping blockchain identity to centralized identity, the technology described herein may provide a variety of benefits. For example, the technology described herein may enable the use of blockchain attestations by traditional, centralized systems without changing the infrastructure of the traditional, centralized business ecosystem. Further, the technology described herein may be used to map a blockchain identity of the attestation owner with the owner's centralized identity (e.g., active directory identity) by which subsequent business actions such as payment made in a traditional business ecosystem. By way of example, consider the case where a contingent worker's phased completion of tasks is tracked on a blockchain and attested, but where payment needs to be made using traditional currency. The technology described herein may enable the contingent worker to prove to the employer that the attestation he has is his and he is also the contingent worker through active directory authentication. Because the employer has mapped the worker's bank account only to his active directory account, this may allow for payments of tasks tracked on blockchain using a centralized payment system. Additionally, the centralized identity may be mapped in the database but not disclosed on the blockchain, in which case future seekers of centralized identity information have to get approval from both the user and a verifier to obtain the centralized identity.

As another example, consider a journalist that captures breaking news. The journalist may write the news to blockchain to prove that the journalist was the first person to capture the news. As captured on the blockchain, the identity of the journalist may be displayed as a random string (e.g., as a TOTA of the journalist's associated blockchain address), but the journalist may desire to broadcast on social media that the journalist was the first person to capture the breaking news. To this end, the technology disclosed herein may enable the journalist to establish a link between the journalist's blockchain account and social media account to prove that the journalist's social media ID and blockchain ID are owned by the journalist.

Method and system for proof of compliance and generating verifiable claims based on Blockchain and other Distributed Technologies.

Fourth, the ability of present systems to track an asset across a supply chain over time for its presence and compliance, and for the purpose of generating verifiable claims in a distributed fashion with equal rights for all the participants of the supply chain, may be limited. For example, although some systems may collect sensor data to collect conditions (e.g., environmental conditions) relating to an asset, such systems separately gather the sensor data and data used to prove presence of the asset. Moreover, although videos and images of the asset may captured to prove its presence, such images and videos may be manipulated and may require considerable resources to review.

Figure 23:
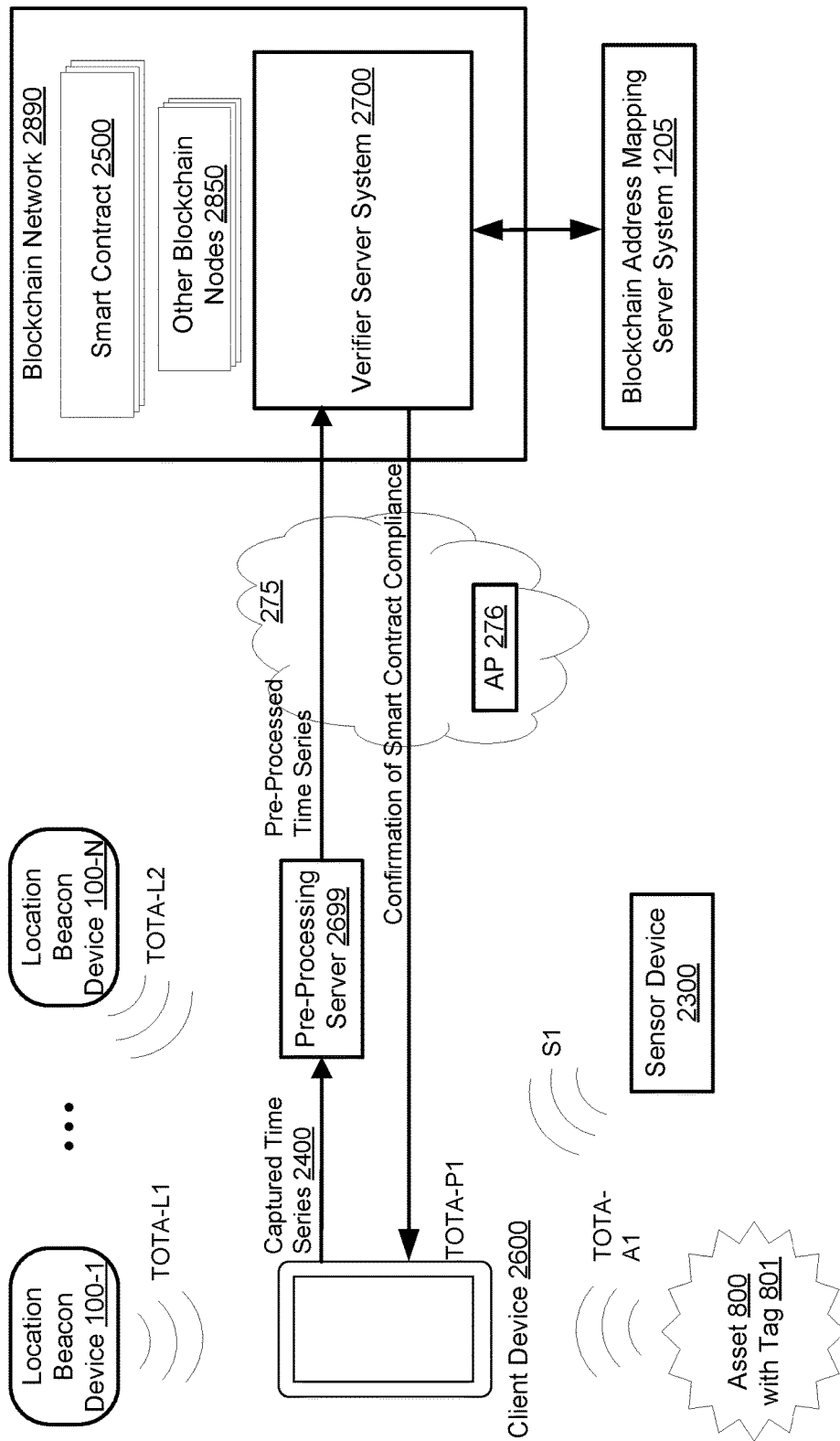
FIG. 23 is a diagram illustrating an example environment for using a smart contract deployed on a blockchain network to prove compliance for handling of an asset over time and space, in accordance with implementations of the disclosure.

FIG. 23 is a diagram illustrating an example environment for using a smart contract 2500 deployed on a blockchain network 2890 to prove compliance for handling of an asset 800 over time and space, in accordance with implementations of the disclosure. In the example environment of FIG. 23, handling of asset 800 may be tracked across time and space (e.g., different locations) for compliance with conditions that are set forth in a smart contract 2500 deployed on a blockchain network 1800. Although handling of a single asset 800 is illustrated in the example environment of FIG. 23, it should be appreciated that in some implementations a smart contract 2500 may prove compliance with handling of multiple assets 800 over time and space. In such instances, the multiple assets 800 may be handled in the same locations at the same times. Alternatively, the multiple assets 800 may be handled in different locations and/or at different times.

By way of example, a smart contract 2500 may be used to specify conditions for handling a specimen such as a stem cell (e.g., the asset) across different times and locations. Such conditions may include: whether or not the specimen was maintained at the correct temperature during transport, whether or not storage of the specimen in a cryogenic cold storage facility was completed within a certain timeframe, whether the specimen is maintained at the correct temperature in the cryogenic cold storage facility, etc.

The conditions for which compliance may be tracked for handling of asset 800 may include conditions measured by a sensor device 2300. Sensor device 2300 may be to measure environmental conditions in the environment of asset 800 and/or to directly measure conditions and/or attributes of asset 800. These conditions may be periodically measured over time. For example, sensor device 2300 may be implemented as a temperature sensor, a pressure sensor, a humidity sensor, a moisture sensor, a light sensor, an oxygen sensor, a weight sensor, a position or motion sensor (e.g., gyroscope, accelerometer, etc.), a current sensor, a voltage sensor, and/or some combination thereof.

As illustrated in the example of FIG. 23 sensor data captured by sensor device 2300 may be wirelessly transmitted to client device 2600 (e.g., using a BLE connection). In other implementations, sensor data captured by sensor 2300 may be transmitted to client device 2600 over a wired communication medium. In additional implementations, sensor device 2300 may be coupled to asset tag 801, and asset tag 801 may transmit the captured sensor data. In some implementations, sensor device 2300 may be physically coupled to asset 800. For example, asset 800 may be carried in an assembly including sensor device 2300 and asset tag 801. In implementations, sensor device 2300 may be integrated into an asset tag 801. Alternatively, it may be external to asset tag 801.

In implementations, the reliability of sensor data captured by a sensor device 2300 may be assured by implementing its components in a TEE. The asset tags 801 and sensor devices 2300 may be implemented on TEE-based central processing units that guarantee that the deployed code has not be altered. Additionally, the asset tags 801 may be tamper resistant beacons that prevent unauthorized access at the hardware or software level.

During operation, client device 2600 may capture a time series 2400 of secured data including, for each time of the time series: i) sensor data measuring a condition of one or more assets (e.g., temperature); and ii) secured representations of blockchain addresses of one or more assets, a location, and/or the user. For example, as illustrated in the example environment of FIG. 23, for a given time T, client device 2600 may capture TOTA-L1 (e.g., TOTA of a location broadcast by a beacon device), TOTA-A1 (e.g., TOTA of an asset broadcast by a tag of the asset), S1 (sensor data such as temperature of the asset or environment the asset is in), and TOTA-P1 (e.g., a TOTA generated by the client device 2600). In some implementations, fixed advertisements may also be captured. Compliance with or violation of smart contract 2500 by an entity associated with client device 2600 may be managed by a verifier 2700 that i) verifies time series data, including sensor data, captured by client device 2600, and ii) sends all or a subset of the verified time series data to smart contract 2500 to trigger execution.

At times, it may not be viable to send all of the time series data 2400 to a verifier 2700 or blockchain network 2800. As such, in some implementations, illustrated by FIG. 23, a pre-processing server 2699 (e.g., a local server) is configured to pre-process the time series data prior to it being sent to a verifier 2700. Pre-processing server 2700 may operate as an edge processing device that may store and analyze captured time series data 2400 collected by client device 2600 and perform pre-processing to reduce the size of time series data 2400 that is sent to blockchain network 2800. Alternatively, pre-processing server 2700 may be implemented as a cloud-based processing device, and it may receive time series data 2400 from client device 2600 over the cloud. It may preprocess the captured time series data 2400, and based on specific conditions, send the data to the verifier 2700. In other implementations where pre-processing of time series data is not needed, server 2699 may be omitted.

By way of example, consider the case of a location-based system that generates one hundred attributes every ten seconds. It may be impractical to write such a dataset into a blockchain and/or have such a dataset processed by a verifier, particularly in circumstances where only a few attributes are tracked and updates to the blockchain are only required when a particular threshold is crossed. In this example, an edge device (e.g., pre-processing server 2699) may run the logic or code to detect crossing of the threshold for attributes of interest, and share this information with the verifier or blockchain network only when the asset state changes from one threshold level to another.

FIG. 24 illustrates three different examples of time series 2400 that may be captured by a client device 2600, in accordance with implementations of the disclosure. Time series 2400-1 may be captured by a client device 2600 in instances where compliance of asset handling requires that the monitored sensor conditions satisfy certain conditions over time, and that the same user (e.g., user using client device 2600) transport the asset to different locations over time. Time series 2400-2 may be captured in instances where compliance of asset handling requires that the monitored sensor conditions satisfy certain conditions over time, and that the asset remain in the same location (L1) in the custody of the same user (P1) over time. Time series 2400-3 may be captured in instances where compliance of asset handling requires that the monitored sensor conditions satisfy certain conditions over time, and that the asset remain in the custody of the same user (P1) over time (irrespective of the location of the asset).

It should be appreciated that many different instances of time series may be captured depending on the business requirements and the compliance conditions set forth in a smart contract 2500. For example, although the example time series of FIG. 24 illustrates time series that are captured where handling of a single asset is tracked over time, in other implementations, time series may be captured where handling of multiple assets are tracked over time. In such cases, TOTAs may be captured from each tag of the assets. Further, sensor data may be captured from multiple sensors over time.

Over time, the location of client device 2600 and sensor conditions measured by sensor device 2300 may change. As such, the location beacons 100 from which secured representations of location blockchain addresses are captured may change. Additionally, it should be appreciated that, in some implementations, the sensor devices 2300 used to capture sensor conditions may change over time as the location changes. For example, different sensor devices 2300 may be used in different locations. As such, sensor devices 2300 may travel with asset 800 or remain fixed to particular locations.

In implementations, a captured time series 2400 may be stored in a suitable data structure. For example, a captured time series 2400 may be stored in a table, an array, or other standardized data structure that may be interpreted by a verifier 2700.

Figure 25:
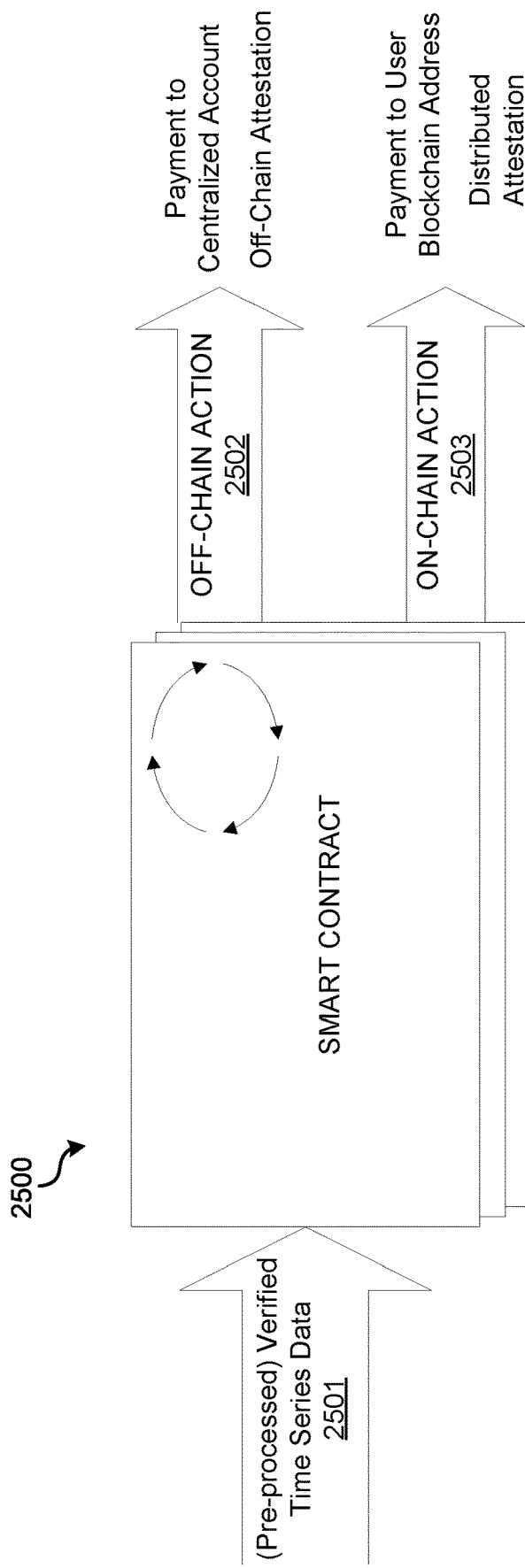
FIG. 25 depicts a simplified representation of the operation of smart contract that may be deployed on blockchain network to prove compliance of handling with an asset, in accordance with implementations of the disclosure.

FIG. 25 depicts a simplified representation of the operation of smart contract 2500 that may be deployed on blockchain network 2890 to prove compliance of handling with an asset 800, in accordance with implementations of the disclosure. Smart contract 2500 may be replicated across each copy of a blockchain stored by a permissioned node on blockchain network 2890. For example, verifier server system 2700 ("verifier 2700") and other blockchain nodes 2850 may each store a copy a of a blockchain including an instance of smart contract 2500.

In this example, execution of code contained in the smart contract 2500 is triggered by verified time series data 2501 received as an input from a permissioned node (e.g. verifier 2700) operating on blockchain network 2890. For example, the verified time series data 2501 may include sensor data captured in a time series, a blockchain (e.g., blockchain address) or centralized identity of the asset(s) associated with the time series, a blockchain or centralized identity of the user(s) associated with the time series, and/or a blockchain or centralized identity of the location(s) associated with the time series. In some implementations, the verified time series data received at smart contract 2500 may be pre-processed by an edge compute system (e.g., server 2699) or a cloud system running trusted code. This pre-processing procedure may reduce the amount of processing to be done by nodes (e.g., verifier 2700) on blockchain network 2890.

Upon execution of the code, smart contract 2500 may use at least the verified (and sometimes pre-processed) time series data to determine, for example, if a user (e.g., user of client device 2600) complied with a set of conditions relating to asset handling and/or transport. For example, threshold conditions for violation of the smart contract 2500 may be specified. These conditions along with a state of the smart contract 2500 may be stored in a database or other storage structure corresponding to the smart contract 2500. Depending on whether or not the user complied with the conditions, smart contract 2500 may perform certain on-chain actions 2502 (e.g. perform transactions on the blockchain of blockchain network 2890) and/or perform certain off-chain actions 2503 (e.g., send off-chain messages to permissioned users). For instance, in the example of FIG. 25, which assumes compliance with the smart contract conditions, off-chain actions 2502 that may be performed include: causing a payment to be issued to a centralized account (e.g., bank account) of the user and/or causing and off-chain attestation to be issued. On-chain actions 2503 that may be performed include: causing a payment to be issued to a blockchain address of the user and/or causing a distributed attestation to be recorded on the blockchain of blockchain network 2890.

Figure 26:
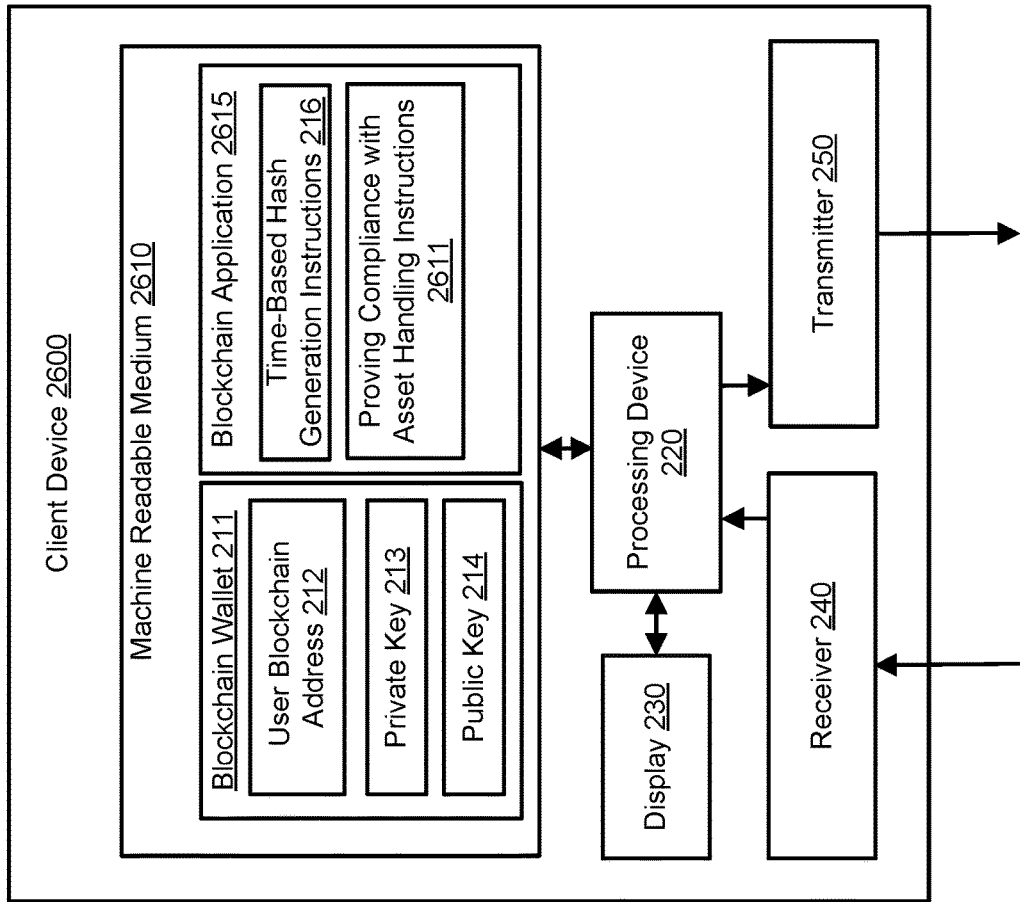
FIG. 26 illustrates an example architecture of components of a client device, in accordance with implementations of the disclosure.

FIG. 26 illustrates an example architecture of components of client device 2600, in accordance with implementations of the disclosure. Client device 2600 may comprise a machine readable medium 2610, processing device 220, display 230, receiver 240 to receive communications from a verifier 2700, and transmitter 250 to transmit communications to a verifier 2700. The machine readable medium 2610 may comprise blockchain wallet 211 and a blockchain application 2615. Blockchain application 2615 may include time-based hash generation instructions 216 that, when executed by processing device 220, generate a secured representation of the user blockchain address 212. Blockchain application 2615 may also include proving compliance with asset handling instructions 2611. Instructions 2611, when executed by a processing device 220, which may be in a TEE, may cause client device 2600 to capture a time series associated with the user's handling of an asset, cause the time series data to be written on the blockchain of blockchain network 2890 or written on an external database and referred to by the blockchain, and cause the client device to receive confirmation that time series data complies with conditions specified in a smart contract 2500.

Figure 27:
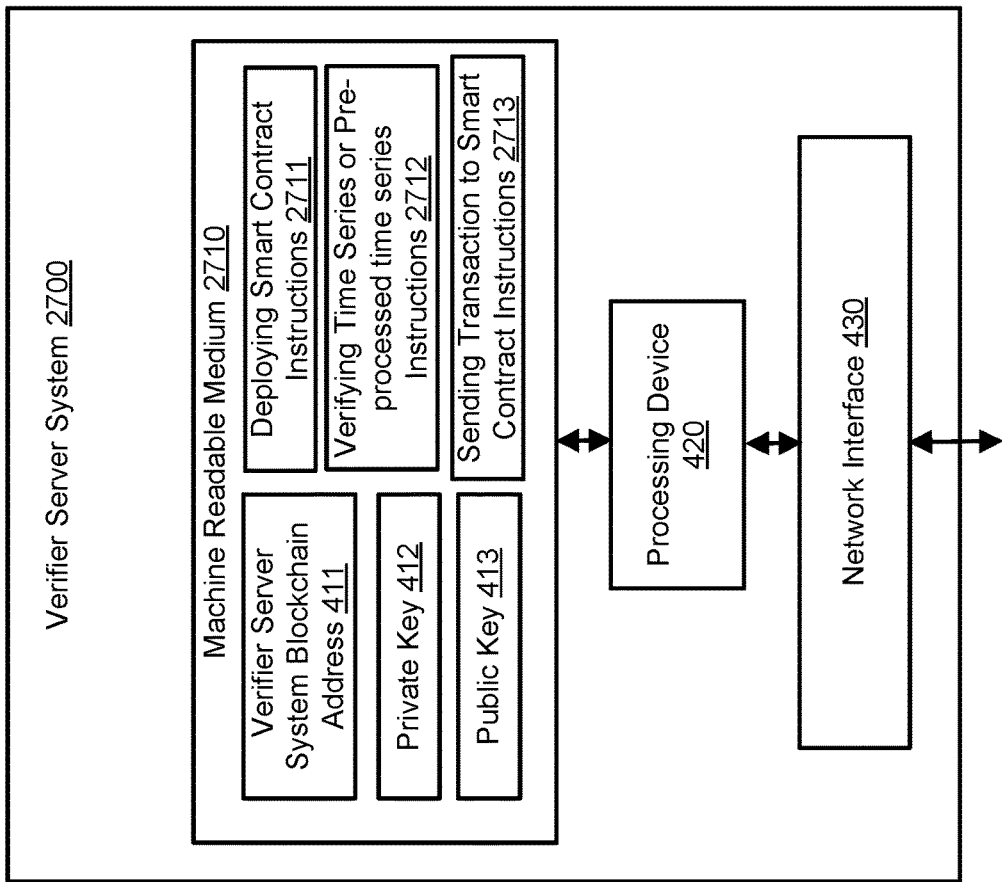
FIG. 27 illustrates an example architecture of components of a verifier, in accordance with implementations of the disclosure.

FIG. 27 illustrates an example architecture of components of verifier 2700, in accordance with implementations of the disclosure. Verifier 2700 may comprise a machine readable medium 2710, a processing device 420, and a network interface 430 to communicate with a client device 2600 and/or blockchain address mapping server system 1205. Although blockchain address mapping server system 1205 is illustrated in the example of FIG. 23 as being separate from verifier 2700, in some implementations blockchain address mapping server system 1205 may be integrated into verifier 2700. Machine readable medium 2710 may store a blockchain address 411 corresponding to the verifier 2700, and a private key 412 and public key 413 corresponding to the blockchain address 411. Machine readable medium 2710 may also store instructions 2711, that when executed by a processing device 420, deploy a smart contract to the blockchain network. Machine readable medium 2710 may further store instructions 2712 that, when executed by a processing 420, verify a time series captured by a client device 2600 or a pre-processed time series received from a pre-processing engine either at the edge or the cloud (e.g., from server 2699). Machine readable medium 2710 may further store instructions 2713 that, when executed by a processing 420, send a transaction to a smart contract (e.g., a transaction including verified time series data 2501).

Figure 28:
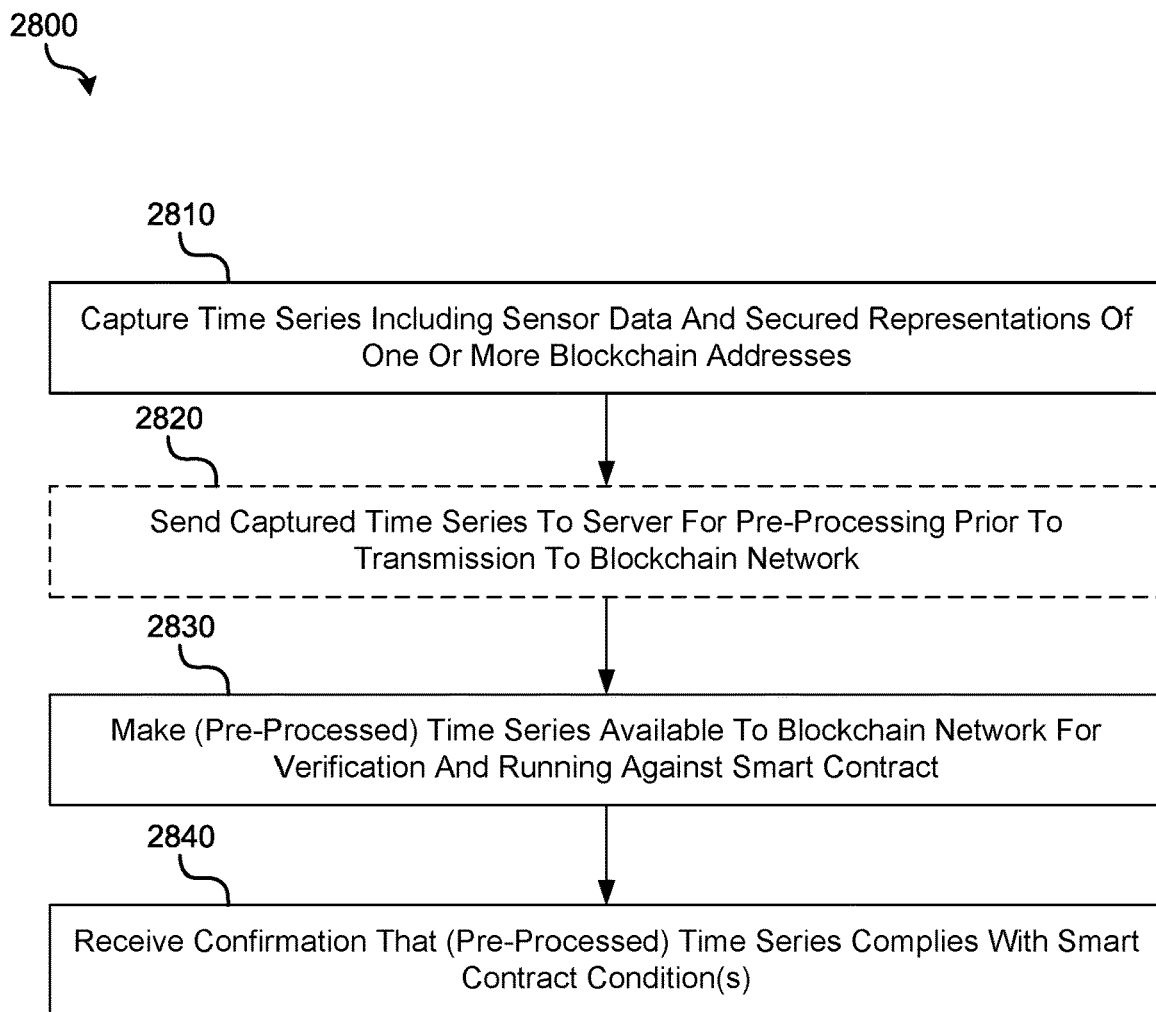
FIG. 28 is an operational flow diagram illustrating an example method that may be implemented by a user of client device to prove compliance of handling of an asset over time, in accordance with implementations of the disclosure.

FIG. 28 is an operational flow diagram illustrating an example method 2800 that may be implemented by a user of client device 2600 to prove compliance of handling of an asset 800 over time, in accordance with implementations of the disclosure. Method 2800 may be implemented by a processing device 220 executing time-based hash generation instructions 216 and proving compliance with asset handling instructions 2611. Method 2800 may be implemented after a smart contract 2500 specifying conditions for handling the asset has been deployed on a blockchain network 2890. In some implementations, a user associated with client device 2600 may coordinate with a blockchain node 2850 to determine the conditions of the smart contract 2500 prior to it being deployed on the blockchain network 2800. The client device 2600 may have read but not write access to the smart contract 2500. In some implementations client device 2600 may At operation 2810, client device 2600 may capture a time series including, for each time, sensor data and secured representations of one or more blockchain addresses. The captured time series may include, for each time, a measurement by a sensor device 2300 (e.g., temperature measurement), a secured representation of a location blockchain address, a secured representation of the blockchain address of an asset, and/or a secured representation of a blockchain address of the user. For example, a time series 2400 may be captured.

At optional operation 2820, client device 2600 may send the captured time series to a server (e.g., server 2699) for pre-processing prior to the time series being transmitted to the blockchain network. The time series data may be pre-processed in a TEE environment. In some implementations, client device 2600 may dynamically stream time series data to server 2699 as it is captured. For example, client device 2600 may maintain a cache of captured time series data. In other implementations, client device 2600 may capture all time series data and then make it available to server 2699 for pre-processing.

At operation 2830, the captured time series 2400 (or pre-processed time series data) is made available to the blockchain network 2800 for verification and running against a smart contract 2500 deployed on the blockchain network 2890. For example, client device 2600 may transmit the time series data as a transaction to be written on the blockchain of blockchain network 2890. In implementations where pre-processed time series data is made available, the client device 2600 may instruct the server 2699 to make the data available. Alternatively, client device 2600 may transmit the time series data off-chain for storage on an external database and to be referred to by the blockchain. In some implementations, the time series data may be transmitted to a verifier 2700 to be verified and written on the blockchain or written on an external database with a blockchain reference to the stored time series data.

After the time series is verified on blockchain network 2890 and run against a smart contract 2500 on blockchain network 2890 to determine compliance, at operation 2840, the client device 2600 may receive a confirmation message from the blockchain network 2890 that the times series complies with one or more conditions set forth in the smart contract 2500. The confirmation may be displayed on a display 230 of client device 2600. In some implementations, the client device 2600 may receive a reference (e.g., blockchain transaction ID) to an attestation (e.g., a distributed attestation stored on-chain or an attestation stored off-chain) that may be reused. The attestation may be written into the blockchain or communicated securely to the owner (e.g., user of client device) of the attestation such that it may be used later by the owner to prove the owner's compliant actions to other parties. In some implementations, the confirmation message may confirm that a payment has been made to a blockchain address or centralized account of the user of the client device 2600.

Figure 29:
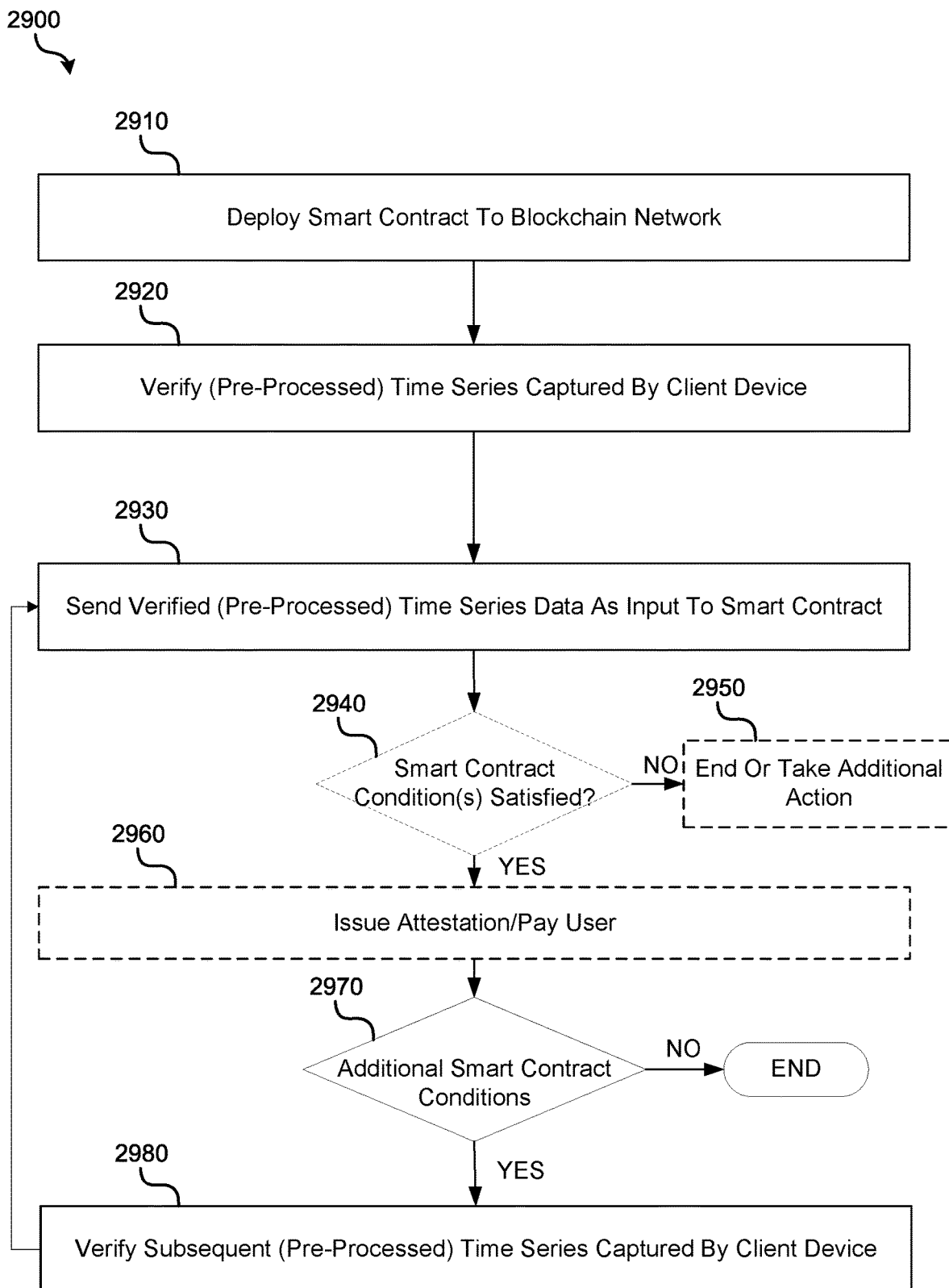
FIG. 29 is an operational flow diagram illustrating an example method that may be implemented by one or more nodes on a blockchain network to verify compliance with a smart contract (e.g., a smart contract that specifies conditions for handling an asset over time), in accordance with implementations of the disclosure.

FIG. 29 is an operational flow diagram illustrating an example method 2900 that may be implemented by one or more nodes on blockchain network 2890 to verify compliance with a smart contract 2500 (e.g., a smart contract that specifies conditions for handling an asset over time), in accordance with implementations of the disclosure. For example, method 2900 may be implemented by executing instructions 2711, 2712, and 2713 stored on verifier server system 2700 and/or other blockchain nodes 2850. Steps that may be performed by self-executing code of a deployed smart contract 2500 are shown in dashed lines.

At operation 2910, a smart contract 2500 is deployed to the blockchain network (e.g., before client device 2600 begins to collect time series data 2400). The smart contract may specify conditions for compliance with handling of an asset at different times such as a required environmental condition (e.g., measured temperature), a required location, a required user handling the asset, etc. Additionally, the smart contract may specify threshold levels for violations of these conditions, and it may be coded to take an action upon violation (e.g., termination). Further, the smart contract may be coded to take an action upon determining compliance of a time series of data captured by a client device 2600.

At operation 2920, a node (e.g., verifier 2700), verifies the time series captured by the client device. The verified time series may be pre-processed prior to verification. During verification, verifier 2700 may query a blockchain address mapping server system 1205 to validate (e.g., map secured representations of blockchain addresses to cleartext) the identity of the location, user, and/or asset, for each time of the time series. In some implementations, the captured sensor data may also be verified.

At operation 2930, verified (and in some instances, pre-processed) time series data (e.g., location, user, asset, and sensor data for each time) is sent as an input to the smart contract. For example verifier server system 2700 may send the verified time series data as a transaction to a blockchain address of the smart contract to change the state of the smart contract. The transaction may be signed using a private key 430 of the verifier 2700. In some implementations, the verified time series data may be modified prior to being sent as an input to the smart contract. For example, blockchain identities of asset(s), location(s), and/or user(s) may be mapped to centralized identities prior to the time series data being sent to the smart contract. In some implementations, the time series data may include blockchain addresses of location(s), asset(s), and user(s).

In response to receiving the verified time series data, the smart contract may execute to determine if smart contract condition(s) have been satisfied (decision 2490). If the conditions have not been satisfied, at operation 2950, the smart contract 2500 may terminate execution and/or take other action (e.g., notify the client device 2600 and/or other party of violation and/or termination). If the smart contract conditions have been satisfied, at operation 2960, the smart contract may cause an attestation of compliance to issue (e.g., on-chain or off-chain) and/or payment to the user associated with client device 2600 to be initiated. For example, it may initiate a transaction on the blockchain that sends cryptocurrency to a blockchain address 212 managed on client device 2600. The cryptocurrency may be sent based on an attestation provided for compliance.

If there are additional smart contract conditions (decision 2970) that need to be verified against subsequent time series (e.g., if compliance is periodically determined), at operation 2980, a node (e.g., verifier 2700), verifies a subsequent time series captured by the client device, and the process may iterate.

Method and system using identity, provenance, smart contracts, tags with color light and sound for asset classification based on Blockchain and other Distributed Technologies.

Fifth, tracking and identifying a set of assets having a particular set of attributes from a much larger set of assets has historically been a difficult task. For example, in a large warehouse holding tens of thousands, hundreds of thousands, or millions of assets, it may be difficult to quickly identify a particular set of assets. This problem may be more difficult if the attributes need to be based on a historical way of handling all of assets by different companies. Further, this problem may be more difficult to address using machines or autonomous systems. While some tracking systems that utilize LED or sound tags may exist, such systems may not understand provenance (i.e., the chronology of the ownership, custody, or location of an asset or other object over time), the identity of the assets may change over time, and the identity of assets may be stored in different databases controlled by different entities.

Figure 30:
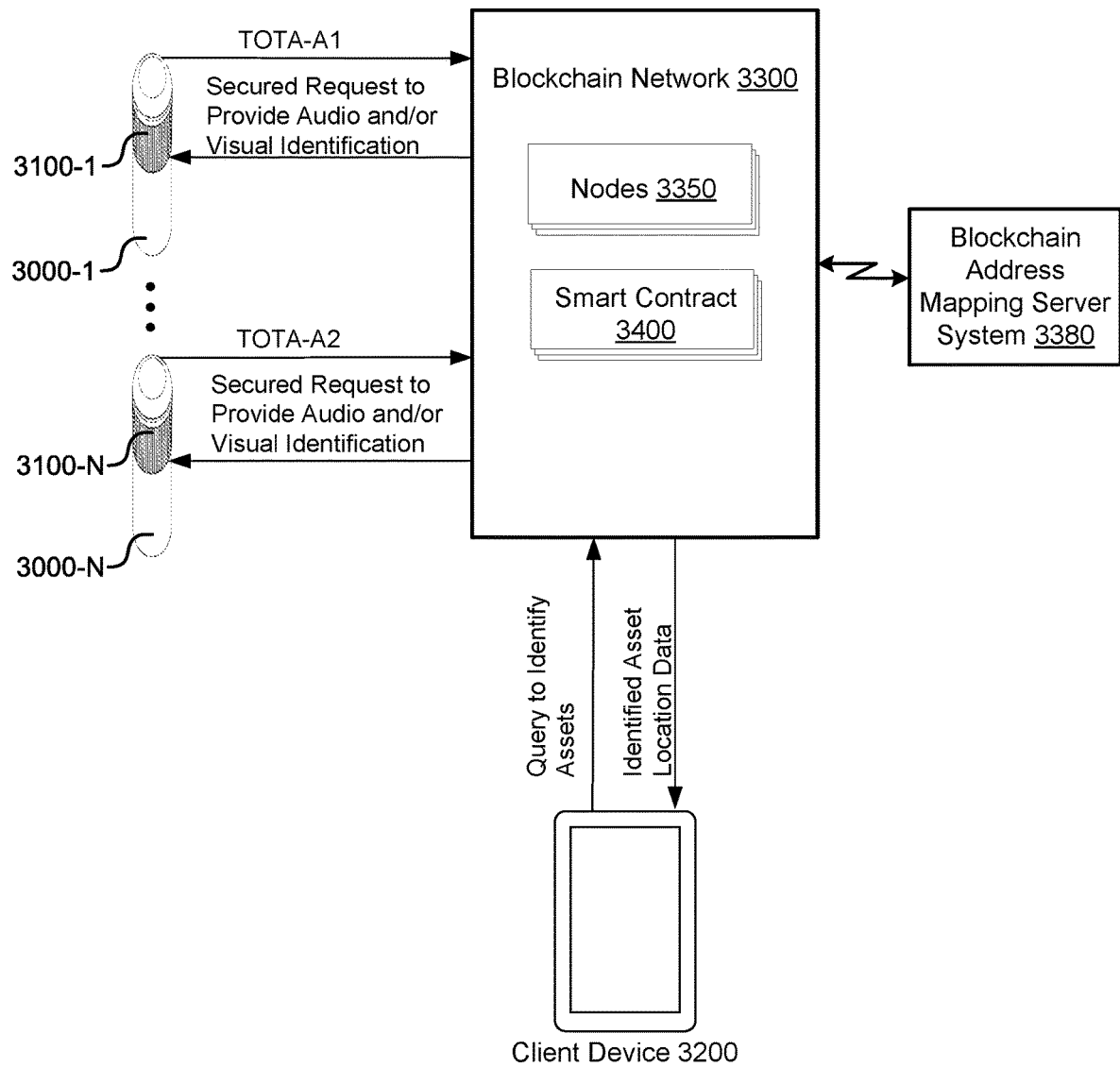
FIG. 30 illustrates an example environment for using a smart contract to track and identify assets having tags, in accordance with implementations of the disclosure.

FIG. 30 illustrates an example environment for using a smart contract 3400 to track and identify assets 3000-1 to 3000-N (individually referred to as an "asset 3000" and collectively referred to as "assets 3000") having tags 3100-N to 3100-N (individually referred to as a "tag 3100" and collectively referred to as "tags 3100"), in accordance with implementations of the disclosure. Tags 3100 associated with assets 3000 are configured to transmit (e.g., broadcast) messages including secured representations of blockchain addresses of their associated asset (e.g., a TOTA) that are made available to blockchain network 3300, which may track asset identity and location over time using the messages transmitted by tags 3100. In some implementations, the messages transmitted by tags 3100 may include location data identifying a location of the asset. For example, the message may include GPS coordinates or some other identifier of asset location.

Although FIG. 30, illustrates direct communication between tags 3100 and blockchain network 3000, it should be appreciated that one or more intermediary devices may provide communication between tags 3100 and blockchain network 3000. Any suitable communication infrastructure (not shown) may be used to relay communications from tags 3100 to blockchain network 3000. In implementations, one or more access points 276 of a communication network 275 (e.g., as illustrated in FIG. 1) may provide bidirectional communication between asset tags 3100 and blockchain network 3300.

In some implementations, the communication infrastructure may receive communications from location beacon devices 100 (not shown) including secured representations of location blockchain addresses, and combine the received secured representations of location blockchain addresses with received secured representations of asset blockchain addresses to associate location with assets tracked over time.

In this example environment, a client device 3200 is configured to query a smart contract 3400 on a blockchain network 3300 (e.g., a smart contract replicated on blockchains of permissioned nodes 3350) to identify a set of one or more assets 3000 having a set of attributes (e.g., assets at a specific location, assets belonging to a specific entity, assets having a specific category or type, etc.). For example, in a warehouse carrying thousands of assets, a client device 3200 may be able to identify a set of fifty assets having a specific set of attributes. As another example, a client device 3200 may be able to identify one or more assets that are in transit (e.g., airport luggage in an airport, package being transported for delivery, etc.).

In response to the query client from client device 3200, the smart contract 3400 may identify the blockchain addresses of assets corresponding to the set of attributes. In some implementations, smart contract 3400 may cause the transmission of location data associated with the identified assets to client device 3200. Additionally, the smart contract 3400 may cause a secured communication to be transmitted over available communication infrastructure requesting that tags 3100 of assets 3000 associated with the identified blockchain addresses identify themselves. The secured communication may be encrypted such that it may only be opened by tags provisioned with the identified asset blockchain address. For example, as illustrated in FIG. 30, the secured communication may be a secured request for tags provisioned with identified blockchain address(es) to provide an audio and/or visual identification.

By way of example, if there is only one asset that matches the requirement, in one implementation the secured communication may be a regular PKI-based communication addressed to the asset that is encrypted with the public key of the asset. If there is a group of assets that matches the criteria/attributes, then in appropriate scenarios the solution may use any of the existing standards of secure L2/L3 communication technology based keys. For example, WPA2, WPA3, ring signature, group signature, and/or IPSec based encryption keys may be used to communicate with the asset tags either individually or in groups. For addressing, the tags may have special purpose broadcast, multicast, or anycast addresses based on L2/L3 technologies the tags support.

In response, tags provisioned with the identified blockchain address may emit a sound (audible or non-audible)

and/or emit light (visible or non-visible) to facilitate tracking by a user of client device 3200. In implementations where a tag emits non-visible light (e.g., outside of the visible spectrum) and/or non-audible sound (e.g., outside of the frequency range of human hearing), additional devices (e.g., infrared sensor, ultrasound detector, infrasound detector, etc.) may be used to detect the non-visible light and/or inaudible sounds emitted by the tag. In some implementations, the secured message requesting self-identification may be transmitted only to the tags of the assets associated with the identified blockchain addresses. For example, the secured message may be unicast or multicast to the applicable asset tags 3100. In other implementations, the secured message may be broadcast to all asset tags 3100.

In the example of FIG. 30, smart contract 3400 may cause a node 3350 on blockchain network 3000 to transmit the communication to the assets 3000 associated with the identified blockchain addresses. In other implementations, smart contract 3400 may cause an off-chain node to transmit the communication to the asset tags. Any suitable communication infrastructure (not shown) may be used to provide bidirectional communication between asset tags 3100 and blockchain network 3300. For example, nodes 3350 on blockchain network 3300 and/or off-chain node(s) may act as a relay for communications between asset tags 3100 and blockchain network 3300.

Figure 31:
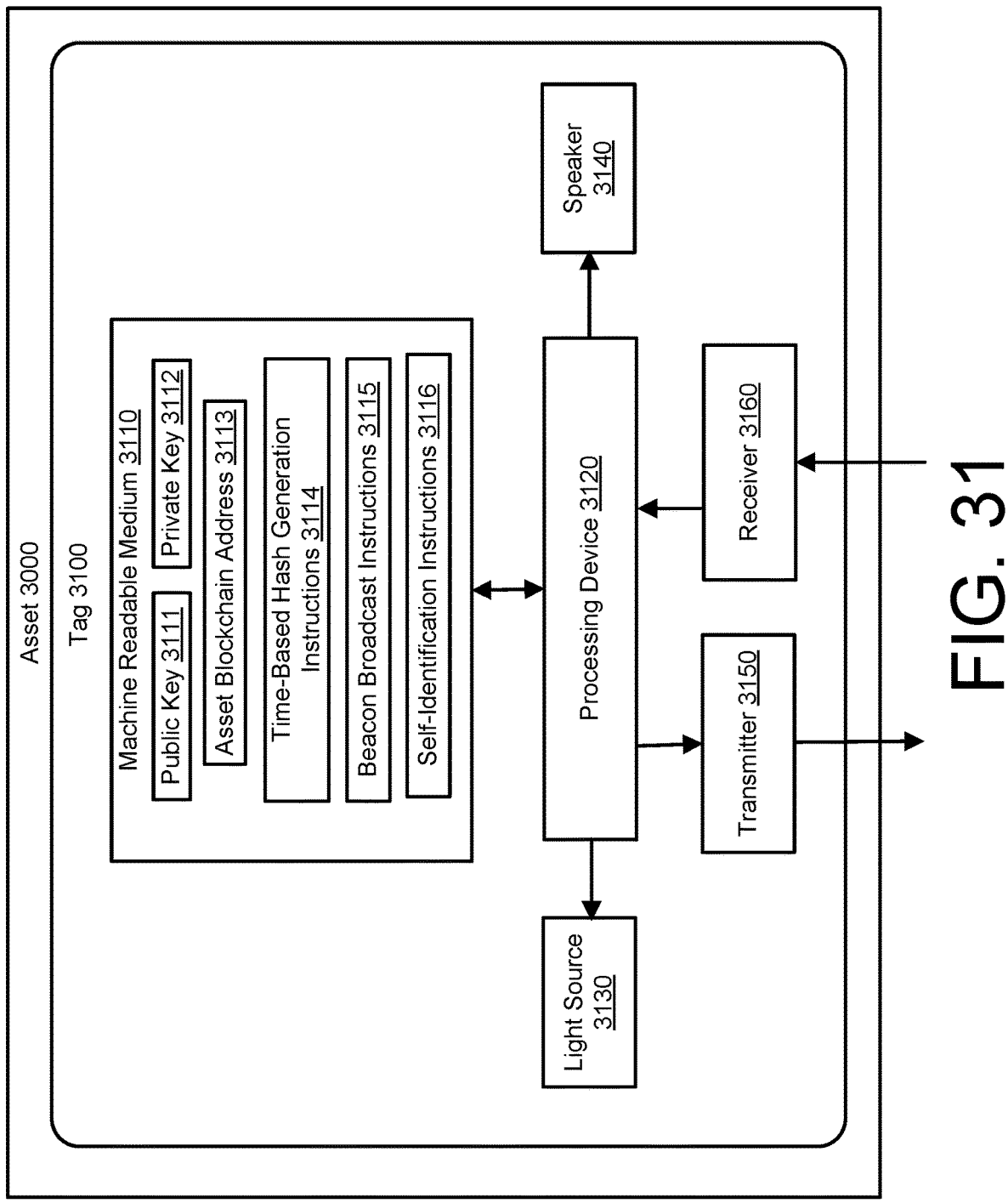
FIG. 31 is a block diagram illustrating an example architecture of a tag that may attached to an asset to facilitate tracking and identification, in accordance with implementations of the disclosure.

FIG. 31 is a block diagram illustrating an example architecture of a tag 3100 that may attached to an asset 3000 to facilitate tracking and identification, in accordance with implementations of the disclosure. A tag 3100 may include a machine readable medium 3110, a processing device 3120, a light source 3130, a speaker 3140, a transmitter 3150, and a receiver 3160 (e.g., to receive a secured request to provide audio and/or visual identification).

Light source 3130 may be to emit light in the visible spectrum and/or outside of the visible spectrum. For example, in some implementations light source 3130 may emit infrared light. In implementations where light source 3130 emits light within the visible spectrum, it may be implemented as one or more light emitting diodes (LEDs), organic LEDs, or other light source(s) that may light up in one or more colors to facilitate locating an asset 3000. In some implementations, light source 3140 may be a color changing LED. For example, light source 3140 may be comprised of red, green, and blue LEDs that are controlled by a microcontroller (e.g., using pulse width modulation) to output a desired color of light in the RGB color space. Using a color variable light source may provide the advantage of enabling color coding of an asset to provide an additional level of identification/classification of an asset.

Speaker 3140 may be implemented as one or more speakers that emit an audible sound and/or inaudible sound to facilitate locating an asset 3000. For example, in implementations where speaker 3140 emits an inaudible sound, the inaudible sound may be emitted in the ultrasonic frequency range. In some implementations, a memory of tag 3100 may store that different prerecorded sounds may be played back by speaker 3140 to enable an additional level of identification/classification of an asset. For example, during asset self-identification, audio data of a prerecorded sound may be selected from memory and converted to an electrical signal that is delivered to a driver of speaker 3140. In some implementations, speaker 3140 may be a micro speaker. In alternative implementations, tag 3100 may only include one of light source 3130 or speaker 3140.

Machine readable medium 3110 may store an asset blockchain address 3113, and a public key 3111 and a private key 3112 corresponding to the asset's blockchain address 3113. In some implementations, public key 3111 and asset blockchain address 3113 are the same, in which case machine readable medium 3110 may store private key 3112 and blockchain address 3113.

Machine readable medium 3110 may further store time-bashed hash generation instructions 3114, beacon broadcast instructions 3115, and self-identification instructions 3116. Execution of time-based hash generation instructions 3114 by a processing device 3120 may generate a secured representation of the asset blockchain address 3113. The secured representation of the asset blockchain address may be generated by applying a one-time cryptographic hashing algorithm using a current timestamp and the asset blockchain address. The current timestamp may be obtained from processing device 3120 (e.g., from a clock of the processing device 3120). As illustrated in the example of FIG. 30, application of one-time cryptographic hashing algorithm generates a beacon including a TOTA including the secured representation of the asset blockchain address provisioned in asset tag 3100 (illustrated in FIG. 30 as TOTA-A1 and TOTA-A2 for tags 3000-1 and 3000-N).

Execution of beacon broadcast instructions 3115, by processing device 3120, may cause a transmitter 3150 to broadcast the secured representation of the asset blockchain address in a beacon. In some implementations, the broadcast beacon may further including location information identifying a location of the tag 3100.

The self-identification instructions may be to receive a secured request to provide audio and/or visual identification (e.g., a message request initiated by smart contract 3400), decrypt the request (e.g., using private key 3112), and after decrypting the request, cause light source 3130 to emit light and/or speaker 3140 emit audible sounds.

Transmitter 3150 may be to periodically transmit beacons including a secured representation of an asset blockchain address (e.g., a TOTA as illustrated in FIG. 30). Receiver 3160 may be to receive secured requests to provide audio and/or visual identification of the asset. In some implementations transmitter 3150 and receiver 3160 may be implemented as a transceiver. Transmitter 3150 and receiver 3160 may utilize any suitable communication technology for performing the aforementioned functions, including RF communications technology, wired communications technology, or free space optical communications technology.

Figure 32:
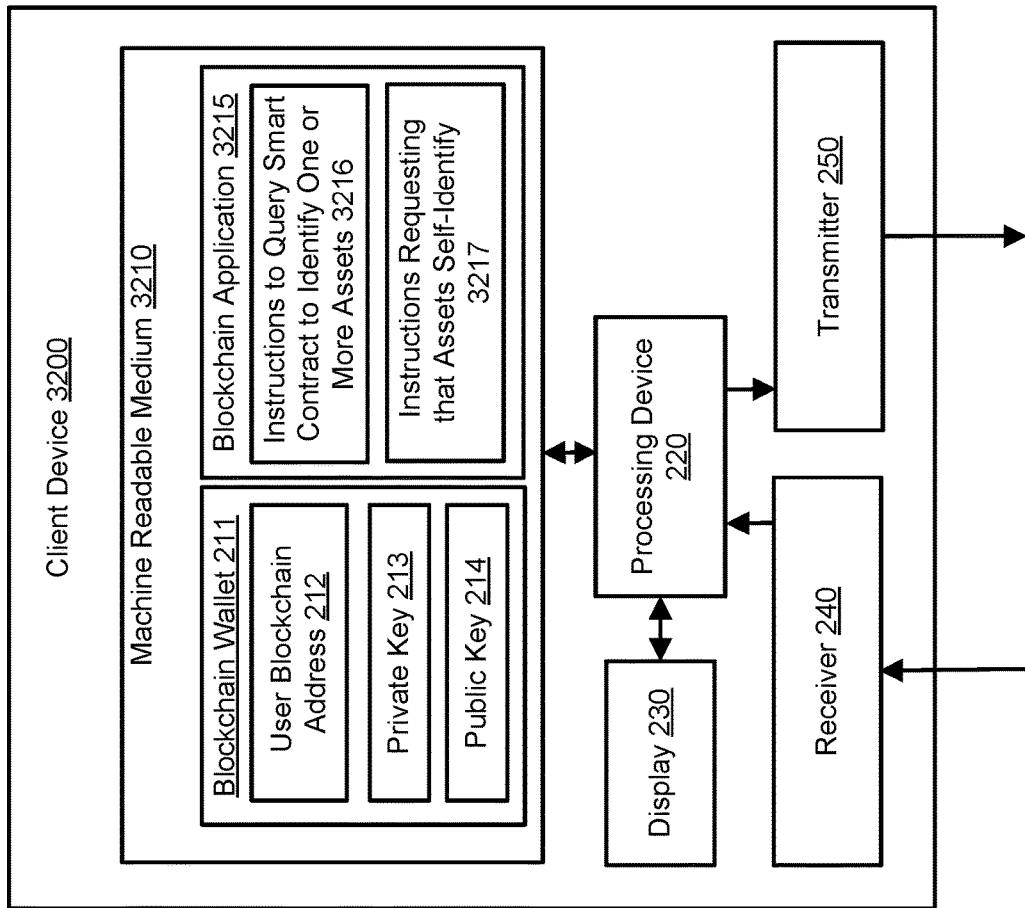
FIG. 32 is a block diagram illustrating an example architecture of a client device that may query a smart contract on a blockchain network to identify a set of one or more assets having a set of attributes, in accordance with implementations of the disclosure.

FIG. 32 is a block diagram illustrating an example architecture of a client device 3200 that may query a smart contract 3400 on a blockchain network 3300 to identify a set of one or more assets 3000 having a set of attributes, in accordance with implementations of the disclosure. Client device 3200 may comprise a machine readable medium 3210, processing device 220, display 230, receiver 240 to receive communications from blockchain network 3300, and transmitter 250 to transmit communications to blockchain network 3300. Although client device 3200 is shown as operating outside of blockchain network 3300, client device 3200 may operate as a node 3350 on blockchain network 3300.

The machine readable medium 2610 may comprise blockchain wallet 211 and a blockchain application 3215. Blockchain application 3215 may include instructions 3216 for querying a smart contract 3400 to identify assets 3000 having a particular set of attributes. The blockchain application may also include instructions 3217 requesting that identified assets having the set of attributes self-identify (e.g., emit light and/or sound).

Figure 33:
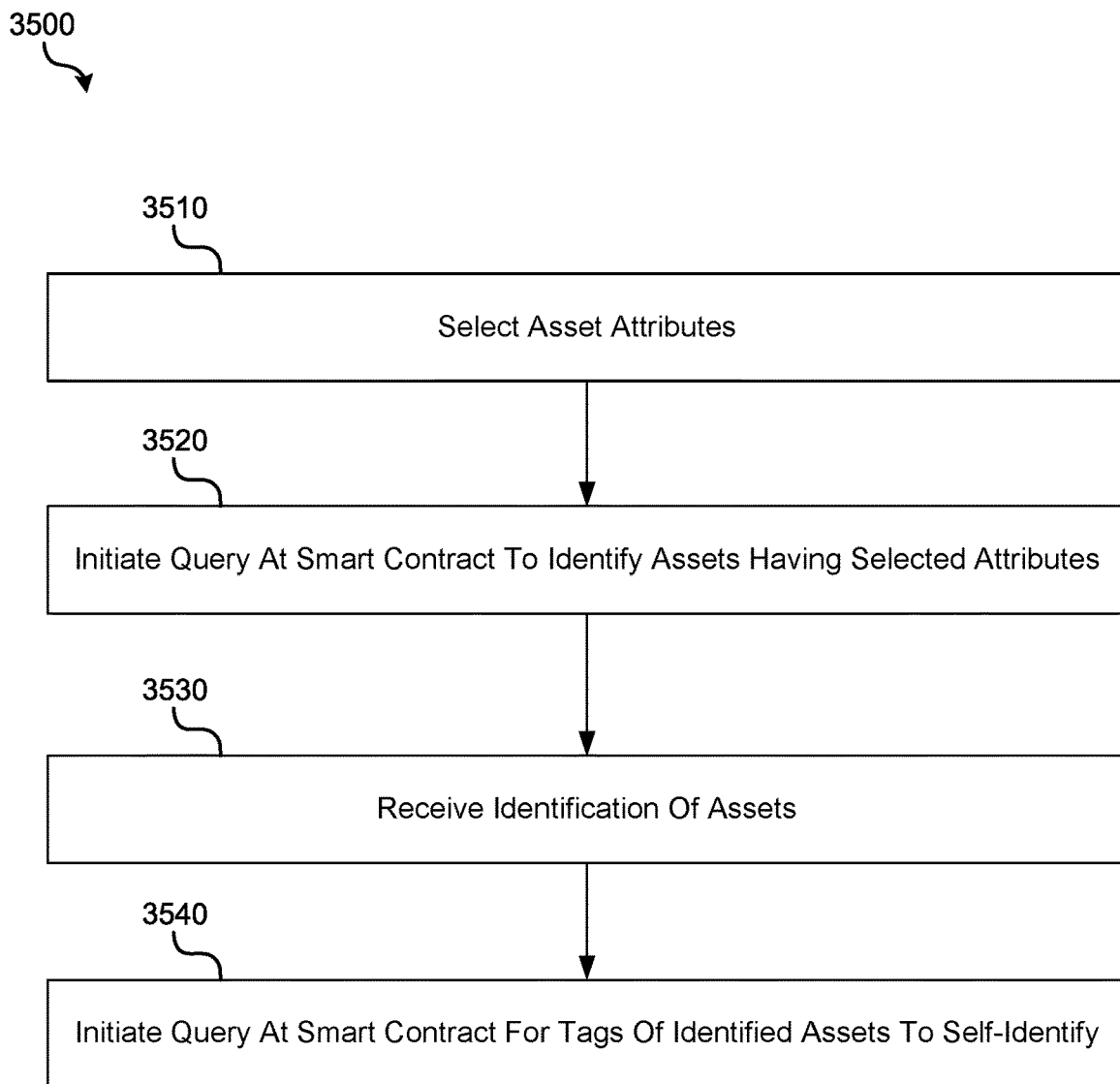
FIG. 33 is an operational flow diagram illustrating an example method that may be implemented by a client device, in accordance with implementations of the disclosure.

FIG. 33 is an operational flow diagram illustrating an example method 3500 that may be implemented by a client device 3200 in accordance with implementations. Method 3500 may be implemented by a processing device 220 executing instructions 3216 and 3217.

At operation 3510, a user of client device 3200 may select attributes of assets that are to be identified. For example, a graphical user interface of a decentralized application (e.g., blockchain application 3215) may provide controls for selecting asset attributes such as location, asset owner, asset type, etc. By way of particular example, a user of a client device 3200 for tracking luggage at an airport may enter asset attributes such as an airport zone, an airline carrier, whether the assets are on a departing or arriving flight, etc.

At operation 3520, client device 3200 may initiate a query at the smart contract 3400 to identify assets having selected attributes. For example, the query may be sent as a transaction to a blockchain address of the smart contract. The transaction may be signed using the private key 213 of client device 3200. Upon receiving the query, the smart contract 3400 may identify assets (e.g., as blockchain addresses) having the specific set of attributes. Smart contract 3400 may also identify the location of such assets.

To this end, an off-chain or on-chain (e.g., on blockchain network 3300) database of asset attributes may be maintained and updated over time. The database (not shown) may maintain a mapping between asset blockchain addresses and their associated attributes (e.g., location, owner, category, etc.). To provide an additional layer of security, such a database may be maintained by a blockchain address mapping server system 3380 that provides a mapping between secured representations of blockchain addresses of assets and their cleartext versions. For example, the server system 3380 may comprise time-based hash generation instructions that are the same as instructions 3114. In such implementations, smart contract 3400 may query system 3380 to identify the blockchain addresses and/or locations having the specific attributes. In some implementations, the smart contract 3400 may categorize the identified assets.

At operation 3530, in response to the query to the smart contract 3400, the client device 3200 may receive an identification of the assets having the set of queried attributes. For example, the client device may receive a listing of the relevant assets that includes the asset identities (e.g., blockchain addresses) and/or location data identifying a location of the assets. In some implementations, client device 3200 may display the locations of the assets on a map (e.g., a map rendered by running blockchain application 3215).

At operation 3540, the client device 3200 may initiate a query at the smart contract 3400 for the tags of some or all of the identified assets to self-identify (e.g., light up in a color and/or emit a sound). In some implementations, the blockchain node may also directly request all the tags to self-identify. For example, the query may be sent as a transaction to a blockchain address of the smart contract that is signed using the private key 213 of the client device 3200. In some implementations, the query may request that an identified asset light up in a particular color or emit a particular sound depending on a compliance level with the query.

By way of example, consider the scenario of a customer shopping for a particular type of product (e.g., medicine), where the customer prefers the product to be good for the next five months (e.g., based on a "use by" or "expiration" date), and requires that the product be good for at least the next three months. The store may include different versions of that product, including some that expire within less than three months, some that expire between three and five months, and some that expire after more than five months. Each of the products may be tagged with a tag 3100 that may light up in different colors. In response to the customer initiating a query at a smart contract (e.g., through a blockchain application), the applicable products that expire after five months may glow green, the applicable products that expire after fourth months may glow yellow, the applicable products that expire after three months may glow orange, and the applicable products that expire after less than three months or are expired may not glow (or make a sound). In some implementations, tag 3100 may include a haptic motor that causes tag 3100 to vibrate or move during self-identification.

In other implementations, the client device 3200 may directly send the query to the asset(s). For example, for an identified asset, client device 3200 may broadcast a message encrypted with the public key 3111 associated with the blockchain address 3113 of the asset, the message requesting that identified asset light up and/or emit a sound. In such implementations, the request may be initiated through a graphical user interface of blockchain application 3215. For example, a map of the identified assets may be displayed on a map of display 230, and a user may select one of the displayed assets to trigger the sending of the self-identification requesting message to the asset.

Figure 34:
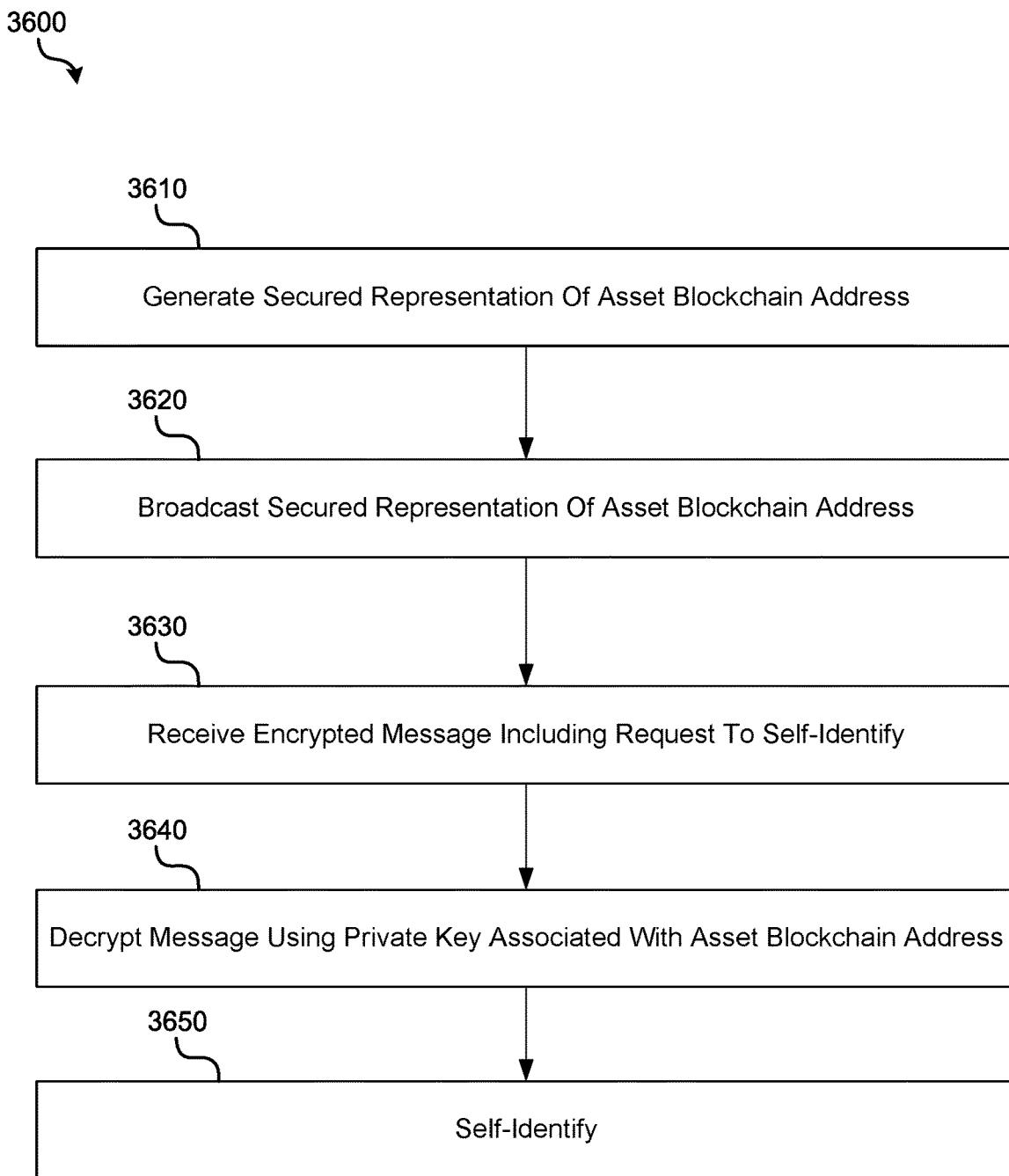
FIG. 34 is an operational flow diagram illustrating an example method that may be implemented by a tag, in accordance with implementations of the disclosure.

FIG. 34 is an operational flow diagram illustrating an example method 3600 that may be implemented by a tag 3100, in accordance with implementations of the disclosure. Method 3600 may be implemented by a processing device 3120 executing instructions 3114, 3115, and 3116.

At operation 3610, the tag 3100 generates a secured representation of an asset blockchain address 3113. At operation 3620, the tag 3100 broadcasts a message including the secured representation of the blockchain address 3113. In some implementations, the message may also include a location of the tag. In implementations, operations 3610-3620 may be iteratively repeated over time. For example, as in the prior examples, TOTAs may be transmitted over time.

At operation 3630, the tag 3100 receives an encrypted message including a request to self-identify (light up and/or emit a sound). The message may be initiated by a smart contract 3400 residing on blockchain network 3300. At operation 3640, the tag decrypts the message using a private key 3112 associated with the asset blockchain address 3113. At operation 3650, after decrypting the message, the tag 3100 self-identifies. For example, the tag 3100 emits light using light source 3130 and/or emits sound using speaker 3140.

In some implementations, the tag 3100 may emit a selected color of light or a selected sound depending on instructions contained in the decrypted message. For example, again referring to the example from above where a customer shops for a particular type of product, the instructions may cause products that expire after five months to glow green, products that expire after fourth months to glow yellow, products that expire after three months to glow orange, and products that expire after less than three months or are expired to not glow (or make a sound). In some implementations, the tag 3100 may determine its compliance level, and based on that determination, and instructions contained in the decrypted message, determine a color of light to emit or type of sound to emit. For example, a memory of the tag 3100 may store an expiration date. In other implementations, the message may instruct the tag 3100 to emit a particular color of light or make a particular sound.

In some implementations, tag 3100 may include a haptic motor that causes tag 3100 to vibrate or move during self-identification.

In this document, the terms "machine readable medium," "computer readable medium," and similar terms are used to generally refer to non-transitory mediums, volatile or non-volatile, that store data and/or instructions that cause a machine to operate in a specific fashion. Common forms of machine readable media include, for example, a hard disk, solid state drive, magnetic tape, or any other magnetic data storage medium, an optical disc or any other optical data storage medium, any physical medium with patterns of holes, a RAM, a PROM, EPROM, a FLASH-EPROM, NVRAM, any other memory chip or cartridge, and networked versions of the same.

These and other various forms of computer readable media may be involved in carrying one or more sequences of one or more instructions to a processing device for execution. Such instructions embodied on the medium, are generally referred to as "instructions" or "code." Instructions may be grouped in the form of computer programs or other groupings. When executed, such instructions may enable a processing device to perform features or functions of the present application as discussed herein.

In this document, a "processing device" may be implemented as a single processor that performs processing operations or a combination of specialized and/or general-purpose processors that perform processing operations. A processing device may include a CPU, GPU, APU, DSP, FPGA, ASIC, SOC, and/or other processing circuitry.

In this document, a "server system" may refer to a system of one or more servers.

As described herein, client devices, server systems, beacon devices, asset tags, and sensor devices may implement some or all of their components within a trusted execution environment.

The various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. Additionally, unless the context dictates otherwise, the methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A non-transitory computer readable medium having executable instructions stored thereon, that, when executed by a processor, performs operations of:
   receiving, from a first beacon device located at a first location, at a first time, a first secured representation of a first distributed ledger address associated with a first location;
   transmitting to a server system operating as a node on a distributed ledger network:
      the first secured representation of the first distributed ledger address;
      a secured representation of a second distributed ledger address associated with an asset; and
      a secured representation of a third distributed ledger address associated with a user, wherein the first secured representation of the first distributed ledger address, the secured representation of the second distributed ledger address, and the secured representation of the third distributed ledger address are transmitted to the server system to prove the user's custody of the asset at the first location;
   receiving a request from the server system to obtain, at a second time after the first time, an additional secured representation, wherein the request is transmitted to prove the user's custody of the asset at the first location at the first time;
   obtaining the additional secured representation in response to receiving the request, the obtaining comprising:
      obtaining, at the second time, from the first beacon device, a second secured representation of the first distributed ledger address associated with the first location or obtaining, at the second time, from a second beacon device located at a second location in proximity to the first location, a third secured representation of the first distributed ledger address associated with the first location;

transmitting the second secured representation of the first distributed ledger address or the third secured representation of the first distributed ledger address to the server system; and receiving a confirmation message from the server system that the user's custody of the asset at the first location at a first time was verified.

2. The non-transitory computer readable medium of claim 1, wherein the confirmation message comprises a distributed ledger transaction identifier (ID) of a distributed attestation transaction stored on a distributed ledger of the distributed ledger network.

3. The non-transitory computer readable medium of claim 2, wherein the distributed attestation transaction stored on the distributed ledger comprises:
the first secured representation of the first distributed ledger address associated with the first location;
the secured representation of the second distributed ledger address associated with the asset;
the secured representation of the third distributed ledger address associated with the user; and
a timestamp corresponding to the first time.

4. The non-transitory computer readable medium of claim 3, wherein the distributed attestation transaction stored on the distributed ledger is digitally signed by the server system.

5. The non-transitory computer readable medium of claim 1, wherein the first secured representation is contained within a first beacon received from the first beacon device, and wherein the instructions, when executed by the processor, further perform operations of:
receiving a second beacon from an asset tag coupled to the asset, the second beacon comprising the secured representation of the second distributed ledger address associated with the asset; and
generating the secured representation of the third distributed ledger address associated with the user.

6. The non-transitory computer readable medium of claim 5, wherein the first beacon and the second beacon are received using a short-range receiver.

7. The non-transitory computer readable medium of claim 5, wherein the first secured representation of the first distributed ledger address, the second secured representation of the first distributed ledger address, the third secured representation of the first distributed ledger address, the secured representation of the second distributed ledger address, and the secured representation of the third distributed ledger address are time-based one time advertisements.

8. The non-transitory computer readable medium of claim 1, wherein the asset is a first asset, and wherein the instructions, when executed by the processor, further perform operations of: transmitting, to the server system, a secured representation of a fourth distributed ledger address associated with a second asset, wherein the confirmation message confirms that the user's custody of the second asset at the first location at the first time was verified.

9. The non-transitory computer readable medium of claim 1, wherein the confirmation message comprises an attestation transaction that is digitally signed by the server system, wherein the instructions, when executed by the processor, further perform operations of: presenting the digitally signed attestation transaction to a device to prove that the user had custody of the asset at the first location at the first time.

10. A method, comprising:
receiving, at a server system, from a client device:
a first secured representation of a first distributed ledger address associated with a first location, wherein the client device receives the first secured representation at a first time from a first beacon device located at the first location;
a secured representation of a second distributed ledger address associated with an asset; and
a secured representation of a third distributed ledger address associated with a user of the client device;
transmitting, by the server system, to the client device, a request for the client device to obtain, at a second time after the first time, an additional secured representation;
receiving, at the server system, from the client device, the additional secured representation comprising one of a second secured representation of the first distributed ledger address associated with the first location, wherein the second secured representation is received by the client device from the first beacon device at the second time, or a third secured representation of the first distributed ledger address associated with the first location, wherein the third secured representation of the first distributed ledger address is received by the client device from a second beacon device located at a second location in proximity to the first location;
verifying, at the server system, the existence of a respective clear distributed ledger address corresponding to each of the received first secured representation of the first distributed ledger address, the secured representation of the second distributed ledger address, the secured representation of the third distributed ledger address, and the additional secured representation; and
after verifying, digitally signing, by the server system, a transaction verifying that the user had custody of the asset at the first location at the first time.

11. The method of claim 10, wherein the digitally signed transaction comprises:
the first secured representation of the first distributed ledger address associated with the first location;
the secured representation of the second distributed ledger address associated with the asset;
the secured representation of the third distributed ledger address associated with the user of the client device; and
a timestamp corresponding to the first time.

12. The method of claim 10, further comprising: propagating the digitally signed transaction to a distributed ledger network to be added to a distributed ledger of the distributed ledger network.

13. The method of claim 12, wherein nodes of the distributed ledger network come to a consensus that validates the digitally signed transaction, the method further comprising: the server system receiving a new block of the blockchain, the new block comprising the validated transaction.

14. The method of claim 12, wherein nodes of the distributed ledger network come to a consensus that validates the digitally signed transaction, the method further comprising: after the transaction is validated, the server system transmitting, to the client device, a message including a reference to a distributed ledger transaction identifier (ID) associated with the validated transaction.

15. The method of claim 10, wherein the request is transmitted to prove that the user had custody of the asset at the first location at the first time.

16. The server system of claim 15, wherein the request comprises: a request to obtain, at a second time after the first time, a secured representation of a fourth distributed ledger address associated with a second asset.

17. The method of claim 10, wherein verifying the existence of the respective distributed ledger address corresponding to each of the received first secured representation of the first distributed ledger address, the secured representation of the second distributed ledger address, the secured representation of the third distributed ledger address, and the additional secured representation comprises: querying a distributed ledger address mapping server system that maintains, over time, a mapping between clear versions of distributed ledger addresses and their secured representations.

18. The method of claim 10, wherein each secured representation is a time-based one time advertisement.

19. A server system, comprising:
- a processor; and
- a non-transitory computer readable medium having executable instructions stored thereon, that, when executed by the processor, performs operations of:
  - receiving, from a client device:
    - a first time-based one time advertisement (TOTA) associated with a first location, wherein the first TOTA is received by the client device from a first beacon device located at the first location;
    - a second TOTA associated with an asset;
    - a third TOTA associated a user of the client device;
  - requesting the client device to obtain, at a second time after the first time, an additional TOTA;
  - receiving, from the client device, the additional TOTA, wherein the additional TOTA comprises one of: i) a fourth TOTA associated with the first location, wherein the client device obtains the fourth TOTA at the second time from the first beacon device or ii) a fifth TOTA associated with the first location, wherein the client device obtains the fifth TOTA at the second time from a second beacon device located at a second location in proximity to the first location:
  - verifying the existence of a respective stored distributed ledger address corresponding to each of the received first TOTA, second TOTA, and third TOTA; and
  - after verifying, digitally signing a transaction verifying that the user had custody of the asset at the first location at the first time.

20. The server system of claim 19, wherein verifying the existence of the respective stored distributed ledger address corresponding to each of the received first TOTA, second TOTA, and third TOTA comprises:
- performing a lookup of a mapping of TOTAs to clear versions of distributed ledger addresses to confirm that the mapping includes a respective stored clear version of a distributed ledger address corresponding to each of the first TOTA, the second TOTA, and the third TOTA.

* * * * *